United States Patent
Wang et al.

(10) Patent No.: US 12,544,375 B2
(45) Date of Patent: Feb. 10, 2026

(54) SMALL MOLECULE THERAPEUTIC FOR PARKINSON'S DISEASE PAIRED WITH A BIOMARKER OF THERAPEUTIC ACTIVITY

(71) Applicants: The Board of Trustees of the Leland Stanford Junior University, Stanford, CA (US); Atomwise, Inc., San Francisco, CA (US)

(72) Inventors: Xinnan Wang, Redwood City, CA (US); Chung-Han Hsieh, Palo Alto, CA (US); Li Li, Palo Alto, CA (US); Kong Nguyen, Moraga, CA (US)

(73) Assignees: The Board of Trustees of the Leland Junior University, Stanford, CA (US); Atomwise Inc., San Francisco, CA (US)

( * ) Notice: Subject to any disclaimer, the term of this patent is extended or adjusted under 35 U.S.C. 154(b) by 966 days.

(21) Appl. No.: 17/638,676

(22) PCT Filed: Sep. 4, 2020

(86) PCT No.: PCT/US2020/049361
§ 371 (c)(1),
(2) Date: Feb. 25, 2022

(87) PCT Pub. No.: WO2021/046322
PCT Pub. Date: Mar. 11, 2021

(65) Prior Publication Data
US 2022/0288071 A1 Sep. 15, 2022

Related U.S. Application Data

(60) Provisional application No. 62/896,450, filed on Sep. 5, 2019.

(51) Int. Cl.
| | | |
|---|---|---|
| *A61K 31/506* | (2006.01) | |
| *A61K 31/13* | (2006.01) | |
| *A61K 31/198* | (2006.01) | |
| *A61K 31/365* | (2006.01) | |
| *A61P 25/16* | (2006.01) | |
| *G01N 33/50* | (2006.01) | |
| *G01N 33/68* | (2006.01) | |

(52) U.S. Cl.
CPC ............ *A61K 31/506* (2013.01); *A61K 31/13* (2013.01); *A61K 31/198* (2013.01); *A61K 31/365* (2013.01); *A61P 25/16* (2018.01); *G01N 33/5023* (2013.01); *G01N 33/6896* (2013.01); *G01N 2333/914* (2013.01); *G01N 2800/2835* (2013.01)

(58) Field of Classification Search
CPC ............... A61K 31/365; A61P 25/16; G01N 2800/2835
See application file for complete search history.

(56) References Cited

U.S. PATENT DOCUMENTS

| 9,265,788 B2 | 2/2016 | Liu |
| 2014/0256786 A1 | 9/2014 | Liu et al. |
| 2019/0203293 A1 | 7/2019 | Nagy |
| 2019/0352282 A1 | 11/2019 | Wu et al. |
| 2022/0288071 A1 | 9/2022 | Wang et al. |

FOREIGN PATENT DOCUMENTS

| CN | 108938617 A | 12/2018 |
| JP | 2013-177335 | 9/2013 |
| JP | 2018-523110 | 8/2018 |
| WO | WO2016/198833 | 12/2016 |
| WO | WO2018106918 | 6/2018 |

OTHER PUBLICATIONS

Hsieh (Cell Metabolism, 30, 1131-1140, 2019 (Year: 2019).*
Hsieh et al. (2019) "Miro1 marks Parkinson's disease subset and Miro1 reducer rescues neuron loss in Parkinson's models." Cell metabolism 30(6), pp. 1131-1140.
Wu et al. (2024) "Altered anterograde axonal transport of mitochondria in cultured striatal neurons of a knock-in mouse model of Huntington's disease." Biochemical and Biophysical Research Communications 691, p. 1-8, 149246.
Hsieh et al. (2016) "Functional impairment in miro degradation and mitophagy is a shared feature in familial and sporadic Parkinson's disease." Cell stem cell, 19(6), pp. 709-724.
Wang et al. (2017) "Destructive cellular paths underlying familial and sporadic Parkinson disease converge on mitophagy." Autophagy, 13(11), p. 1998-1999.
Shaltouki et al. (2018) "Alpha-synuclein delays mitophagy and targeting Miro rescues neuron loss in Parkinson's models." Acta neuropathologica, 136, p. 607-620.
Tavata et al. (2018). T-type calcium channels determine the vulnerability of dopaminergic neurons to mitochondrial stress in familial Parkinson disease. Stem cell reports, 11(5), pp. 1171-1184.
Grossmann et al. (2019) "Mutations in RHOT1 Disrupt Endoplasmic Reticulum-Mitochondria 1-4 Contact Sites Interfering with Calcium Homeostasis and Mitochondrial Dynamics in Parkinson's Disease," Antioxidants & Redox Signaling, vol. 31, No. 16, pp. 1213-1234.

* cited by examiner

*Primary Examiner* — Susanna Moore
*Assistant Examiner* — Luisalberto Gonzalez
(74) *Attorney, Agent, or Firm* — Pamela J. Sherwood; Bozicevic, Field & Francis LLP

(57) ABSTRACT

Methods and compositions are provided for the treatment of Parkinson's Disease. Aspects of the methods include administering Miro1 reducer. Also provided are reagents and kits for practicing the subject methods. In some embodiments, a method is provided for reducing undesirable levels of Miro1 in a cell having depolarized or otherwise damaged mitochondria. In some embodiments the cell is in vivo, e.g. in an animal model for PD, in an individual diagnosed with PD, in a clinical trial for treatment of PD, and the like.

5 Claims, 49 Drawing Sheets

Specification includes a Sequence Listing.

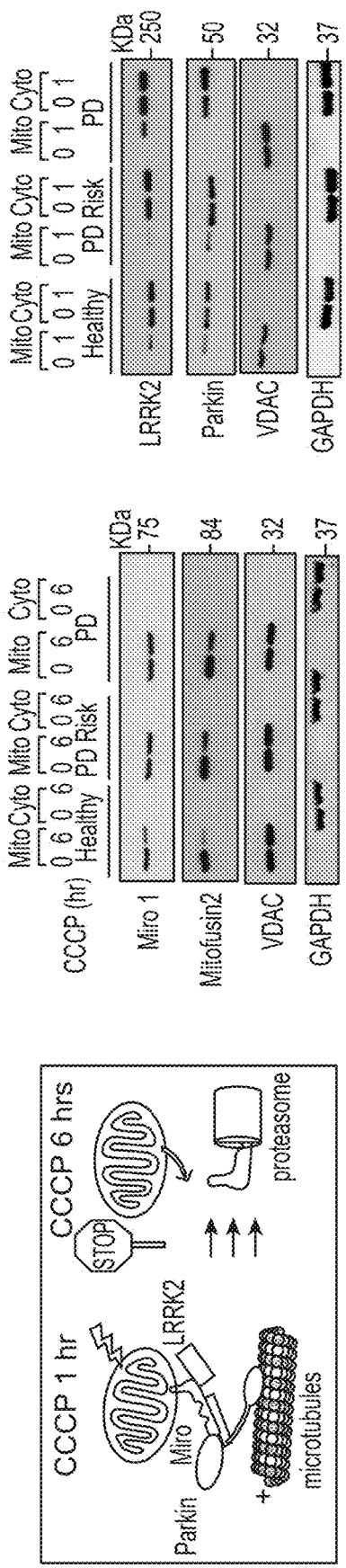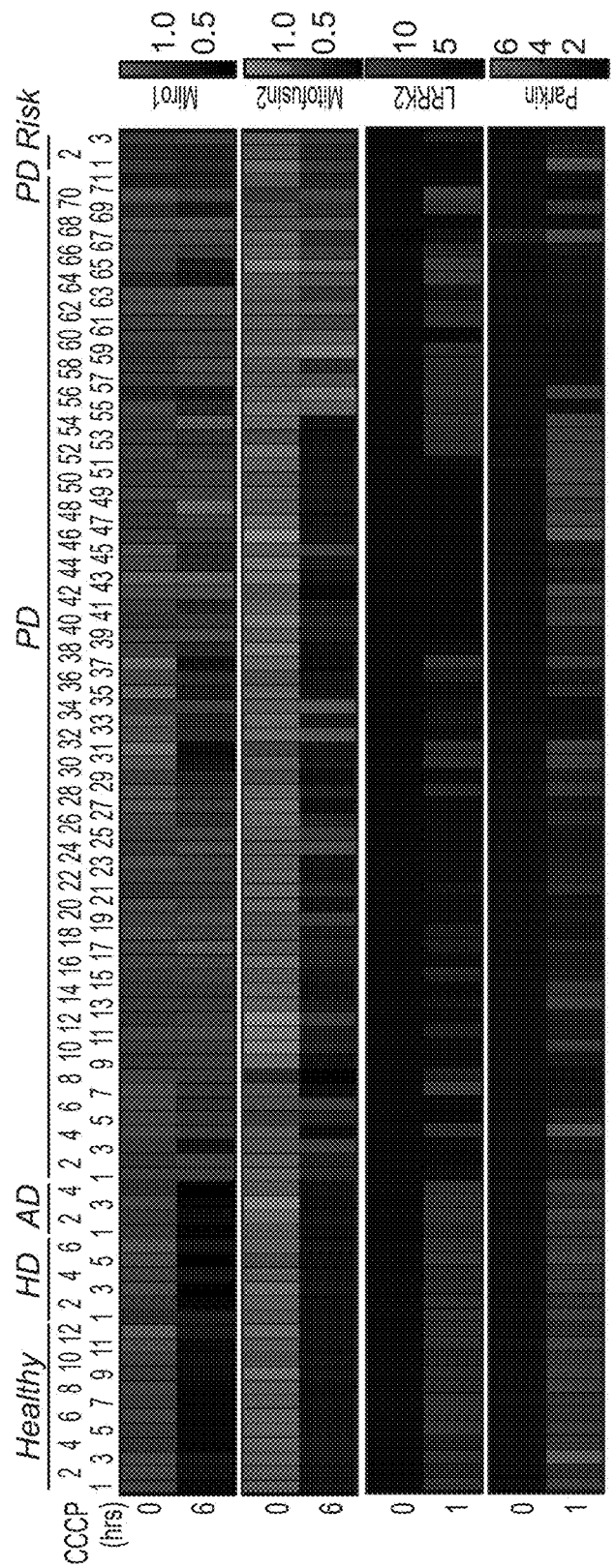

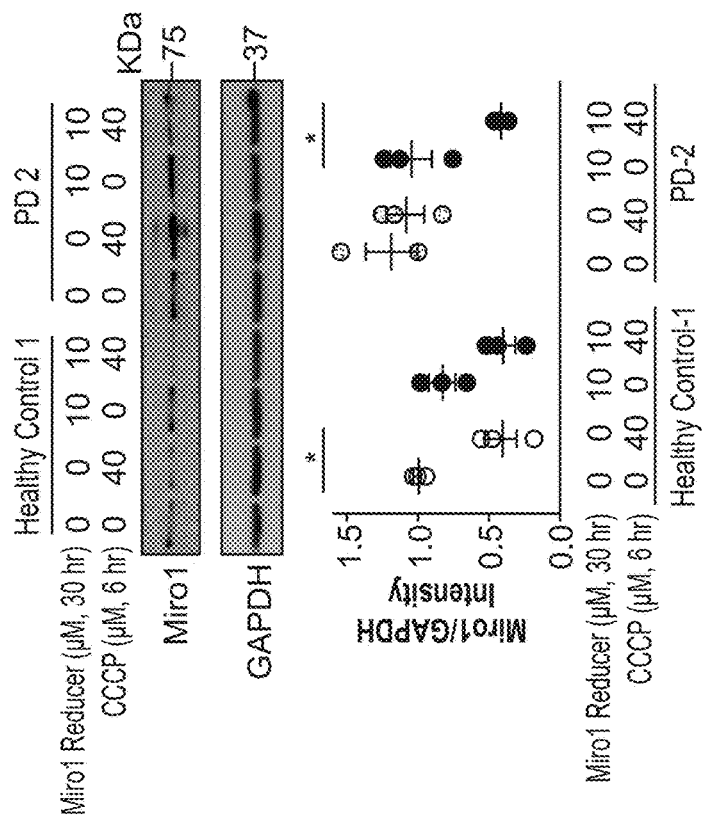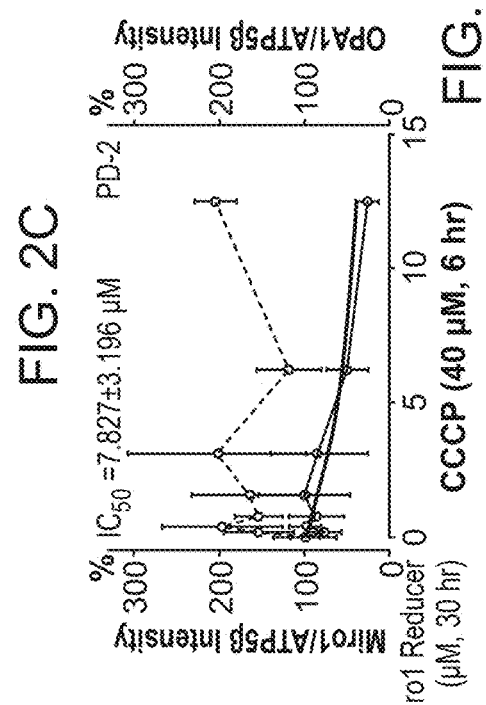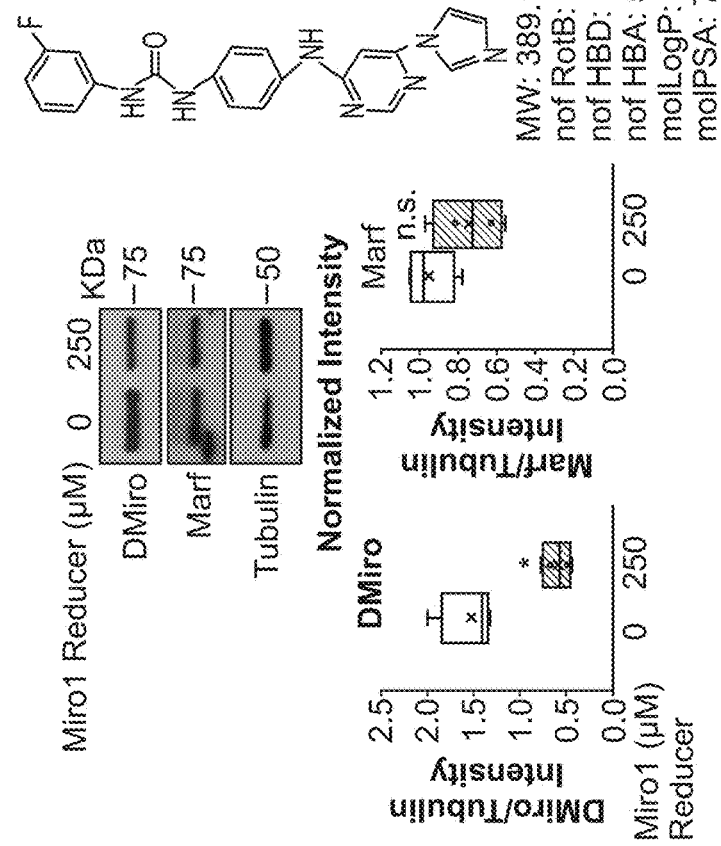
FIG. 2A
FIG. 2B
FIG. 2C
FIG. 2D

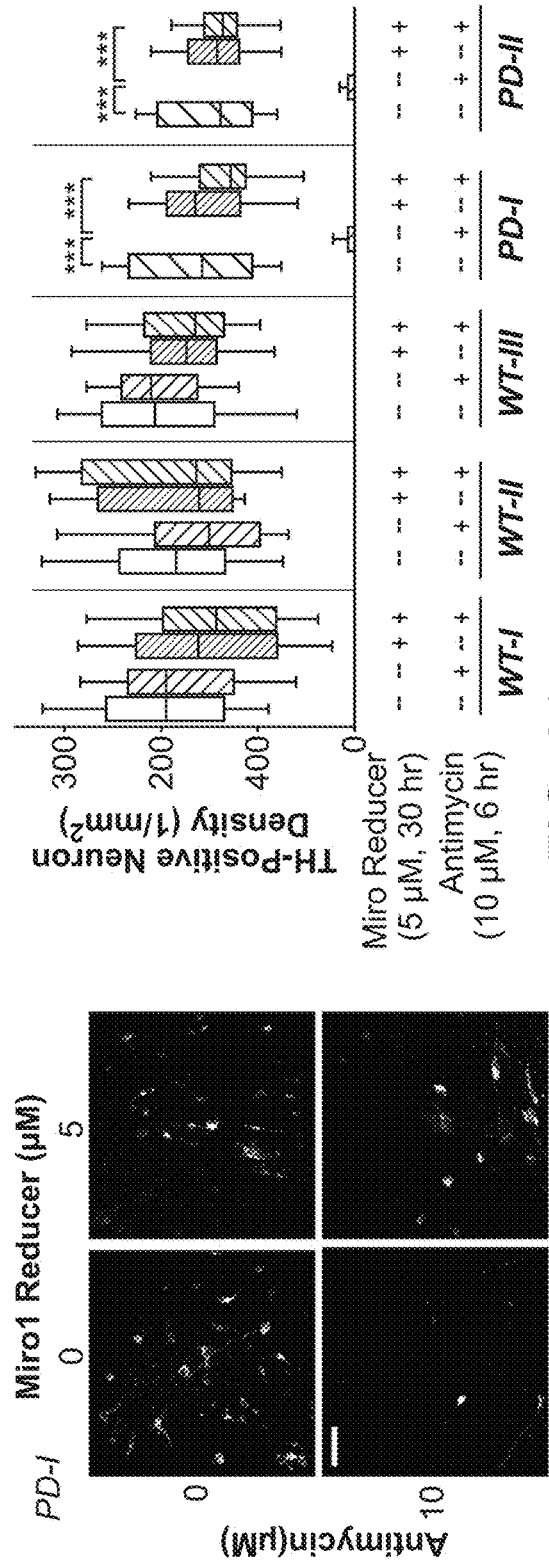
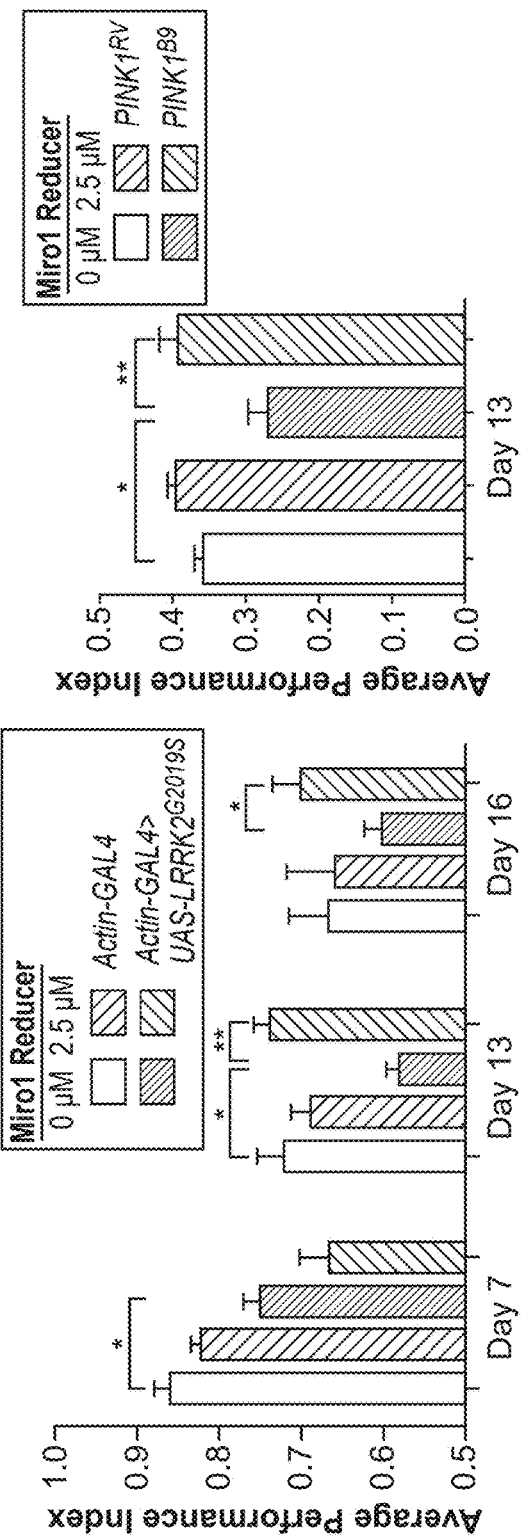
FIG. 3A
FIG. 3B
FIG. 3C

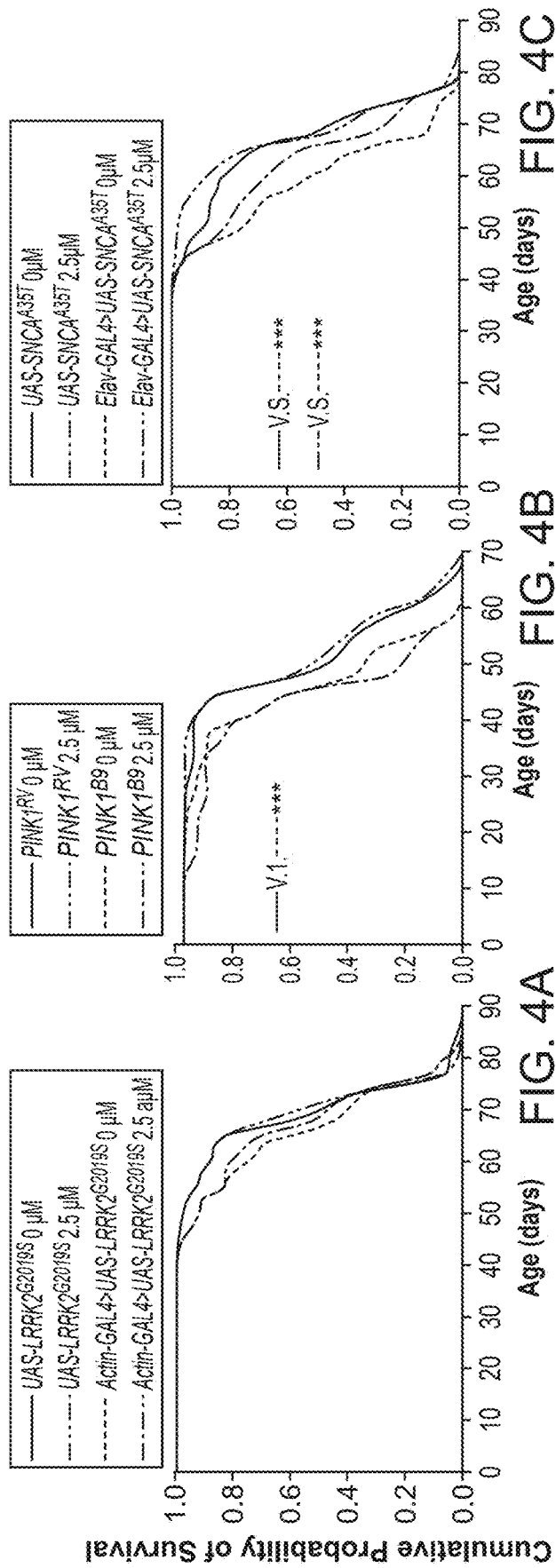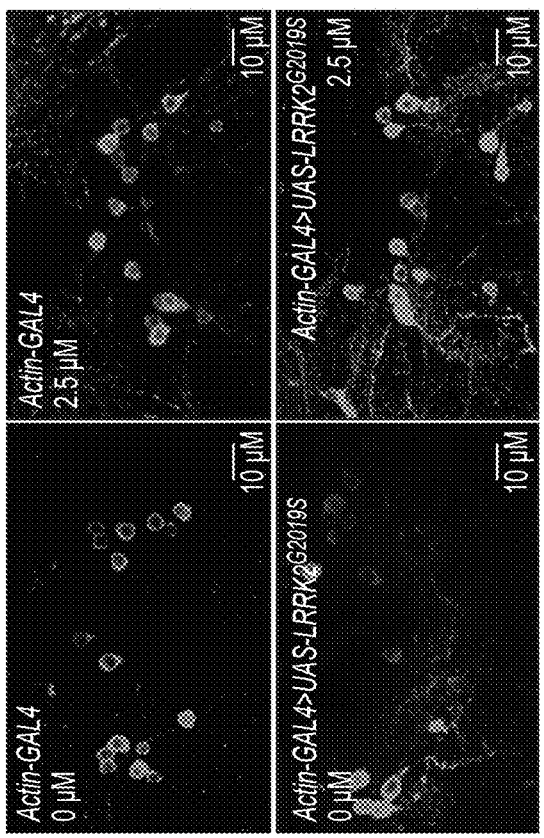

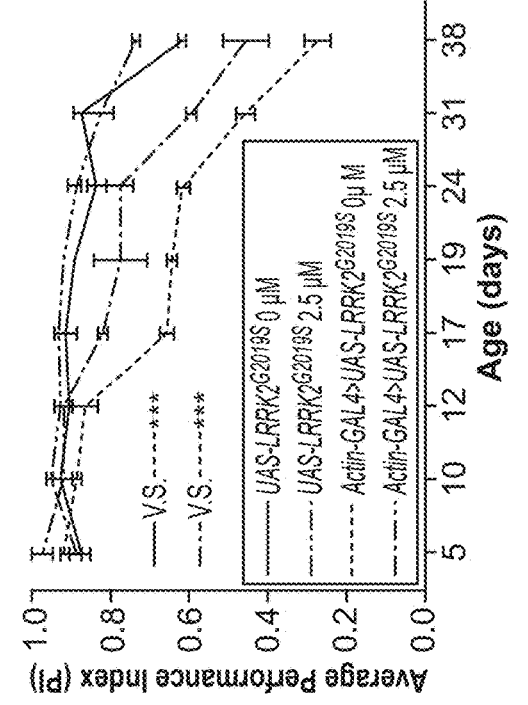
FIG. 4E
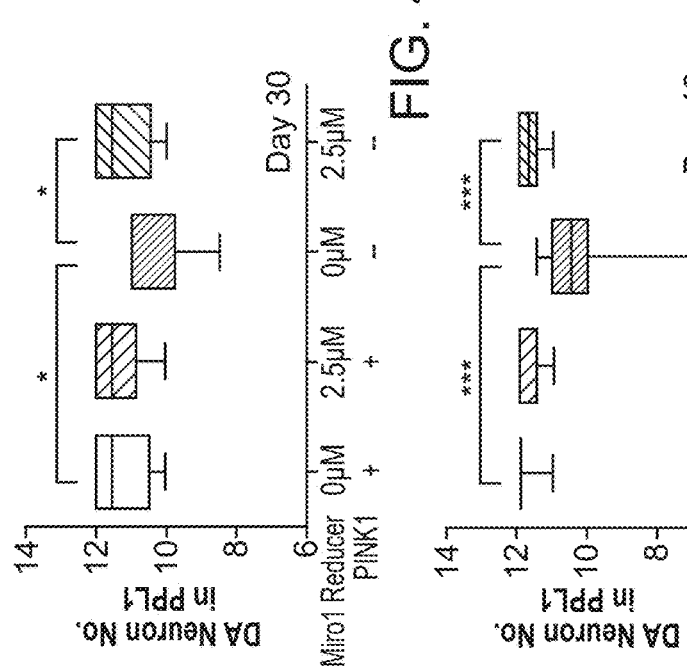
FIG. 4F
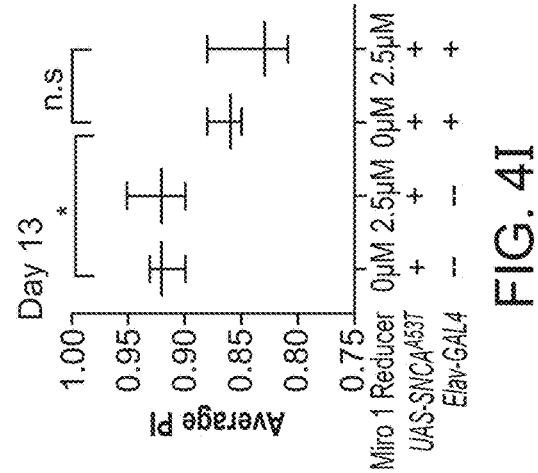
FIG. 4G
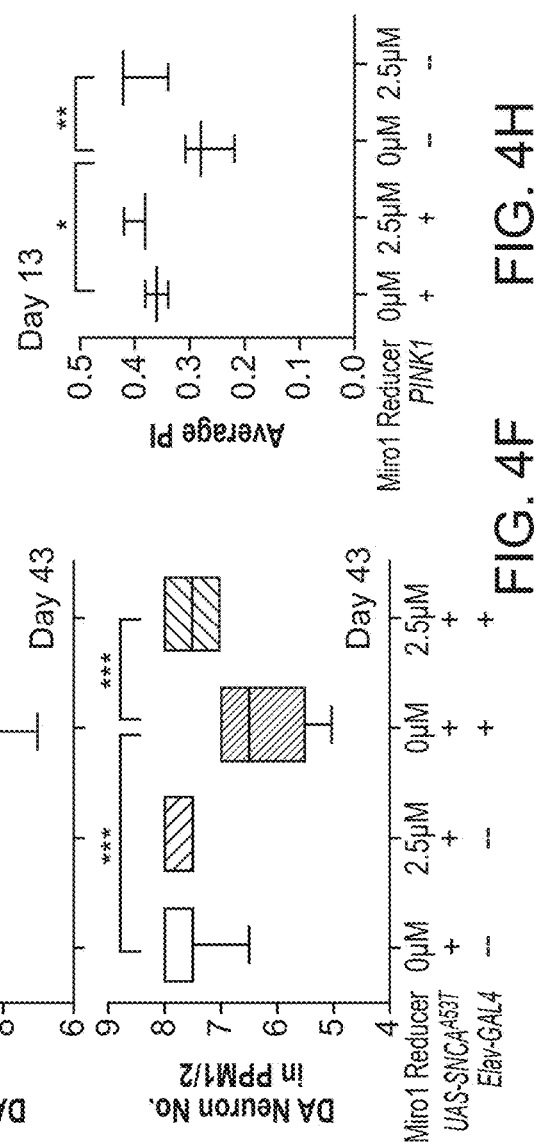
FIG. 4H
FIG. 4I

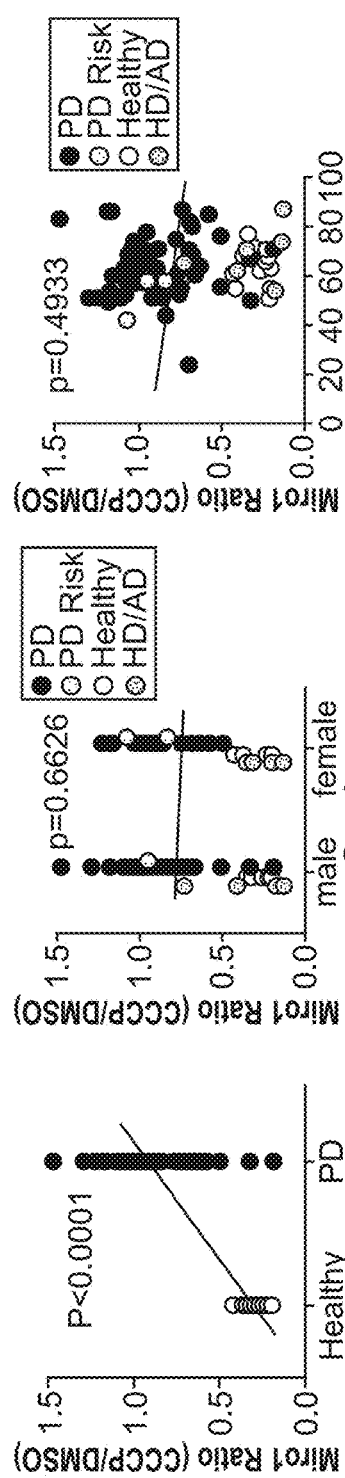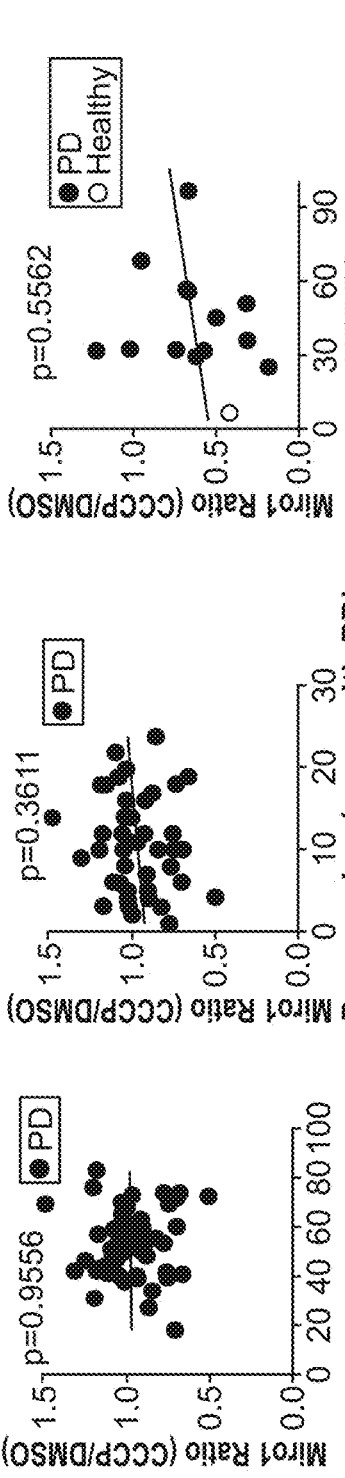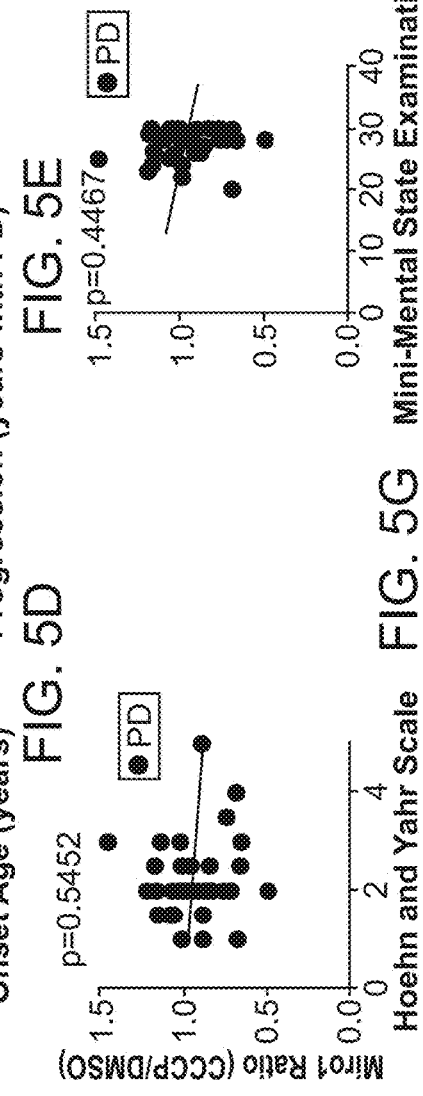

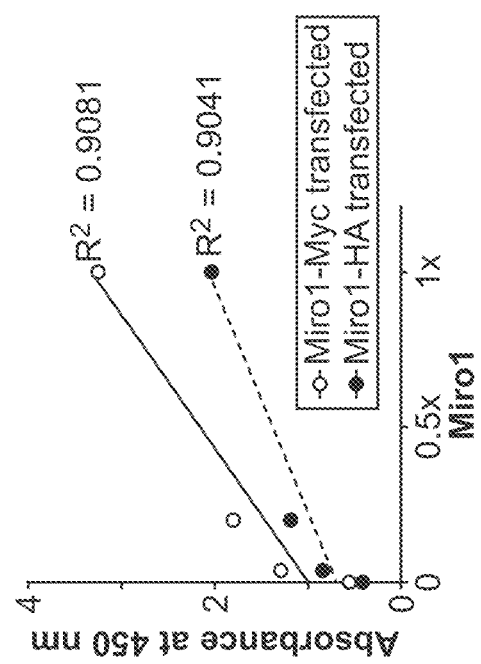
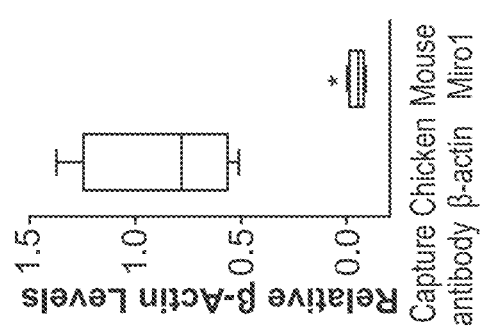
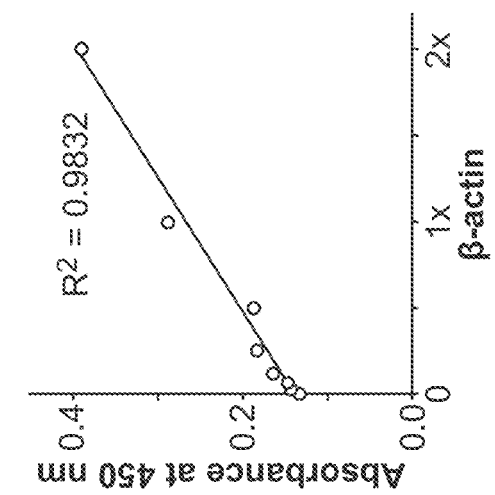
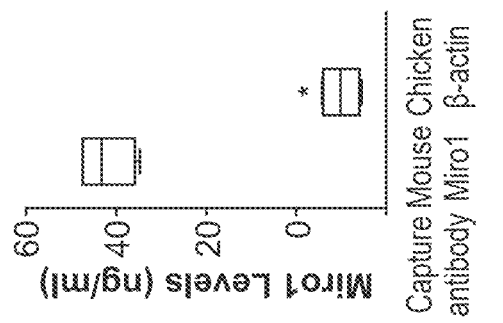
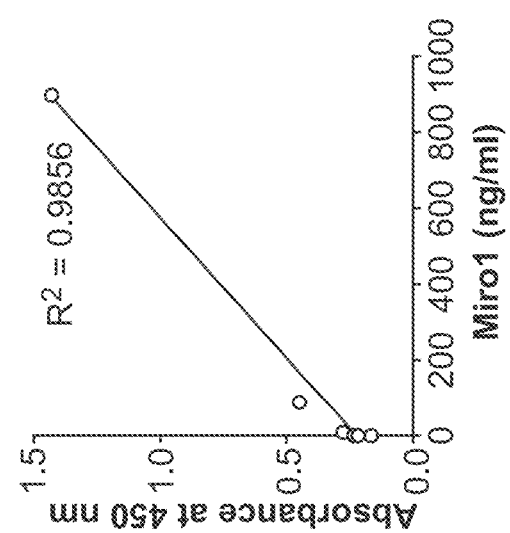
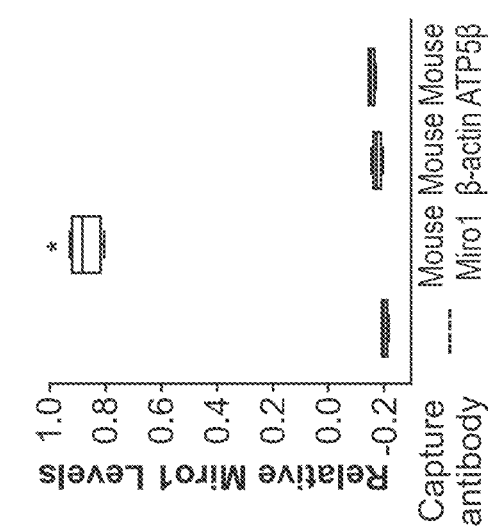
FIG. 6B
FIG. 6C
FIG. 6D
FIG. 6E
FIG. 6F
FIG. 6G

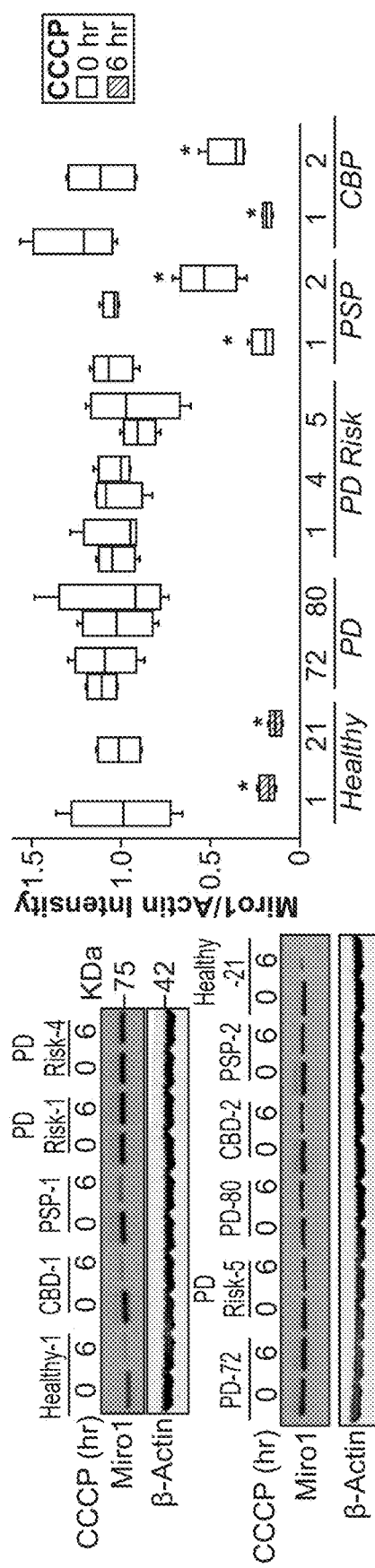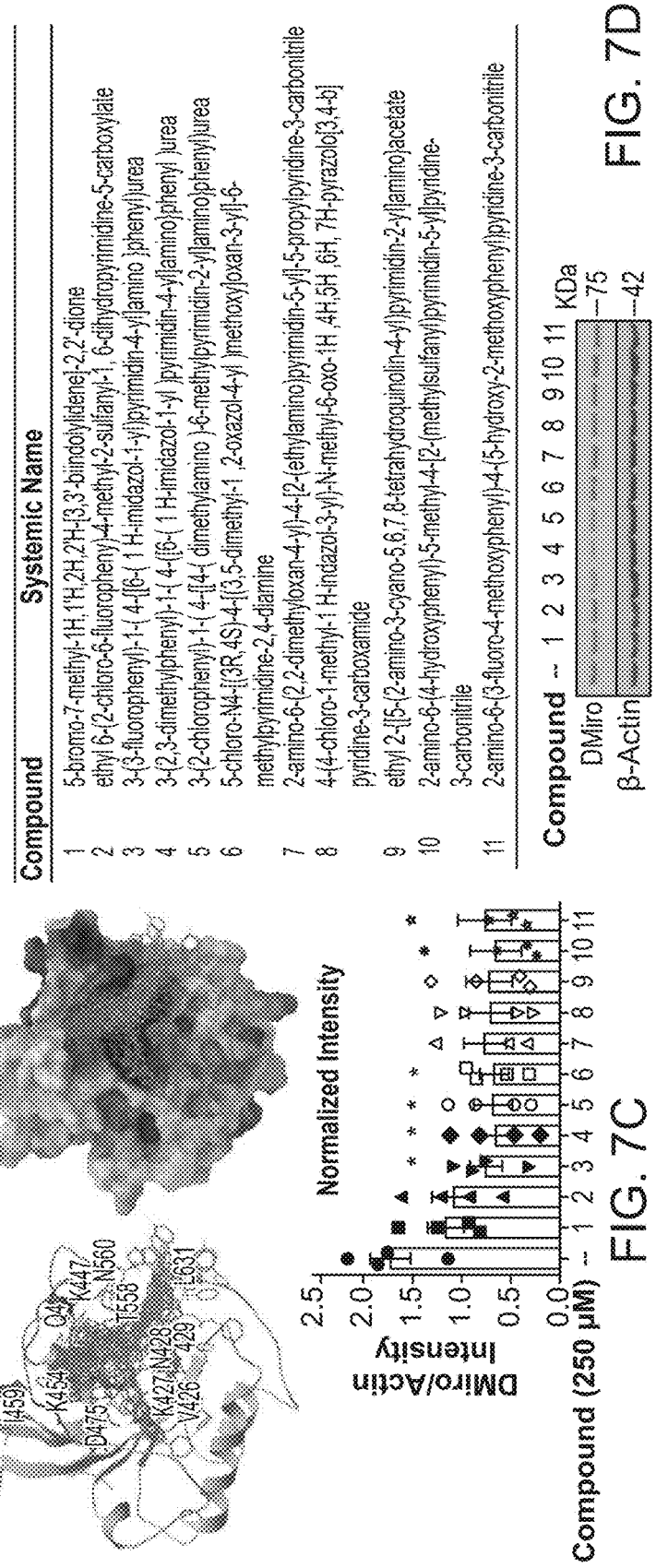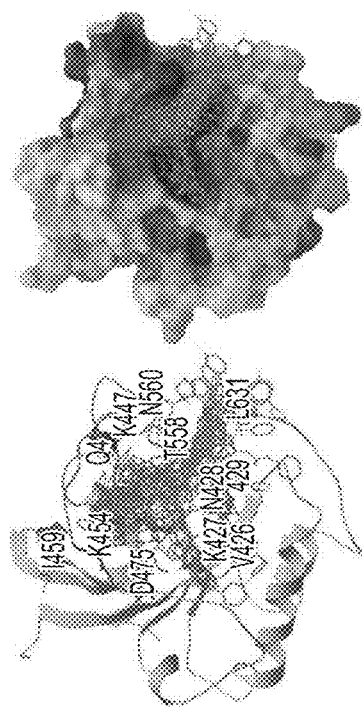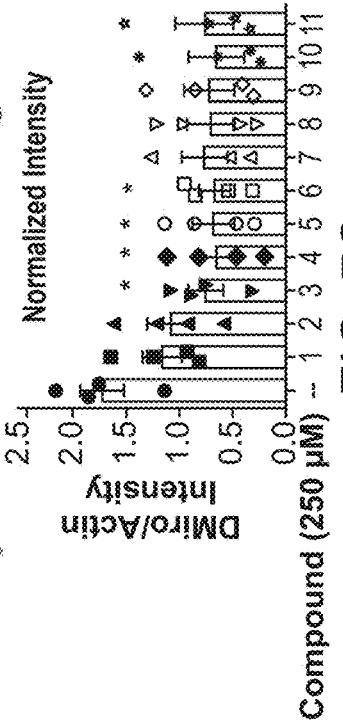

| Compound | Systemic Name |
|---|---|
| 1 | 5-bromo-7-methyl-1H,1H,2H,2H-[3,3'-biindolylidene]-2,2'-dione |
| 2 | ethyl 6-(2-chloro-6-fluorophenyl)-4-methyl-2-sulfanyl-1,6-dihydropyrimidine-5-carboxylate |
| 3 | 3-(3-fluorophenyl)-1-{4-[[6-(1H-imidazol-1-yl)pyrimidin-4-yl]amino]phenyl}urea |
| 4 | 3-(2,3-dimethylphenyl)-1-(4-{[6-(1H-imidazol-1-yl)pyrimidin-4-yl]amino}phenyl)urea |
| 5 | 3-(2-chlorophenyl)-1-(4-{[4-(dimethylamino)-6-methylpyrimidin-2-yl]amino}phenyl)urea |
| 6 | 5-chloro-N4-[(3R,4S)-4-[(3,5-dimethyl-1,2-oxazol-4-yl)methoxy]oxan-3-yl]-6-methylpyrimidine-2,4-diamine |
| 7 | 2-amino-6-(2,2-dimethyloxan-4-yl)-4-[2-(ethylamino)pyrimidin-5-yl]-5-propylpyridine-3-carbonitrile |
| 8 | 4-(4-chloro-1-methyl-1H-indazol-3-yl)-N-methyl-6-oxo-1H,4H,5H,6H,7H-pyrazolo[3,4-b]pyridine-3-carboxamide |
| 9 | ethyl 2-{[5-(2-amino-3-cyano-5,6,7,8-tetrahydroquinolin-4-yl)pyrimidin-2-yl]amino}acetate |
| 10 | 2-amino-6-(4-hydroxyphenyl)-5-methyl-4-[2-(methylsulfanyl)pyrimidin-5-yl]pyridine-3-carbonitrile |
| 11 | 2-amino-6-(3-fluoro-4-methoxyphenyl)-4-(5-hydroxy-2-methoxyphenyl)pyridine-3-carbonitrile |

FIG. 7D

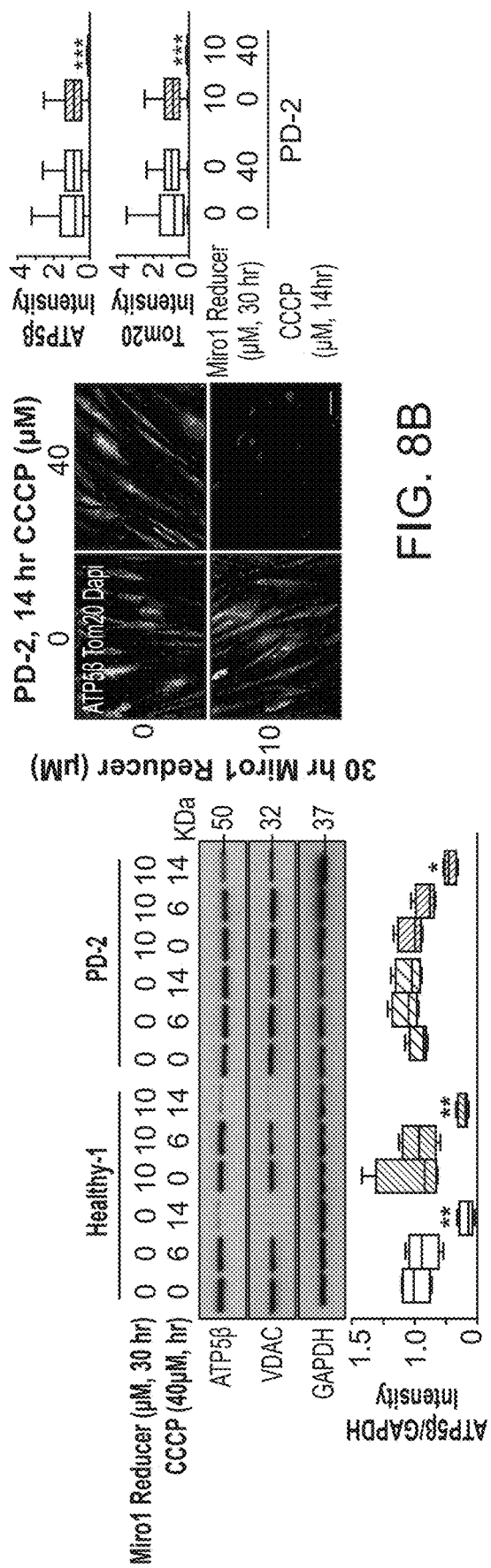
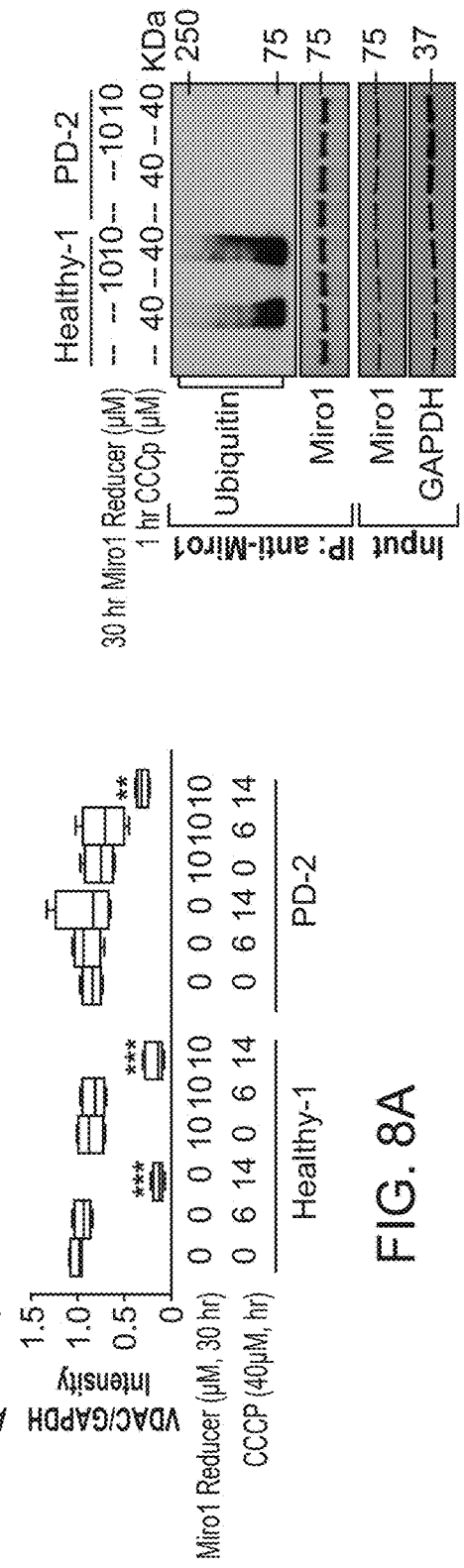
FIG. 8A
FIG. 8B
FIG. 8C

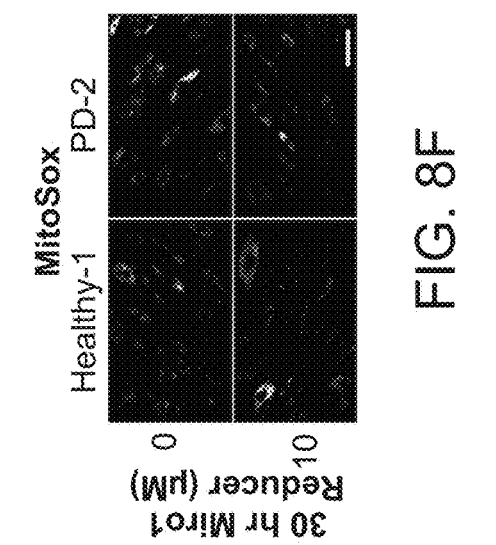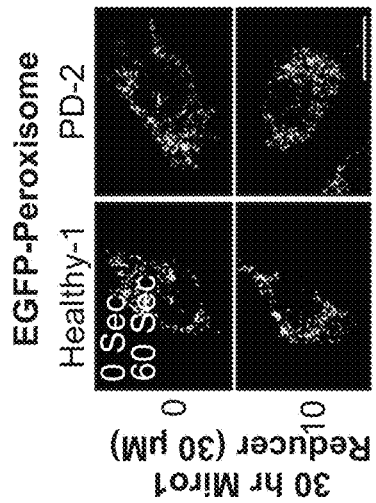
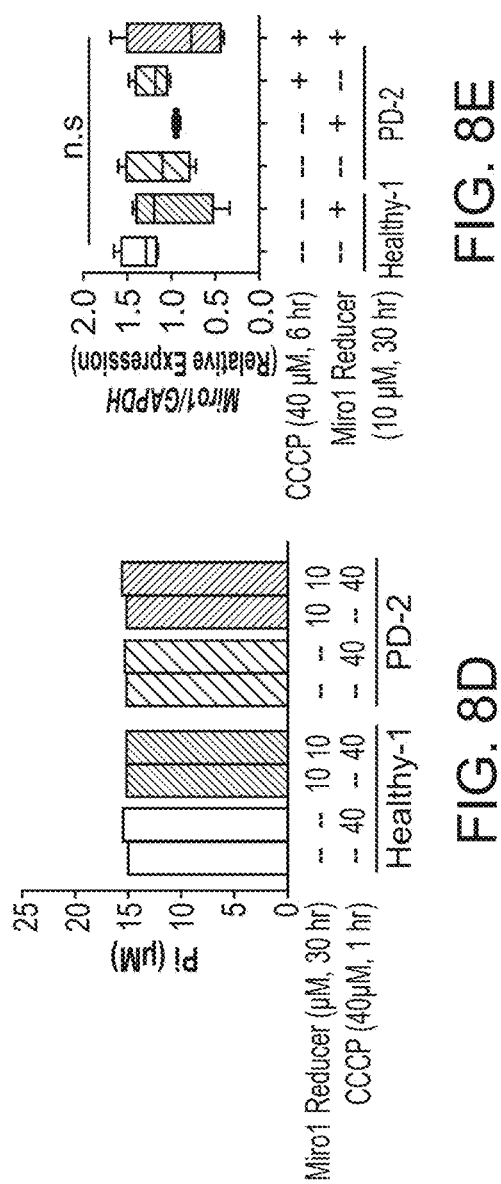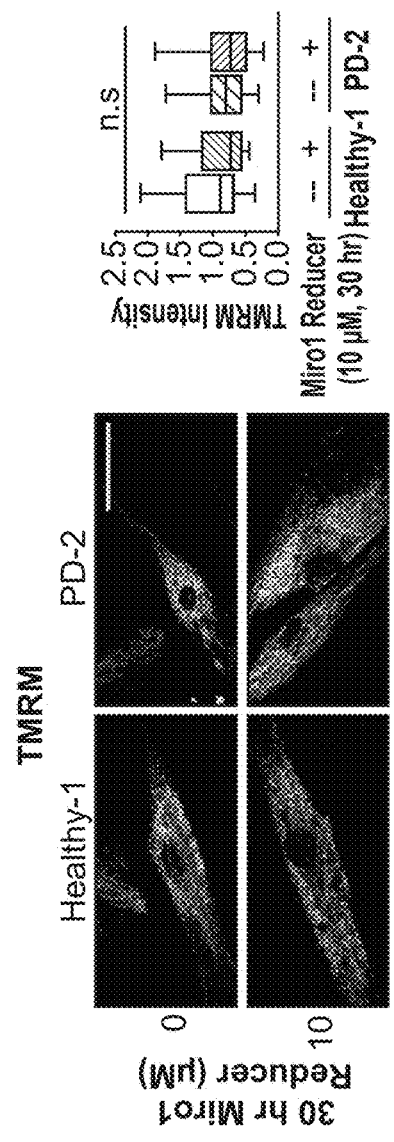
FIG. 8D  FIG. 8E  FIG. 8F
FIG. 8G  FIG. 8H

| ID | Name | Mutation | Age at Sampling (years) | Age at Onset (years) | Sex | Family History | UPDRS (sampling) | Hoehn and Yahr (sampling) | MMSE (sampling) | Source | n | Miro1 (DMSO/CCCP) Mean± S.E.M. | p |
|---|---|---|---|---|---|---|---|---|---|---|---|---|---|
| 1815 | Healthy-1 | wild-type | 62 | | male | | | | | Dr. Pera | 35 | 1.000±0.018 0.264±0.029 | <0.0001 |
| ND34769 | Healthy-2 | wild-type | 68 | | female | | | | | NINDS | 4 | 1.068±0.129 0.387±0.106 | 0.0286 |
| ND29510 | Healthy-3 | wild-type | 55 | | female | | | | | NINDS | 4 | 1.060±0.115 0.439±0.113 | 0.0286 |
| ND29178 | Healthy-4 | wild-type | 66 | | male | | | | | NINDS | 4 | 0.863±0.187 0.201±0.084 | 0.0286 |
| ND29179 | Healthy-5 | wild-type | 68 | | male | | | | | NINDS | 4 | 0.930±0.092 0.196±0.053 | 0.0286 |
| ND29194 | Healthy-6 | wild-type | 51 | | female | | | | | NINDS | 4 | 1.038±0.067 0.225±0.037 | 0.0286 |
| ND36091 | Healthy-7 | wild-type | 63 | | female | | | | | NINDS | 6 | 0.929±0.048 0.181±0.035 | 0.0022 |
| ND38530 | Healthy-8 | wild-type | 55 | | male | | | | | NINDS | 4 | 1.043±0.038 0.204±0.028 | 0.0286 |
| ND34770 | Healthy-9 | wild-type | 72 | | male | | | | | NINDS | 4 | 0.929±0.031 0.288±0.064 | 0.0286 |
| ND35044 | Healthy-10 | wild-type | 77 | | male | | | | | NINDS | 4 | 1.009±0.011 0.336±0.034 | 0.0286 |
| ND36320 | Healthy-11 | wild-type | 71 | | female | | | | | NINDS | 4 | 1.160±0.086 0.264±0.042 | 0.0286 |
| PPMI3428 | Healthy-12 | wild-type | 61 | | female | | 6 | | | PPMI | 4 | 1.279±0.145 0.544±0.093 | 0.0286 |
| ND29970 | HD-1 | HD CAG:40 | 65 | | male | | | | | NINDS | 4 | 0.941±0.055 0.683±0.061 | 0.0286 |
| ND30013 | HD-2 | HD CAG:43 | 54 | | male | | | | | NINDS | 4 | 0.948±0.145 0.162±0.065 | 0.0286 |
| ND30259 | HD-3 | HD CAG:38 | 74 | | female | | | | | NINDS | 4 | 1.097±0.182 0.144±0.049 | 0.0286 |
| ND30626 | HD-4 | HD CAG:41 | 62 | | male | | | | | NINDS | 4 | 1.038±0.101 0.419±0.061 | 0.0286 |
| ND31009 | HD-5 | HD CAG: 40,49 | 87 | | male | | | | | NINDS | 4 | 1.131±0.14 0.135±0.058 | 0.0286 |
| ND33947 | HD-6 | HD CAG:40 | 71 | | female | | | | | NINDS | 4 | 1.193±0.077 0.417±0.055 | 0.0286 |
| ND34730 | AD-1 | PSEN1 GLU184ASP | N/A | | male | | | | | NINDS | 4 | 0.947±0.037 0.159±0.026 | 0.0286 |

| ID | Code | Mutation | Col4 | Col5 | Sex | Y/N | Col8 | Col9 | Source | Col11 | Value | p-value |
|---|---|---|---|---|---|---|---|---|---|---|---|---|
| ND34732 | AD-2 | PSEN1 MET146ILE | N/A | | female | | | | NINDS | 4 | 0.927±0.161 | 0.0286 |
| ND34733 | AD-3 | PSEN1 PRO264LEU | N/A | | male | | | | NINDS | 4 | 0.283±0.076 1.026±0.201 | 0.0286 |
| ND41001 | AD-4 | PSEN1 Intron 4 | N/A | | female | | | | NINDS | 4 | 0.827±0.05 0.177±0.068 | 0.0286 |
| ND39957 | PD-1 | | 70 | 68 | female | N | | 24 | NINDS | 3 | 0.159±0.041 0.989±0.138 | >0.9999 |
| ND39999 | PD-2 | | 63 | 41 | male | N | 1.5 | 28 | NINDS | 3 | 0.979±0.129 0.881±0.263 | >0.9999 |
| ND30159 | PD-3 | | 76 | 72 | female | N | 2 | 28 | NINDS | 5 | 0.961±0.344 0.946±0.072 | 0.0317 |
| ND31508 | PD-4 | | 71 | 54 | male | Y | 2 | 26 | NINDS | 3 | 0.470±0.120 1.045±0.061 | 0.4 |
| ND31717 | PD-5 | | 51 | 27 | female | N | 2.5 | 27 | NINDS | 3 | 0.913±0.094 1.065±0.131 | 0.7 |
| ND32462 | PD-6 | | 75 | 74 | male | N | 2 | 28 | NINDS | 3 | 0.909±0.09 1.088±0.157 | 0.4 |
| ND32697 | PD-7 | | 58 | 55 | male | N | 2 | 30 | NINDS | 3 | 0.831±0.098 1.127±0.096 | 0.4 |
| ND41125 | PD-8 | | 70 | 63 | male | N | 2 | 27 | NINDS | 3 | 0.916±0.109 1.053±0.226 | >0.9999 |
| ND35322 | PD-9 | | 61 | 49 | male | N | 2 | 30 | NINDS | 3 | 0.950±0.352 0.903±0.022 | >0.9999 |
| ND37609 | PD-10 | | 68 | 62 | male | N | 2 | | NINDS | 3 | 0.952±0.066 0.968±0.038 | >0.9999 |
| ND38791 | PD-11 | | 69 | 49 | female | Y | 2 | 26 | NINDS | 3 | 0.968±0.029 1.041±0.074 | 0.7 |
| ND38865 | PD-12 | | 51 | 45 | male | N | | 29 | NINDS | 3 | 1.072±0.091 0.907±0.051 | >0.9999 |
| ND39528 | PD-13 | | 67 | 56 | female | N | 2 | 30 | NINDS | 3 | 1.001±0.164 0.935±0.050 | >0.9999 |
| ND39538 | PD-14 | | 72 | 61 | female | N | | 22 | NINDS | 3 | 0.925±0.037 0.938±0.002 | 0.7 |
| ND33424 | PD-15 | | 57 | 47 | male | N | 2 | 30 | NINDS | 3 | 0.926±0.037 0.979±0.025 | >0.9999 |
| ND34854 | PD-16 | | 68 | 65 | female | Y | 1 | 30 | NINDS | 3 | 1.027±0.133 1.053±0.050 | >0.9999 |
| ND35425 | PD-17 | | 49 | 31 | female | N | 2 | 29 | NINDS | 3 | 1.069±0.043 1.046±0.020 | 0.7 |
| ND39183 | PD-18 | | 70 | 54 | male | N | | 26 | NINDS | 3 | 1.234±0.295 1.148±0.078 1.053±0.072 | 0.7 |

| | | | | | | | | | | | | |
|---|---|---|---|---|---|---|---|---|---|---|---|---|
| ND39510 | PD-19 | | 69 | 50 | male | N | | 2 | 28 | NINDS | 3 | 1.042±0.040 | 0.7 |
| ND39955 | PD-20 | | 55 | 50 | male | N | | 1.5 | 30 | NINDS | 3 | 1.120±0.209 / 1.118±0.087 | 0.4 |
| ND34106 | PD-21 | | 65 | 59 | male | Y | | 1.5 | 25 | NINDS | 3 | 1.003±0.040 / 0.880±0.065 | 0.7 |
| ND35302 | PD-22 | | 69 | 58 | male | N | | 2 | 30 | NINDS | 3 | 0.938±0.057 / 0.998±0.097 | 0.7 |
| ND35976 | PD-23 | | 63 | 59 | male | N | | 1 | 30 | NINDS | 3 | 1.012±0.093 / 1.106±0.176 | 0.7 |
| ND38020 | PD-24 | | 86 | 76 | male | Y | | 2.5 | 23 | NINDS | 3 | 0.990±0.135 / 0.944±0.027 | 0.7 |
| ND38528 | PD-25 | | 65 | 61 | female | N | | 2 | 29 | NINDS | 3 | 1.121±0.124 / 0.975±0.020 | 0.7 |
| ND32157 | PD-26 | | 52 | 42 | female | N | | 2 | 28 | NINDS | 4 | 0.996±0.058 / 1.073±0.112 | 0.0571 |
| ND35843 | PD-27 | | 61 | 53 | male | Y | | 2 | 30 | NINDS | 4 | 0.802±0.048 / 1.225±0.098 | 0.0857 |
| ND37132 | PD-28 | | 66 | 60 | male | N | | 1 | 30 | NINDS | 4 | 0.932±0.025 / 1.180±0.080 | 0.0286 |
| PPMI 3407 | PD-29 | | 69 | 39 | male | N | 56 | | | PPMI | 4 | 0.808±0.055 / 1.025±0.068 | 0.2000 |
| PPMI 3409 | PD-30 | | 67 | | male | N | 51 | | | PPMI | 4 | 0.681±0.197 / 1.223±0.281 | 0.0286 |
| PPMI 3419 | PD-31 | | 71 | | male | N | 25 | | | PPMI | 4 | 0.395±0.281 / 1.459±0.174 | 0.0286 |
| PPMI 3431 | PD-32 | | 64 | | female | Y | 29 | | | PPMI | 4 | 0.269±0.109 / 1.199±0.160 | 0.3429 |
| PPMI 3433 | PD-33 | | 85 | | female | Y | 32 | | | PPMI | 4 | 0.749±0.370 / 1.236±0.085 | 0.1143 |
| PPMI 3434 | PD-34 | | 57 | | male | Y | 68 | | | PPMI | 4 | 0.713±0.169 / 0.998±0.106 | 0.6857 |
| PPMI 3443 | PD-35 | | 56 | | male | N | 45 | | | PPMI | 4 | 0.953±0.081 / 1.316±0.170 | 0.1143 |
| PPMI 3444 | PD-36 | | 71 | | male | N | 57 | | | PPMI | 4 | 0.659±0.206 / 1.094±0.266 | 0.3429 |
| PPMI 3445 | PD-37 | | 50 | | male | N | 36 | | | PPMI | 4 | 0.749±0.383 / 1.381±0.158 | 0.0286 |
| PPMI 4051 | PD-38 | | 55 | | female | N | 32 | | | PPMI | 4 | 0.441±0.168 / 1.010±0.153 | 0.3429 |
| ND32975 | PD-39 | LRRK2 | 74 | 60 | female | Y | | 3 | 26 | NINDS | 3 | 0.749±0.071 / 1.043±0.237 / 1.077±0.260 | >0.9999 |

FIG. 9A (Cont. 2)

| | | | | | | | | | | | | |
|---|---|---|---|---|---|---|---|---|---|---|---|---|
| ND29492 | PD-40 | LRRK2 | 72 | 58 | male | Y | | | NINDS | 4 | 0.885 ± 0.224 | >0.9999 |
| ND29802 | PD-41 | LRRK2 | 52 | 40 | male | N | | 30 | NINDS | 5 | 0.919±0.142 | 0.5476 |
| ND30244 | PD-42 | LRRK2 | 73 | 59 | male | N | | 28 | NINDS | 3 | 0.727 ± 0.157 | >0.999 |
| ND32973 | PD-43 | LRRK2 | 72 | 62 | male | Y | | | NINDS | 3 | 1.107±0.111 | >0.9999 |
| ND33965 | PD-44 | LRRK2 | 87 | 69 | female | Y | | | NINDS | 3 | 1.098±0.087 | >0.9999 |
| ND32954 | PD-45 | LRRK2 | 60 | 41 | male | Y | 96.5 | 28 | NINDS | 4 | 1.267 ± 0.237 | 0.2 |
| ND37517 | PD-46 | LRRK2 | 78 | 73 | female | N | | | NINDS | 4 | 1.271±0.202 | 0.2 |
| ND38136 | PD-47 | LRRK2 | 86 | 83 | female | Y | | 24 | NINDS | 3 | 1.059±0.167 | 0.2 |
| ND37757 | PD-48 | LRRK2 | 83 | 69 | male | Y | | 25 | NINDS | 3 | 0.775±0.143 | 0.7 |
| ND34235 | PD-49 | LRRK2 | 71 | 60 | male | N | | 28 | NINDS | 3 | 1.158 ± 0.185 | 0.4 |
| ND34267 | PD-50 | LRRK2 | 63 | 55 | male | N | | 30 | NINDS | 3 | 0.765±0.222 | 0.1 |
| ND38262 | PD-51 | LRRK2 | 60 | 57 | male | Y | | 26 | NINDS | 3 | 0.965 ± 0.018 | >0.9999 |
| ND27760 | PD-52 | SNCA | 55 | 50 | female | Y | | | NINDS | 3 | 0.920±0.049 | 0.4 |
| ND40996 | PD-53 | SNCA | 51 | 39 | female | N/A | | | NINDS | 9 | 0.901±0.026 | 0.4894 |
| ND40997 | PD-54 | SNCA | 51 | 42 | male | N | | | NINDS | 3 | 1.049±0.139 | 0.4 |
| ND37732 | PD-55 | PARK2 | 63 | 39 | female | Y | | | NINDS | 3 | 0.931±0.044 | 0.1 |
| ND29968 | PD-56 | PARK2 | 44 | 34 | male | N | | 30 | NINDS | 4 | 1.37 ± 0.237 | 0.1143 |
| ND29369 | PD-57 | PARK2 | 61 | 43 | female | N | | 29 | NINDS | 5 | 1.069±0.12 | 0.6905 |
| ND40078 | PD-58 | PARK2 | 51 | 46 | female | Y | 31.5 | | NINDS | 3 | 1.025±0.057 | 0.4 |
| ND30171 | PD-59 | PARK2 | 54 | 42 | male | N | | 30 | NINDS | 3 | 0.948±0.069 | 0.4 |
| ND37731 | PD-60 | PARK2 | 64 | 38 | female | Y | | | NINDS | 3 | 0.981±0.084 | 0.1 |

FIG. 9A (Cont. 3)

| | | | | | | | | | | | | |
|---|---|---|---|---|---|---|---|---|---|---|---|---|
| ND41014 | PD-61 | GBA | 59 | 50 | male | N/A | | | | NINDS | 3 | 0.980±0.087 / 0.979±0.131 | >0.9999 |
| ND41016 | PD-62 | GBA | 52 | 42 | male | N/A | | | | NINDS | 3 | 1.107±0.072 / 1.193±0.275 | >0.9999 |
| ND41015 | PD-63 | GBA | 63 | 57 | male | N/A | | | | NINDS | 3 | 1.107±0.046 / 1.145±0.079 | >0.9999 |
| ND34982 | PD-64 | GBA | 82 | 72 | female | N | | 4 | 20 | NINDS | 4 | 0.720±0.117 / 0.494±0.154 | 0.4857 |
| ND37180 | PD-65 | GBA | 80 | 74 | male | N | | 2.5 | | NINDS | 4 | 0.958±0.059 / 0.642±0.108 | 0.0571 |
| ND34263 | PD-66 | GBA | 65 | 40 | male | Y | | | | NINDS | 3 | 1.008±0.093 / 0.939±0.151 | >0.9999 |
| ND40069 | PD-67 | C9ORF72* | 75 | 70 | female | N | 32 | | 30 | NINDS | 3 | 1.046±0.184 / 1.067±0.163 | 0.7 |
| ND29370 | PD-68 | LRRK2, PARK2 | 56 | 40 | male | Y | | 2.5 | | NINDS | 3 | 1.102±0.092 / 1.127±0.201 | 0.6857 |
| ND32974 | PD-69 | PLA2G6 | 24 | 18 | male | Y | | | 30 | NINDS | 4 | 0.798±0.163 / 0.556±0.198 | 0.4 |
| ND41010 | PD-70 | PARK2, PINK1 | 58 | 48 | male | N/A | | | | NINDS | 3 | 1.123±0.176 / 0.973±0.100 | 0.6857 |
| ND34980 | PD-71 | GBA, LRRK2 | 58 | 51 | male | N | | 2 | | NINDS | 4 | 0.643±0.114 / 0.692±0.085 | 0.4 |
| ND32943 | Risk-1 | LRRK2 | 58 | | female | Y | | | | NINDS | 3 | 0.891±0.086 / 0.745±0.066 | >0.9999 |
| ND32944 | Risk-2 | LRRK2 | 58 | | male | Y | | | | NINDS | 3 | 0.761±0.156 / 0.722±0.153 | >0.9999 |
| ND40065 | Risk-3 | SNCA | 42 | | female | Y | | | | NINDS | 3 | 0.908±0.163 / 0.971±0.250 | >0.9999 |

*Diagnosed with PD at the time of sampling, responded to L-dopa, with intermediate repeats.

FIG. 9A (Cont. 4)

| ID | Name | Mutation | Age at Sampling (Years) | Sex | Family History | Source |
|---|---|---|---|---|---|---|
| 3900004 | Healthy-13 | wild-type | 86 | male | | Stanford ADRC |
| 3900005 | Healthy-14 | wild-type | 75 | male | | Stanford ADRC |
| 3900007 | Healthy-15 | wild-type | 66 | male | | Stanford ADRC |
| 3900008 | Healthy-16 | wild-type | 66 | female | | Stanford ADRC |
| 3900010 | Healthy-17 | wild-type | 67 | male | | Stanford ADRC |
| 3900012 | Healthy-18 | wild-type | 69 | male | | Stanford ADRC |
| 3900013 | Healthy-19 | wild-type | 85 | male | | Stanford ADRC |
| 3900014 | Healthy-20 | wild-type | 64 | female | | Stanford ADRC |
| 3900015 | Healthy-21 | wild-type | 82 | male | | Stanford ADRC |
| 3900016 | Healthy-22 | wild-type | 73 | female | | Stanford ADRC |
| 3900018 | Healthy-23 | wild-type | 70 | female | | Stanford ADRC |
| 3900019 | Healthy-24 | wild-type | 78 | female | | Stanford ADRC |
| 3900021 | Healthy-25 | wild-type | 79 | male | | Stanford ADRC |
| 3900022 | Healthy-26 | wild-type | 68 | male | | Stanford ADRC |
| 3900029 | Healthy-27 | wild-type | 62 | female | | Stanford ADRC |
| 3900031 | Healthy-28 | wild-type | 71 | male | | Stanford ADRC |
| 3900032 | Healthy-29 | wild-type | 75 | male | | Stanford ADRC |
| 3900033 | Healthy-30 | wild-type | 78 | female | | Stanford ADRC |

FIG. 9B

| 3900050 | Healthy-31 | wild-type | 71 | female | Stanford ADRC |
|---|---|---|---|---|---|
| 3900052 | Healthy-32 | wild-type | 72 | female | Stanford ADRC |
| 3900054 | Healthy-33 | wild-type | 68 | female | Stanford ADRC |
| 3900055 | Healthy-34 | wild-type | 75 | female | Stanford ADRC |
| 3900056 | Healthy-35 | wild-type | 74 | female | Stanford ADRC |
| 3900057 | Healthy-36 | wild-type | 67 | male | Stanford ADRC |
| 3900058 | Healthy-37 | wild-type | 75 | female | Stanford ADRC |
| 3900059 | Healthy-38 | wild-type | 67 | female | Stanford ADRC |
| 3900064 | Healthy-39 | wild-type | 75 | male | Stanford ADRC |
| 3900076 | Healthy-40 | wild-type | 70 | female | Stanford ADRC |
| 3900078 | Healthy-41 | wild-type | 68 | female | Stanford ADRC |
| 3900079 | Healthy-42 | wild-type | 69 | female | Stanford ADRC |
| 3900081 | Healthy-43 | wild-type | 63 | female | Stanford ADRC |
| 3900084 | Healthy-44 | wild-type | 71 | female | Stanford ADRC |
| 3900087 | Healthy-45 | wild-type | 70 | female | Stanford ADRC |
| 3900100 | Healthy-46 | wild-type | 80 | female | Stanford ADRC |
| 3900089 | Healthy-47 | wild-type | 64 | male | Stanford ADRC |
| 3900090 | Healthy-48 | wild-type | 77 | female | Stanford ADRC |
| 3900102 | Healthy-49 | wild-type | 79 | female | Stanford ADRC |

FIG. 9B (Cont. 1)

| | | | | | |
|---|---|---|---|---|---|
| 3900103 | Healthy-50 | wild-type | 66 | male | Stanford ADRC |
| 3900105 | Healthy-51 | wild-type | 73 | female | Stanford ADRC |
| 3900116 | Healthy-52 | wild-type | 77 | female | Stanford ADRC |
| 3900037 | PD-72 | | 66 | male | Stanford ADRC |
| 3900040 | PD-73 | | 67 | female | Stanford ADRC |
| 3900074 | PD-74 | | 63 | male | Stanford ADRC |
| 3900086 | PD-75 | | 77 | male | Stanford ADRC |
| 3900122 | PD-76 | | 71 | female | Stanford ADRC |
| 3900141 | PD-77 | | 70 | male | Stanford ADRC |
| 3900153 | PD-78 | | 75 | female | Stanford ADRC |
| AG08395 | PD-79 | | 85 | female | Coriell |
| AG20442 | PD-80 | | 53 | male | Coriell |
| AG20443 | PD-81 | | 71 | male | Coriell |
| AG20445 | PD-82 | | 60 | male | Coriell |
| AG20446 | PD-83 | | 57 | male | Coriell |
| 3900077 | DLB-1 | | 72 | male | Stanford ADRC |
| 3900098 | DLB-2 | | 60 | male | Stanford ADRC |
| 3900126 | DLB-3 | | 73 | male | Stanford ADRC |
| 3900020 | DLB-4 | | 80 | male | Stanford ADRC |

| | | | | | |
|---|---|---|---|---|---|
| | | | | N | |
| | | | | N | |
| | | | | Y | |
| | | | | N | |
| | | | | N | |
| | | | | N | |
| | | | | N | |
| | | | | N/A | |
| | | | | N/A | |
| | | | | N | |
| | | | | N | |
| | | | | N/A | |
| | | | | N | |
| | | | | N | |
| | | | | N | |
| | | | | N | |

FIG. 9B (Cont. 2)

| | | | | |
|---|---|---|---|---|
| MC0149 | PSP-1 | | 84 | male | N | Mayo Clinic |
| MC0164 | PSP-2 | | 60 | female | N | Mayo Clinic |
| MC0206 | PSP-3 | | 77 | male | N | Mayo Clinic |
| MC0147 | CBD-1 | | 56 | female | N | Mayo Clinic |
| MC0179 | CBD-2 | | 66 | female | N | Mayo Clinic |
| MC0087 | Risk-5* (Prodromal) | SNCA duplication | 43 | female | Y | Mayo Clinic |
| MC0076 | Risk-4 | SNCA duplication | 37 | male | Y | Mayo Clinic |
| MC0095 | Risk-1 | LRRK2R1441C | 58 | female | Y | Mayo Clinic |
| GM21752 | FTD-1 | VCP | 46 | male | Y | Coriell |
| GM22369 | FTD-2 | VCP | 42 | male | Y | Coriell |
| ND42493 | FTD-3 | PGRN | 54 | female | Y | NINDS |

\* Converted to PD after sample collection

Demographic Information and Miro1 Values.

| Disease | No. (Miro1 DMSO v.s. CCCP P<0.05) | No. (Miro1 DMSO v.s. CCCP P>0.05) | P (Fisher Exact) compared to PD | No. confirmed by ELISA | No. confirmed by Western |
|---|---|---|---|---|---|
| PD | 5 | 78 (94%) |  |  | 73 |
| PD Risk | 0 | 5 (100%) | 1 | 24 | 5 |
| Healthy | 52 | 0 (0%) | <0.00001 | 5 | 12 |
| HD | 6 | 0 (0%) | <0.0001 | 52 | 6 |
| AD | 4 | 0 (0%) | <0.0001 | 2 | 4 |
| DLB | 4 | 0 (0%) | <0.0001 | 1 | 0 |
| PSP | 3 | 0 (0%) | 0.0005 | 4 | 2 |
| CBD | 2 | 0 (0%) | 0.0059 | 3 | 2 |
| FTD | 3 | 0 (0%) | 0.0005 | 2 | 0 |

Summary of the Miro1 Phenotype in All Subjects Used in This Study.

FIG. 11A

| ID | Name | Passage | Miro1 Ratio (CCCP/DMSO) | n |
|---|---|---|---|---|
| 1815 | Healthy-1 | 9 | 0.308±0.120 | 6 |
| 1815 | Healthy-1 | 10 | 0.400±0.049 | 3 |
| 1815 | Healthy-1 | 11 | 0.316±0.141 | 3 |
| 1815 | Healthy-1 | 12 | 0.241±0.173 | 3 |
| 1815 | Healthy-1 | 13 | 0.231±0.043 | 6 |
| 1815 | Healthy-1 | 14 | 0.196±0.052 | 3 |
| 1815 | Healthy-1 | 15 | 0.235±0.014 | 3 |
| 1815 | Healthy-1 | 16 | 0.153±0.018 | 3 |
| 1815 | Healthy-1 | 17 | 0.244±0.023 | 3 |
| 1815 | Healthy-1 | 18 | 0.298 | 1 |
| 1815 | Healthy-1 | 19 | 0.352 | 1 |
| ND27760 | PD-52 | 8 | 1.079±0.129 | 3 |
| ND27760 | PD-52 | 13 | 0.734±0.174 | 3 |
| ND27760 | PD-52 | 14 | 0.925±0.076 | 3 |
| ND30159 | PD-3 | 5 | 0.574±0.207 | 3 |
| ND30159 | PD-3 | 7 | 0.379±0.080 | 2 |
| ND29802 | PD-41 | 5 | 0.816±0.328 | 3 |
| ND29802 | PD-41 | 9 | 0.699±0.034 | 2 |
| ND29968 | PD-56 | 6 | 0.631±0.222 | 3 |
| ND29968 | PD-56 | 9 | 1.038±0.274 | 2 |

Miro1 Values in Cells with Different Passage Numbers.

FIG. 11B

SMALL MOLECULE THERAPEUTIC FOR PARKINSON'S DISEASE PAIRED WITH A BIOMARKER OF THERAPEUTIC ACTIVITY

CROSS REFERENCE

This application is a 371 and claims the benefit of Application No. PCT/US2020/049361, filed Sep. 4, 2020, which claims the benefit of U.S. Provisional Patent Application No. 62/896,450, filed Sep. 5, 2019, which applications are incorporated herein by reference in their entirety.

STATEMENT REGARDING FEDERALLY SPONSORED RESEARCH OR DEVELOPMENT

This invention was made with Government support under contract NS089583 awarded by the National Institutes of Health. The Government has certain rights in the invention.

BACKGROUND

Parkinson's disease (PD) is a debilitating movement disorder, characterized by a selective loss of dopaminergic neurons in the substantia nigra. Currently, there is no effective treatment or reliable pharmacodynamic biomarker to monitor the response to treatment and efficacy of drug targeting. The challenges in PD clinical practice limit moving experimental therapies from bench to bedside.

Mitochondrial dysfunction can result in a host of debilitating diseases or disorders characterized by poor growth, loss of muscle coordination, muscle weakness, visual problems, hearing problems, learning disabilities, heart disease, liver disease, kidney disease, gastrointestinal disorders, respiratory disorders, neurological problems, autonomic dysfunction, and/or dementia. In many instances, these diseases are caused by acquired or inherited mutations in mitochondrial DNA or in nuclear genes that code for mitochondrial components or for cellular components that act as quality control checkpoints of mitochondrial function.

Mitochondrial Rho GTPase 1 (Miro1) facilitates mitochondrial transport by attaching the mitochondria to the motor/adaptor complex. Through its key role in mitochondrial transport, Miro1 is involved in mitochondrial homeostasis and apoptosis. Miro associates with Milton (TRAK1/2) and the motor proteins kinesin and dynein to form the mitochondrial motor/adaptor complex. Miro tethers the complex to the mitochondrion, while the complex transports the mitochondrion via microtubules within cells.

In addition, Miro regulates mitochondrial fusion and mitophagy in conjunction with mitofusin. Damaged mitochondria are believed to be sequestered from healthy mitochondria by the degradation of Miro and mitofusin. Miro degradation halts their movement while mitofusin degradation prevents them from fusing with healthy mitochondria, thus facilitating their clearance by autophagosomes.

Miro1 is removed from the surface of depolarized mitochondria to stop their motility and to facilitate their following clearance via mitophagy. Miro removal from damaged mitochondria is mediated by at least two pathways—LRRK2 and the PINK1-Parkin axis. Mutations in LRRK2, PINK1, or Parkin cause familial PD, while the majority of PD cases are sporadic without an inheritance pattern. See, for example, Hsieh et al. (2016). Functional Impairment in Miro Degradation and Mitophagy Is a Shared Feature in Familial and Sporadic Parkinson's Disease. Cell Stem Cell 19, 709-724.

Although research is ongoing, effective early diagnostic and treatment options are currently limited. As such, there is a need for the development of new therapeutic agents and methodologies.

SUMMARY

Methods and compositions are provided for monitoring, treatment, and drug screening for Parkinson's Disease (PD). It is shown herein that a defect in the removal of the protein Miro1 from damaged mitochondria is present in individuals with PD and at risk for PD, but is absent from other neurologic diseases, including other hyperkinetic movement disorders.

In some embodiments, a method is provided for reducing undesirable levels of Miro1 in a cell having depolarized or otherwise damaged mitochondria. In some embodiments the cell is in vivo, e.g. in an animal model for PD, in an individual diagnosed with PD, in a clinical trial for treatment of PD, and the like. In some embodiments the cell or individual has been assessed by the methods described herein for the presence of a Miro1 phenotype associated with PD. In such embodiments, an effective dose of an agent, herein termed a "Miro1 reducer" is administered to an individual, or contacted with a cell population. In some embodiments, a Miro1 reducer is determined to have activity in a Miro1 assay as described herein.

Aspects of the methods include administering a Miro1 reducer to a subject having Parkinson's Disease. Also provided are companion diagnostic assays to determine if a subject is suitable for treatment with a Miro1 reducer due to a Miro1 phenotype associated with PD. In some embodiments, a pharmaceutical composition comprising an effective dose of Miro1 reducer is provided, which dose may be sufficient to achieve a therapeutic level of Miro1 of at least 1 µM, at least 5 µM, at least 10 µM, at least 20 µM, up to about 1 mM, up to about 500 IM, up to about 250 µM, up to about 100 µM, up to about 75 µM, up to about 50 µM. A unit dose may be, for example, 1 µg/kg, 10 µg/kg, 100 µg/kg, 500 µg/kg, 1 mg/kg, 5 mg/kg, 10 mg/kg, 50 mg/kg, 100 mg/kg, or more. In certain such embodiments, the Miro1 reducer is administered to the midbrain and/or putamen of the individual.

In some embodiments a Miro1 reducer has a structure I, or a pharmaceutically acceptable salt or derivative therefrom:

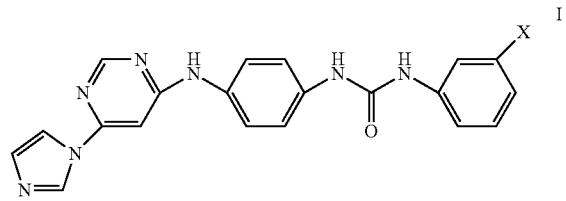

where X is F, Cl, Br, I.

In some embodiments, a Miro1 reducer is provided in a prodrug form. "Prodrug" refers to a derivative of an active agent that requires a transformation within the body to release the active agent. In certain embodiments, the transformation is an enzymatic transformation. Prodrugs are frequently, although not necessarily, pharmacologically inactive until converted to the active agent. "Promoiety" refers to a form of protecting group that, when used to mask a functional group within an active agent, converts the active agent into a prodrug. In some cases, the promoiety will be attached to the drug via bond(s) that are cleaved by enzymatic or non-enzymatic means in vivo. Any convenient prodrug forms of the subject compounds can be prepared, e.g., according to the strategies and methods described by Rautio et al. ("Prodrugs: design and clinical applications", Nature Reviews Drug Discovery 7, 255-270 (February 2008)). In some cases, the promoiety is attached to the carboxylic acid group of the subject compounds. In certain cases, the promoiety is an acyl or substituted acyl group. In certain cases, the promoiety is an alkyl or substituted alkyl group, e.g., that forms an ester when attached to the carboxylic acid group of the subject compounds.

In some embodiments, a Miro1 reducer, prodrugs, stereoisomers or salts thereof are provided in the form of a solvate (e.g., a hydrate). The term "solvate" as used herein refers to a complex or aggregate formed by one or more molecules of a solute, e.g. a prodrug or a pharmaceutically-acceptable salt thereof, and one or more molecules of a solvent. Such solvates are typically crystalline solids having a substantially fixed molar ratio of solute and solvent. Representative solvents include by way of example, water, methanol, ethanol, isopropanol, acetic acid, and the like. When the solvent is water, the solvate formed is a hydrate.

In some embodiments a Miro1 reducer is provided in combination with an additional treatment for PD. In some embodiments, the Miro1 reducer is provided before the additional treatment. In some embodiments, the Miro1 reducer is provided after the additional treatment. In some embodiments, treatment is pharmacologic, i.e. administration of a therapeutically effective dose of a drug for alleviating the symptoms of PD. In some embodiments, treatment relates to assigning an individual to a clinical trial protocol. In some embodiments, treatment relates to non-pharmacologic therapy, including without limitation surgical methods such as deep brain stimulation, and non-surgical methods such as physical therapy, and the like. In some embodiments, pharmacologic treatment of PD comprises administration of a therapeutic agent, including without limitation, levodopa, a dopamine agonist, a MAO-B inhibitor, amantadine, an anticholinergic, a PUM1 antagonist, an SR protein antagonist, a Parkin agonist, a PINK1 agonist, an 4E-BP1 agonist, a Drp1 agonist, an Atg1 agonist, a TauS2A agonist, a Rbf1 agonist, a Dp antagonist, an E2f1 antagonist, a Polo-like kinase 2 antagonist and a Notch agonist; etc.

Methods of determining the presence of this defect in a cell of interest are provided herein. The methods do not require neural cells, and can be performed with cell lines, cells obtained from an individual, including without limitation fibroblasts, and the like. The methods find use in assessment of an individual for prognostic and diagnostic classification; in selection, stratification and monitoring for clinical trials; in determining the status of an individual for treatment decisions; in drug screening for candidate PD therapies; etc. The methods allow assessment of Parkinson's disease accurately, early and in a clinically practical way.

In some embodiments, an assay is provided for determining the Miro1 status of a cell or population of cells. Miro1 is normally removed from damaged, e.g. depolarized, mitochondria to facilitate their clearance via mitophagy, but a defect in this degradation can occur, which defect can be detected using biochemical assays, ELISA, etc., including by high throughput, and/or clinically practical procedures. The defect in degradation is strongly associated with PD; the data provided herein demonstrate that a high percentage of Parkinson's Disease patients are deficient in the removal of Miro1 following depolarization. However, Miro1 is efficiently degraded upon depolarization in control cells.

The assays can be performed on any convenient cell, including cell lines, patient cell samples, genetically-modified cells, in vitro differentiated cells, cells exposed to a candidate therapeutic agent; and the like. Fibroblasts are a convenient source of cells from individuals, and can be easily obtained from patients by a minimally-invasive, painless procedure ENREF 12. In some embodiments the assay is performed on a population of cells from an individual to determine the Miro1 phenotype of the individual.

In some embodiments, a Miro1 assay is performed by contacting a population of cells with an agent that damages mitochondria. In some embodiments the agent is a mitochondria-specific uncoupler, e.g. a protonophore. Agents suitable for this purpose include FCCP, CCCP, DNP, BAM15, etc., as known in the art. The cells are incubated for a period of time sufficient to depolarize mitochondria and initiate clearance, e.g. at least about 1 hour, at least about 2 hours, and usually not more than about 24 hours, and may be from about 1 to 24 hours, from about 2 to 20 hours, from about 3 to 18 hours, from about 4 to 14 hours, from about 5 to 10 hours, and may be from about 4 to 8 hours. Following mitochondrial depolarization, the cells are lysed and assessed for levels of Miro1. In some embodiments the cells are lysed and an affinity assay is performed on the lysate to detect levels of Miro1 protein. The formats for such assays are well known in the art. Generally an affinity agent specific for Miro1, e.g. a Miro1 specific antibody, is utilized as a capture agent or as a detection agent, or both. Suitable formats include, without limitation, immunoassays such as ELISA, RIA, EIA, FRET, etc. The presence of Miro1 protein following mitochondrial depolarization is indicative of a PD phenotype, while control cells degrade Miro1 under these conditions.

In some embodiments a Miro1 assay as described above is utilized for the diagnosis and clinical monitoring of movement disorders, which diseases include, without limitation, Parkinson's disease. In some embodiments, the methods of the invention are used in determining the efficacy of a therapy for treatment of a movement disorder, e.g. in vitro, such as drug screening assays and the like; at an individual level; in the analysis of a group of patients, e.g. in a clinical trial format; etc. Clinical trial embodiments may involve the comparison of two or more time points for a patient or group of patients. The patient status is expected to differ between the two time points as the result of administration of a therapeutic agent, therapeutic regimen, or challenge with a disease-inducing agent to a patient undergoing treatment. The response of a patient with a movement disorder to therapy is assessed by detecting the ability of a cell sample from a patient, including without limitation a fibroblast sample, to degrade Miro1 after mitochondria damage, e.g. mitochondrial depolarization. Miro1 degradation may be monitored in a variety of ways. Conveniently, the removal of Miro1 is detected in a patient sample by an immunoassay, such as ELISA or other high throughput affinity assays.

In certain embodiments, the Parkinson's Disease is Parkinson's Disease (PD). In some such embodiments, the PD is a familial form of PD, e.g. a PTEN-induced putative kinase 1 (PINK-1)-associated form of PD, a Parkin-associated form of PD, an LRRK2-associated form of PD, an alpha-Synuclein (SNCA)-associated form of PD, a ubiquitin carboxy-terminal hydrolase L1 (UCHL1)-associated form of PD, a parkinson protein 7 (PARK7, DJ-1) associated form of PD, an ATP13A2-associated form of PD, a phospholipase A2, group VI (PLA2G6)-associated form of PD, a DnaJ (Hsp40) homolog, subfamily C, member 6 (DNAJC6, PARK19)-associated form of PD; a eukaryotic translation initiation factor 4 gamma, 1 (EIF4G1, PARK18)-associated form of PD; a F-box protein 7 (FBXO7)-associated form of PD; a GRB10 interacting GYF protein 2 (GIGYF2)-associated form of PD; a HtrA serine peptidase 2 (HTRA2)-associated form of PD; a synaptojanin 1 (SYNJ1)-associated form of PD; and a vacuolar protein sorting 35 homolog (VPS35)-associated form of PD. In other such embodiments, the PD is a sporadic form of Parkinson's Disease, for example, it is associated with a sporadic mutation in one of the aforementioned genes.

In some embodiments, following analysis of Miro1 status, an individual determined to have a Miro1 status associated with PD is treated accordingly. In some embodiments, treatment is pharmacologic, i.e. administration of a therapeutically effective dose of a drug for alleviating the symptoms of PD. In some embodiments, treatment relates to assigning an individual to a clinical trial protocol. In some embodiments, treatment relates to non-pharmacologic therapy, including without limitation surgical methods such as deep brain stimulation, and non-surgical methods such as physical therapy, and the like.

In some embodiments, pharmacologic treatment of PD comprises administration of a therapeutic agent, including without limitation, levodopa, a dopamine agonist, a MAO-B inhibitor, amantadine, an anticholinergic, a PUM1 antagonist, an SR protein antagonist, a Parkin agonist, a PINK1 agonist, an 4E-BP1 agonist, a Drp1 agonist, an Atg1 agonist, a TauS2A agonist, a Rbf1 agonist, a Dp antagonist, an E2f1 antagonist, a Polo-like kinase 2 antagonist and a Notch agonist; etc.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

FIG. 1A-FIG. 1F. Miro1 Response to CCCP in Fibroblasts. (FIG. 1A) Schematic representation of our readouts. (FIG. 1B, FIG. 1C) Examples of the readouts using healthy-1, PD-2, and risk-2. (FIG. 1D) Heat maps show the relative mitochondrial protein levels. The intensity of each band in the mitochondrial fraction is normalized to that of the mitochondrial loading control VDAC from the same blot and expressed as a fraction of the mean of Healthy-1 with DMSO treatment; this control was included in every experiment. Mean values are imported into heat maps. n=3-35. (FIG. 1E-FIG. 1F) ELISA of Miro1. n=4 with duplicates each time. Comparison within the same subject. Throughout *: $P<0.05$; : $P<0.01$; *: $P<0.001$.

FIG. 2A-FIG. 2F. Miro1 Reducer Eliminates the Miro1 Defect in PD Fibroblasts. (FIG. 2A) Chemical properties of Miro1 Reducer. (FIG. 2B) Wild-type flies (w[1118]) were fed with DMSO alone (0 μM Miro1 Reducer) or Miro1 Reducer in DMSO at 250 μM for 7 days, and lysed and blotted as indicated. The band intensities are normalized to those of Tubulin from the same blots. n=4. (FIG. 2C-FIG. 2E) Fibroblasts were treated, lysed, and blotted as indicated. (FIG. 2C) Band intensities are normalized to those of GAPDH from the same blots and compared to "Healthy-1, no treatment" except otherwise indicated. n=4. (FIG. 2D) Band intensities are normalized to those of ATP5β from the same blots and expressed as a percentage of the mean of "0 μM Miro1 Reducer with CCCP". Mean±S.E.M is shown. n=3. (FIG. 2E) Band intensities are normalized to those of GAPDH from the same blots and compared to "Healthy-1, no CCCP, no MG132" except otherwise indicated. n=4. (FIG. 2F) Healthy-1 and PD-2 fibroblasts were transfected as indicated, and immunostained with anti-Myc (Miro1, green) and stained with Dapi (blue). The Miro1 intensity is normalized to that of mito-dsRed from the same cell and quantified across 37-62 cells from 5 fields each transfection, 3 independent transfections. Scale bars: 50 μm. For (FIG. 2C-FIG. 2F), both CCCP and Miro1 Reducer were dissolved in DMSO. Cells were pretreated with Miro1 Reducer 24 hrs before the application of CCCP for another 6 hrs. The same volume of DMSO was applied at the same time in negative controls.

FIG. 3A-FIG. 3D. Miro1 Reducer Rescues Parkinson's Neurodegeneration. (FIG. 3A) Fibroblasts were treated, lysed, and blotted as indicated. Band intensities are normalized to those of ATP5β from the same blots and compared to "Healthy-2, no treatment". n=4. (FIG. 3B-FIG. 3C) iPSC-derived neurons were treated as indicated and immunostained with anti-TH (FIG. 3B) or stained with PI and Dapi (FIG. 3C). Both Antimycin A and Miro1 Reducer were dissolved in ethanol. Neurons were pretreated with Miro1 Reducer 24 hrs before the application of Antimycin A for another 6 hrs. The same volume of ethanol was applied at the same time in negative controls. (FIG. 3B) The density of TH-positive neurons is calculated in each condition under 20×, from 10 fields each experiment, 3-4 experiments. The neuron densities without Antimycin A are not significantly different among all conditions ($p=0.0682$). (FIG. 3C) The percentage of PI-positive cells out of total cells (Dapi-positive) is calculated. n=20 fields each experiment, 4 experiments. For (FIG. 3B-FIG. 3C), comparisons with "Wild-type-I, no treatment" except otherwise indicated. (FIG. 3D) Mitochondrial movement (mito-dsRed) in representative axons pretreated with 5 μM Miro1 Reducer for 24 hrs, and then after treatment with 100 μM Antimycin A. The first frame of each live-imaging series is shown above a kymograph generated from the movie. Graphs of Mean±S.E.M show the percent of time each mitochondrion is in motion (red and blue, compared to "Wild-type-I, before treatment"), and the mitochondrial intensity normalized to that of the same axonal region at "0 min" and expressed as a fraction of the mean of "Wild-type-I, 0 min". n=33-77 mitochondria from 5-8 axons from 5-8 separate transfections. Scale bars: (FIG. 3B, FIG. 3C) 100 μm; (FIG. 3D) 10 μm.

FIG. 4A-FIG. 4I. Miro1 Reducer Rescues PD-Relevant Phenotypes in Flies. For all panels, when Miro1 Reducer was not added, the same volume of the solvent, DMSO, was supplied in fly food. Drug administration (2.5 μM) was started from day 2. (FIG. 4A-FIG. 4C) Survival curves of LRRK2[G2019S] (FIG. 4A), PINK1[B9] (imprecise excision, null) and PINK1[RV] (the precise excision control for PINK1[B9]) (FIG. 4B), and SNCA[A53T] flies (FIG. 4C). n=58-150. (FIG. 4D) Dopaminergic (DA) neurons in the PPM1/2 clusters of 22-day old flies were immunostained with anti-TH. (FIG. 4D-FIG. 4F) Quantification of the DA neuron number in the PPL1 or PPM1/2 cluster (total number divided by 2 for each brain). (FIG. 4D) LRRK2[G2019S]. n=6-8 brains. (FIG. 4E) PINK1[B9] ("−") and PINK1[RV] ("+"). n=9-16. (FIG. 4F) SNCA[A53T]. n=9-11. (FIG. 4G-FIG. 4I) Climbing ability (Average PI±S.E.M) of adult flies. n=24-47 flies.

FIG. 5A-FIG. 5H. Related to FIG. 1. Association Tests. The association between the ratio of Miro1 intensity (CCCP/

DMSO) and PD (FIG. 5A), gender (FIG. 5B), age at sampling (FIG. 5C), onset age (FIG. 5D), years with PD (FIG. 5E), or clinical manifestations (FIG. 5F-FIG. 5H). The Miro1 intensities are reported in FIG. 9A.

Figure 6A:
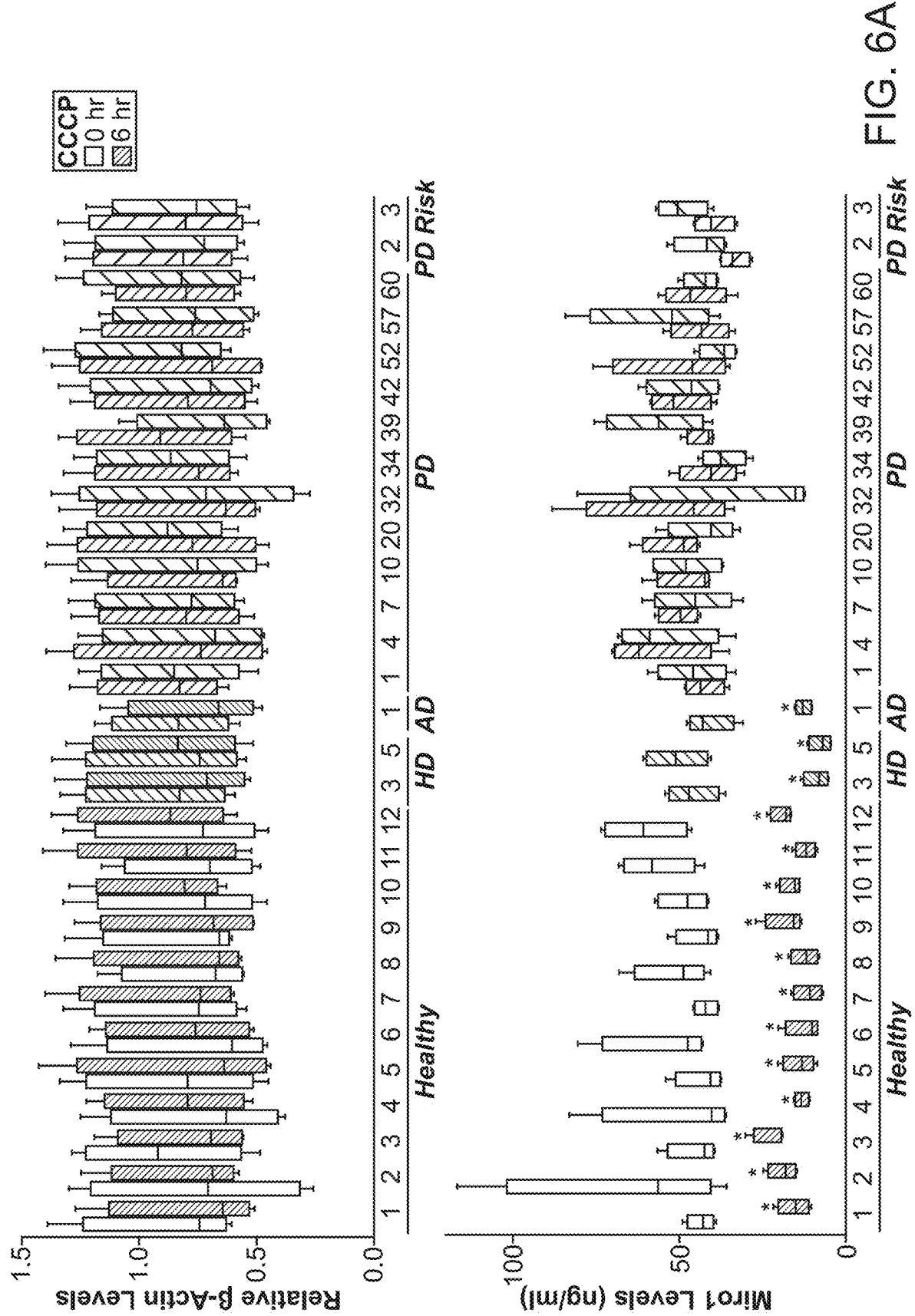

FIG. 6. Related to FIG. 1. Validation of ELISA. (A) Relative β-actin and Miro1 protein levels in fibroblasts. No difference among all conditions for β-actin ($P > 0.999$, One-Way ANOVA Tukey Test with adjustment). Relative protein levels are calculated from the standard plots, one of which is shown in (B) or (F). n=4. For "CCCP, 0 hr", the solvent of CCCP, DMSO, was applied for 6 hrs. (B) β-Actin signals correlate with serial dilutions of fibroblast lysates. (C) Swapping the specific coating chicken anti-β-actin with mouse anti-Miro1 eliminates β-actin protein signals in fibroblasts. Relative protein levels are calculated from the standard plots, one of which is shown in (B). n=4. (D) Miro1 signals show linear dependency on serial dilutions of lysates of HEK cells with exogenously expressed Miro1. (E) Altering the specific coating mouse anti-Miro1 by swapping it with mouse anti-β-actin or mouse anti-ATP5β, or by omitting it, eliminates Miro1 protein signals in HEK cells. Relative protein levels are calculated from the standard plots (Miro1-Myc), one of which is in (D). n=4. (F) Miro1 signals show linear dependency on concentrations of purified Miro1 protein. This plot represents the standard for (A) and (G). (G) Swapping the specific coating mouse anti-Miro1 with chicken anti-β-actin eliminates Miro1 protein signals in fibroblasts.

FIG. 7. Related to FIG. 1-4. Validation of Additional Cohorts and Identification of Miro1 Reducer. (A) Relative β-actin protein levels in fibroblasts used in FIG. 1. No difference among all conditions ($P > 0.4494$, One-Way ANOVA Tukey Test with adjustment). n=4. (B) Several lines used in ELISA in FIG. 1 were validated by Western blotting. Fibroblast lysates were immunoblotted as indicated, and the protein band intensity of Miro1 is normalized to that of β-actin from the same blot and compared to "CCCP, 0 hr" of the same subject. n=4 independent experiments. For "CCCP, 0 hr", the solvent of CCCP, DMSO, was applied for 6 hrs. (C) The ensemble of the poses of Miro1 Reducer in the target binding sites within the C-terminal GTPase domain of Miro1. Residues are labeled at their alpha carbons. Seven amino acids residues (K427, N428, S432, Q446, K528, D530, K454) make frequent molecular interactions, especially via hydrogen-bonds, with the poses of Miro1 Reducer. Images were generated using Molsoft ICM Browser. (D) The top 11 compounds from AI were functionally screened in flies. Wild-type flies ($w^{1118}$) were fed with DMSO alone (no compound) or compound in DMSO at 250 μM for 7 days, lysed, and blotted as indicated. The band intensities are normalized to those of β-actin from the same blots. n=4.

Figures 8I, 8J, 8K, 8L, 8M, 8N:
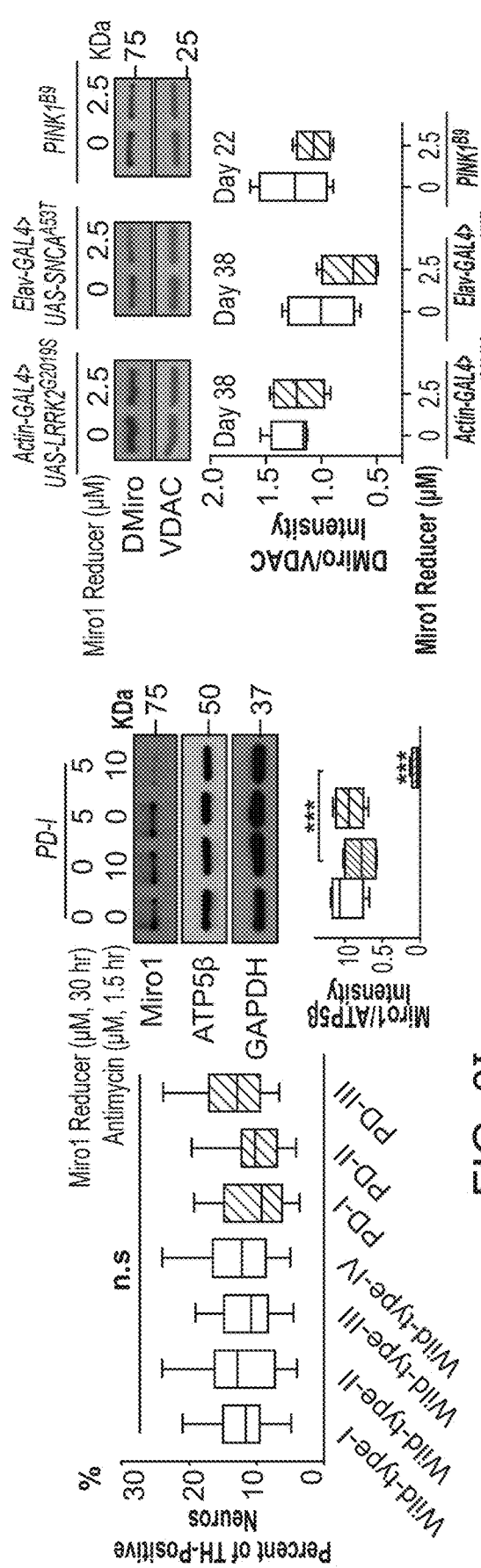
Figure 10A:
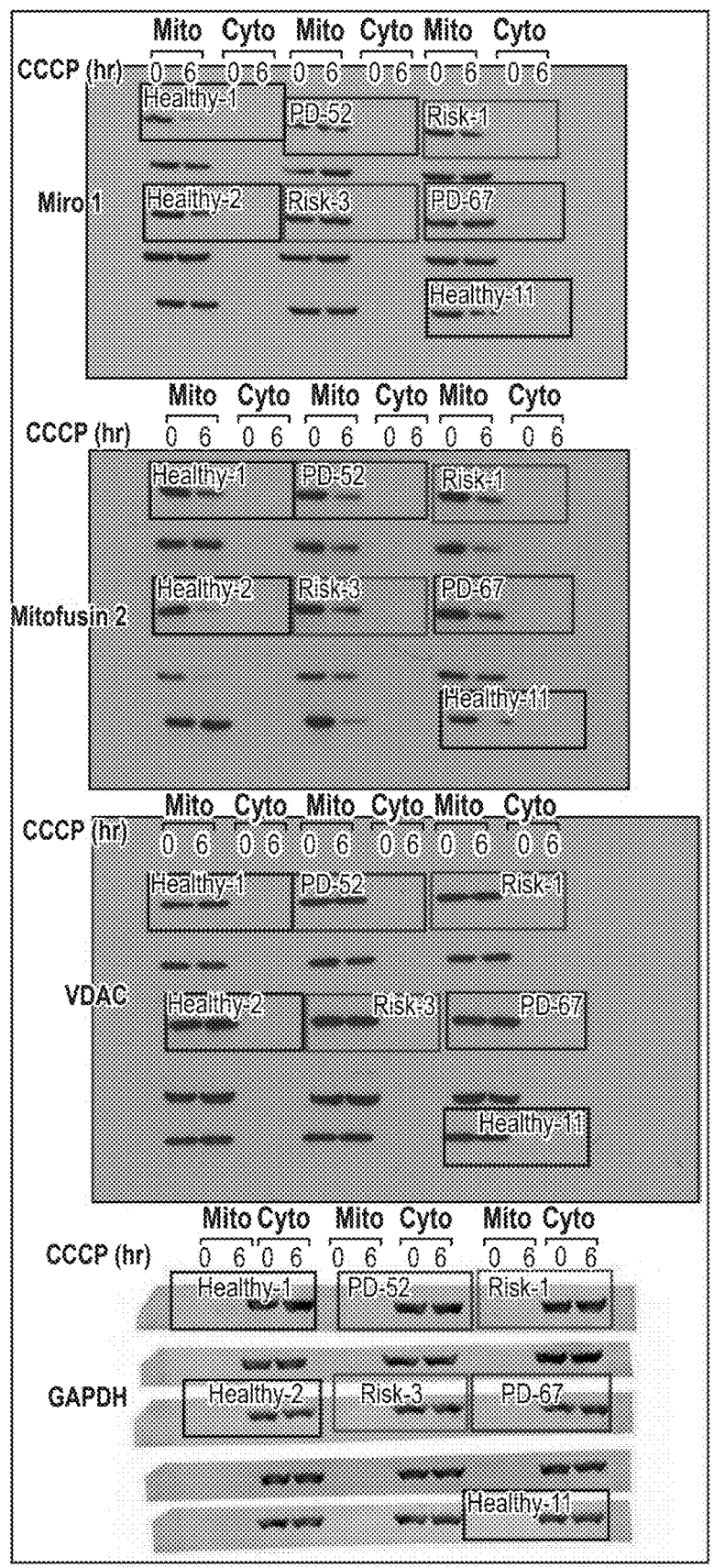
Figure 10B:
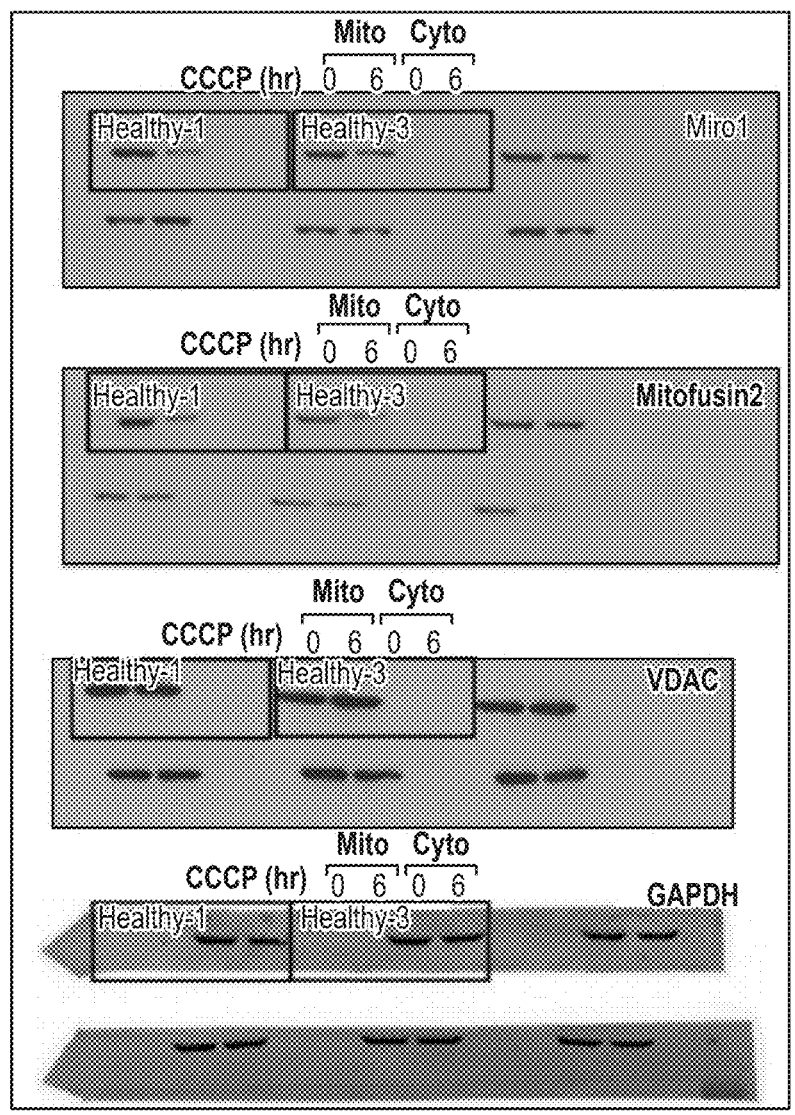
Figure 10C:
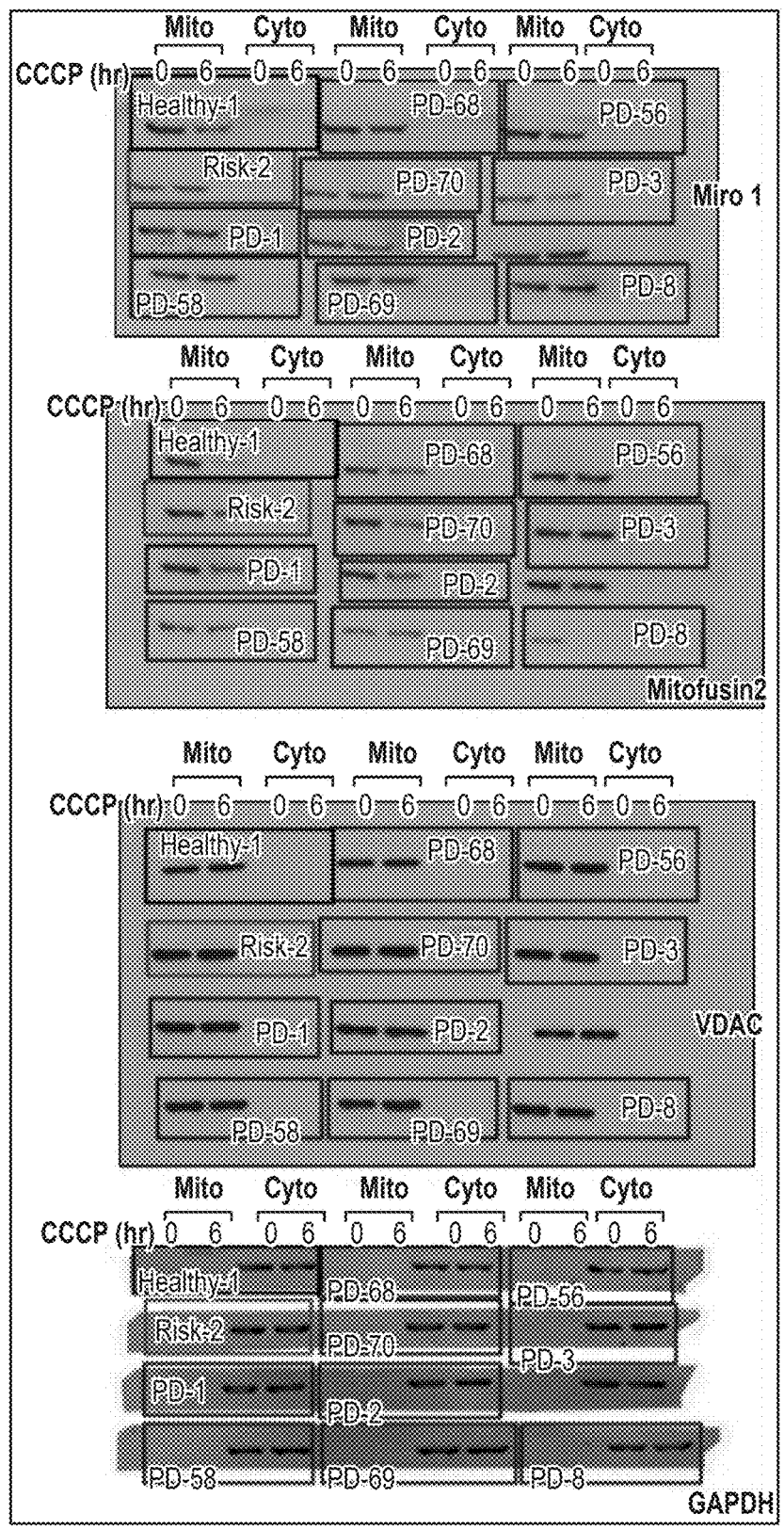
Figure 10D:
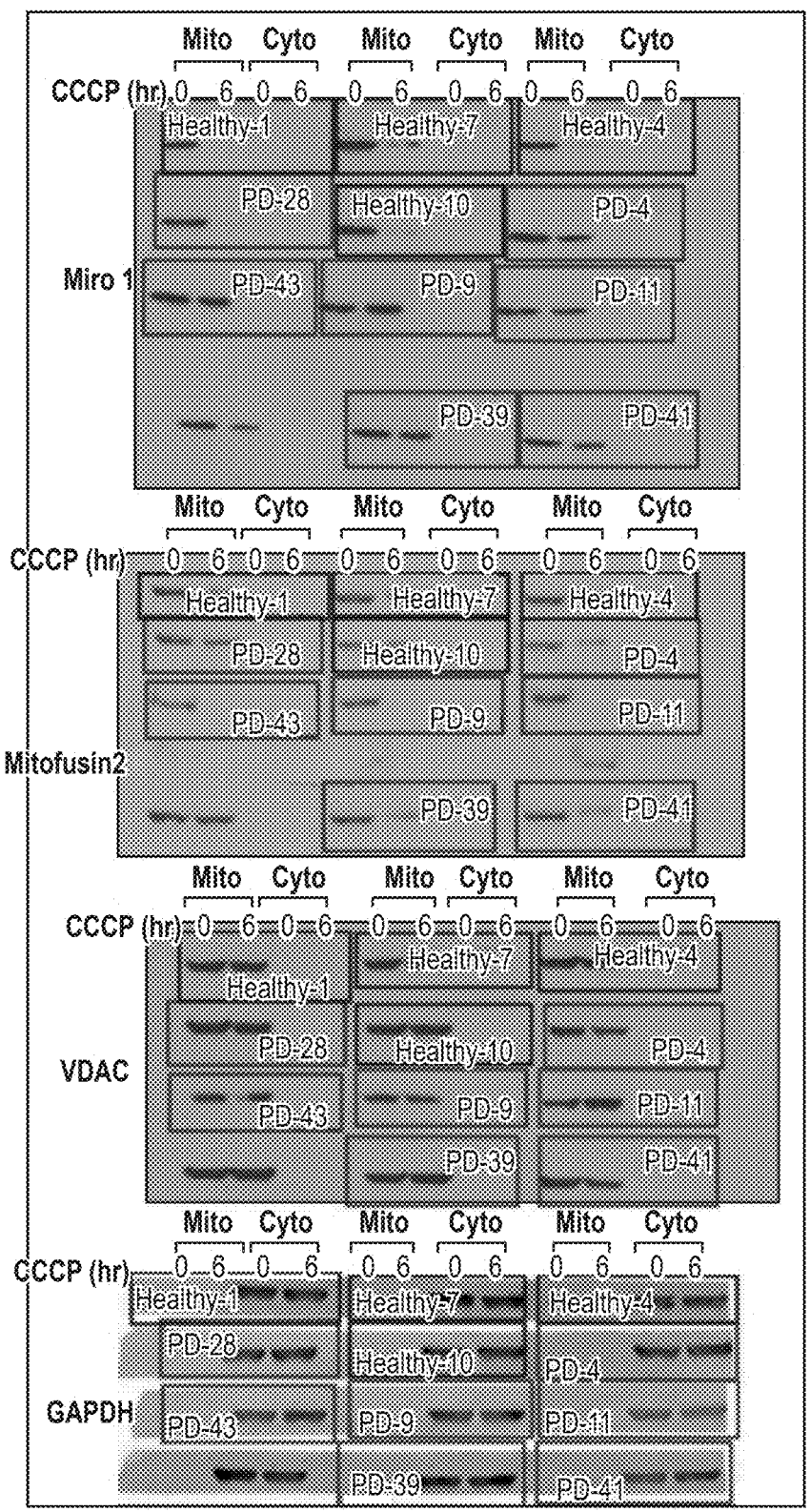
Figure 10E:
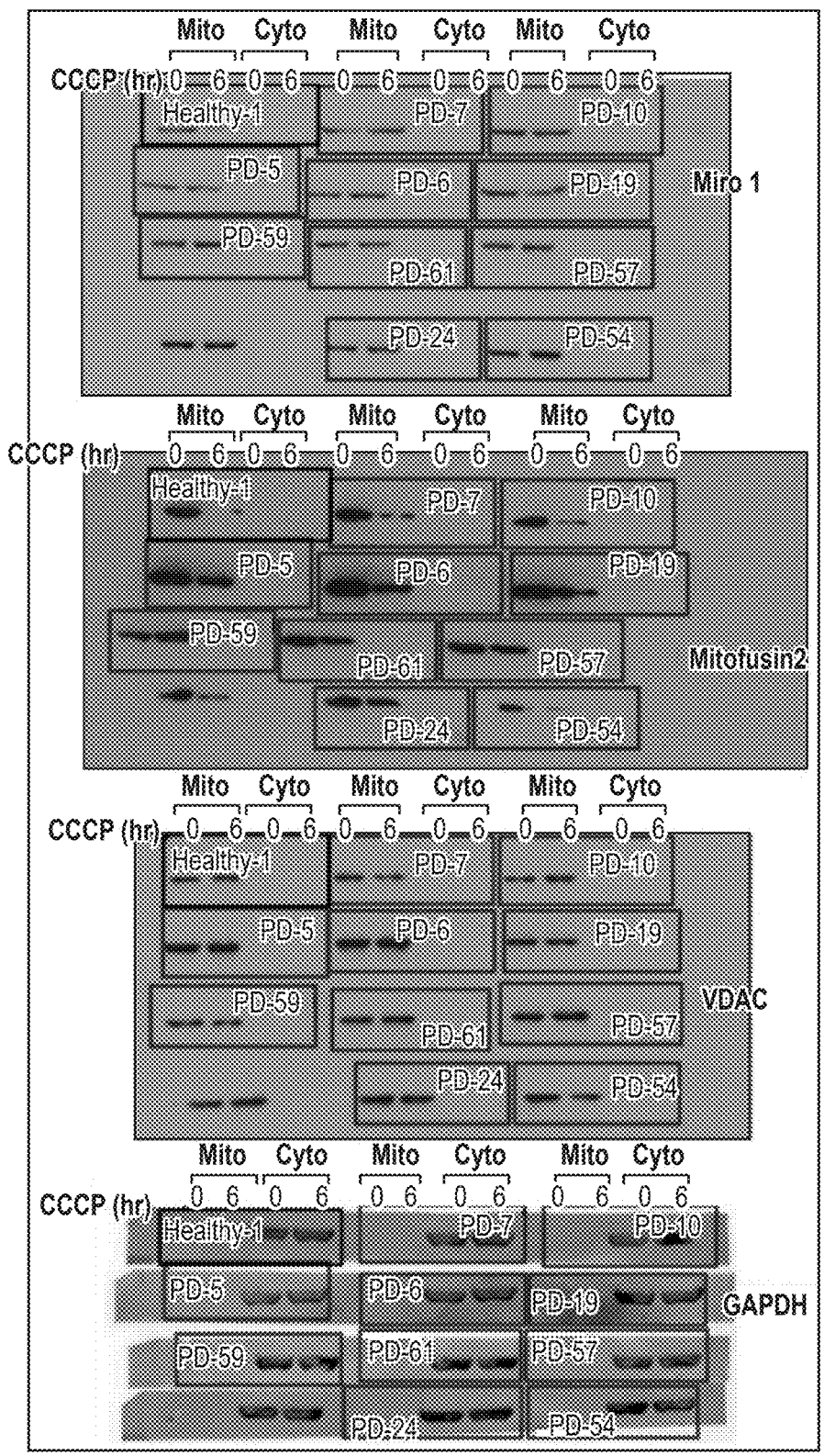
Figure 10F:
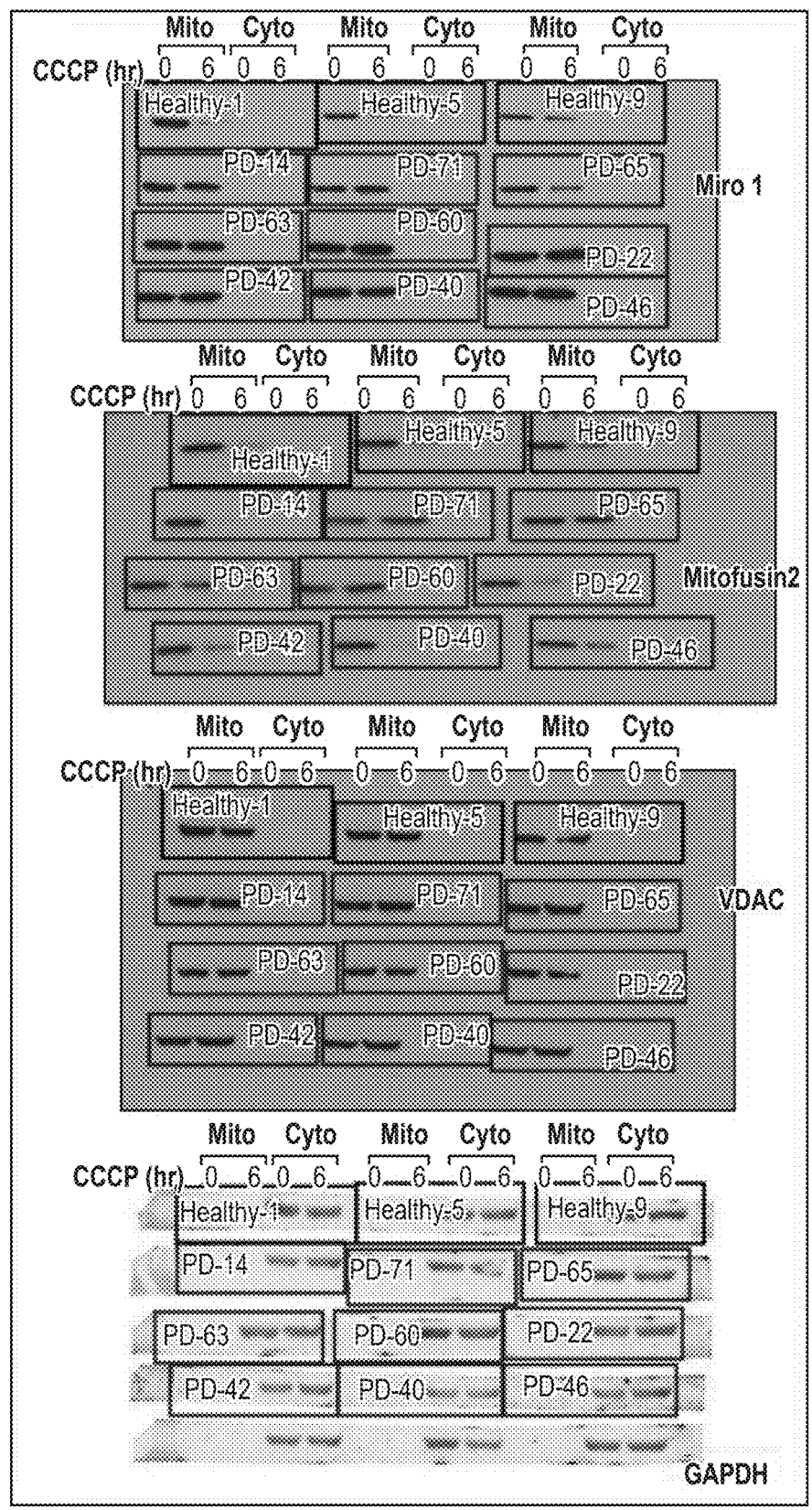
Figure 10G:
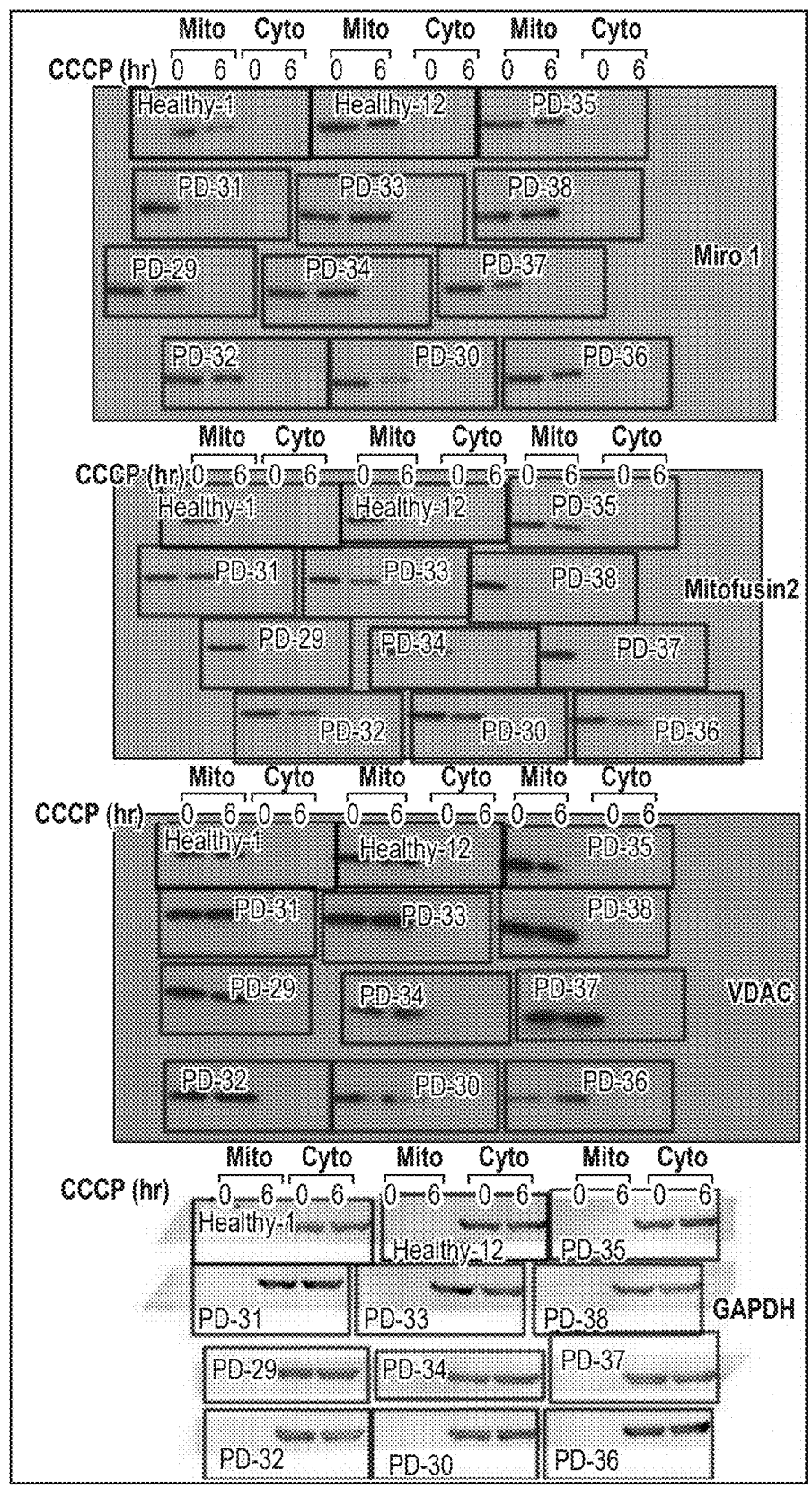
Figure 10H:
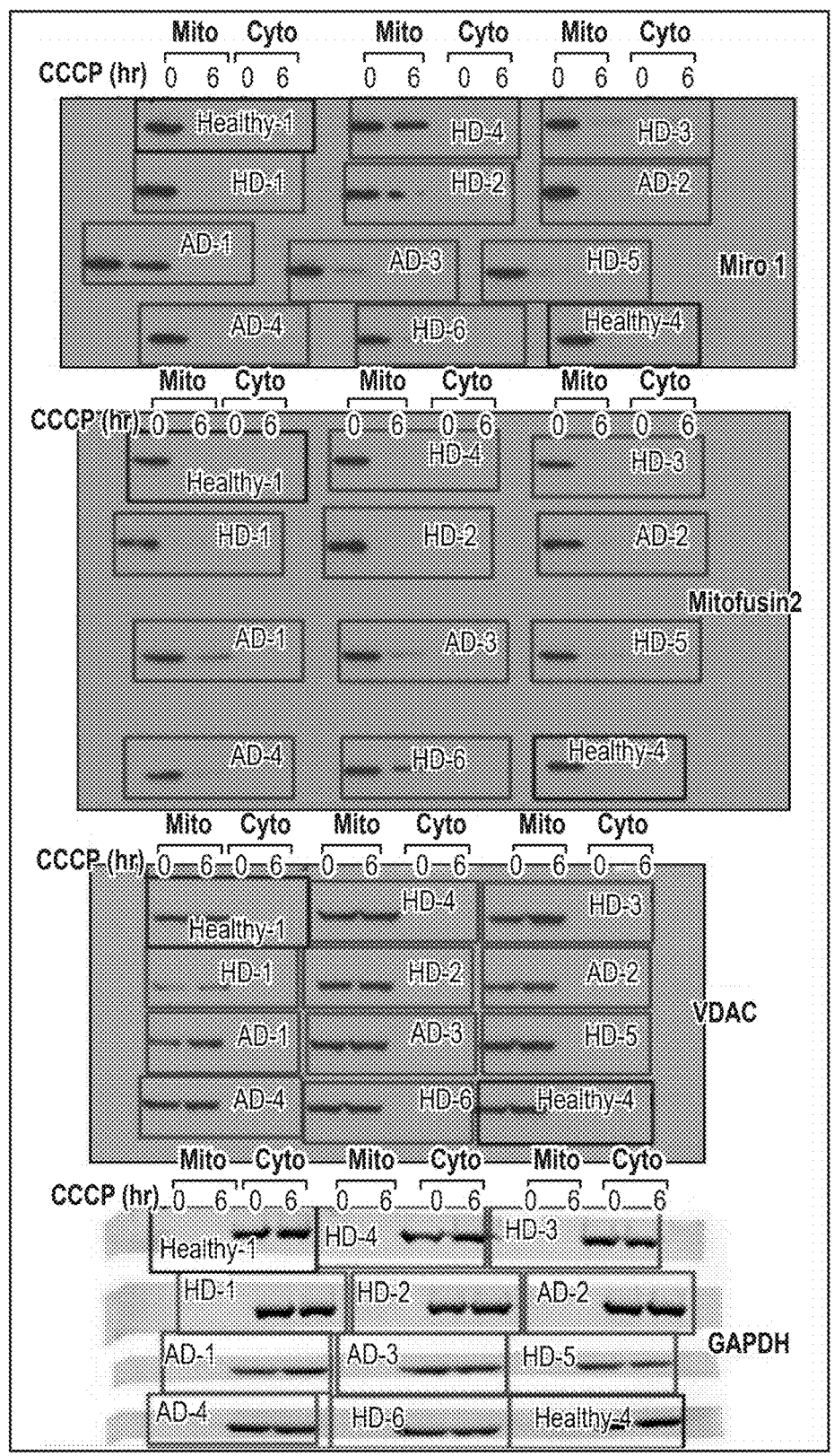
Figure 10I:
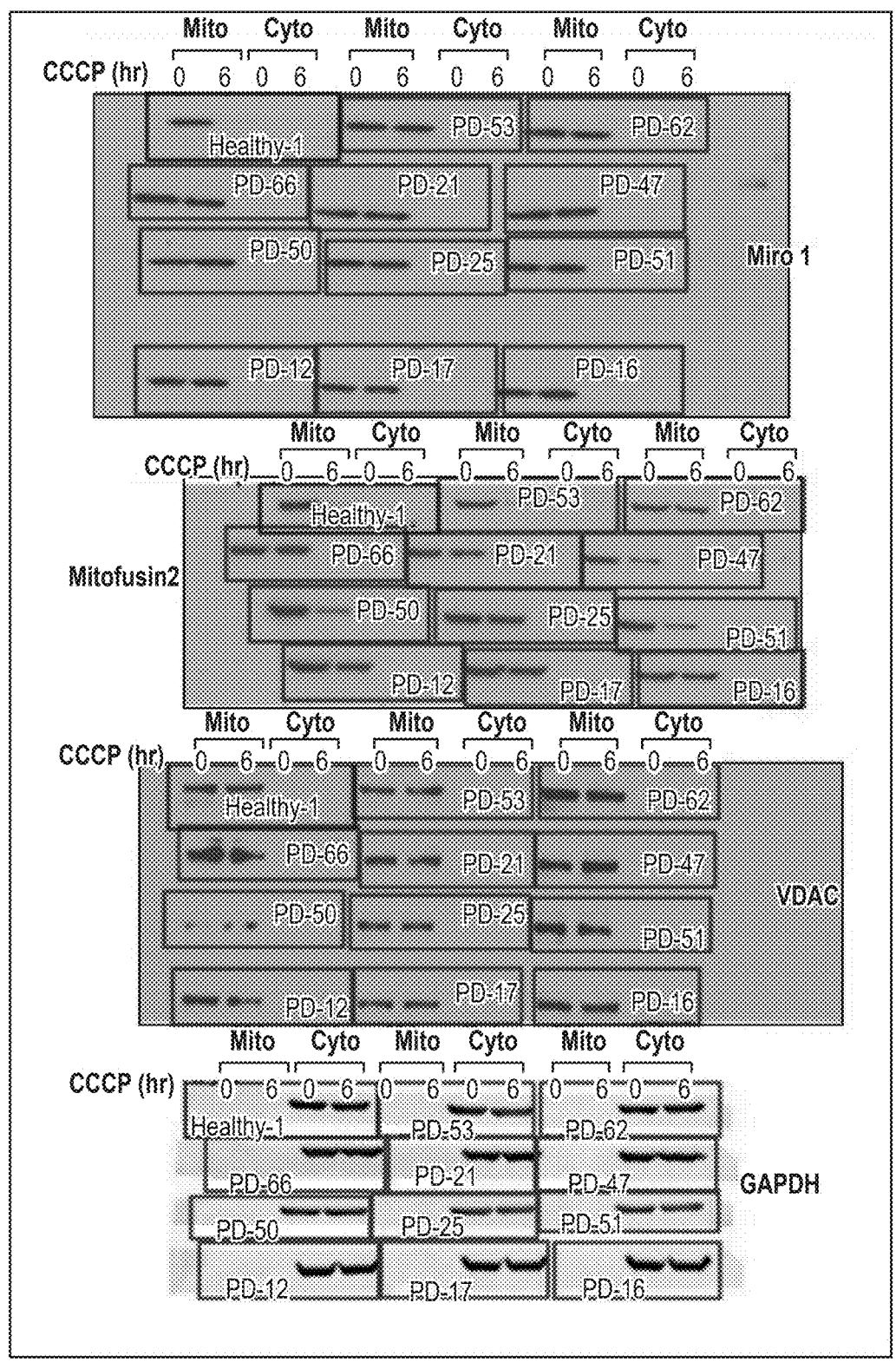
Figure 10K:
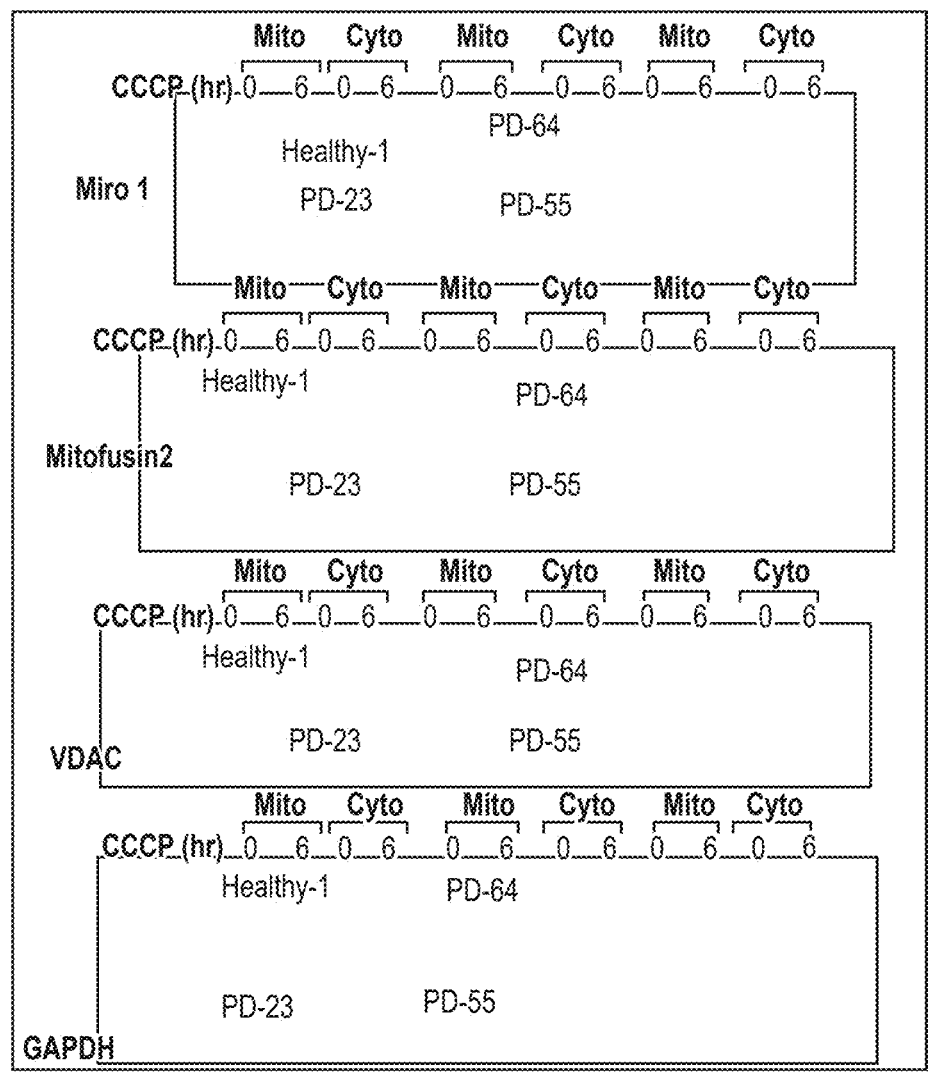

FIG. 8. Related to FIG. 2-4. Miro1 Reducer in Human Cell and Fly Models. (A) Fibroblasts from Healthy-1 and PD-2 were treated, lysed, and blotted as indicated. Band intensities are normalized to those of GAPDH from the same blots and compared to "Healthy-1, no treatment". n=4 independent experiments. (B) Fibroblasts from PD-2 were treated and immunostained as indicated. The intensity was quantified for each cell across 264-320 cells from 3 independent experiments, compared to "no treatment". (C) Fibroblasts were treated, immunoprecipitated (IPed) with anti-Miro1, and blotted as indicated. Similar results were observed twice. (D) Similar as in (C), fibroblasts were treated as indicated, and IPed with anti-Miro1. The GTPase activity of the IPed Miro1 protein was measured as described in Method. Bar graphs show the average of two independent experiments. (E) qPCR analysis was performed using RNA isolated from fibroblasts. Miro1 values were normalized to those of the internal control GAPDH. n=4 independent experiments. (F) Fibroblasts were pretreated with Miro1 Reducer for 30 hrs, and stained with 2 μM MitoSox for 10 min at 37° C. The MitoSox intensity was quantified for each cell across 106-161 cells from 3 coverslips. $P = 0.1412$ among all conditions. (G) Fibroblasts were pretreated with Miro1 Reducer for 30 hrs, and stained with 25 nM TMRM for 30 min at 37° C. The TMRM intensity was measured for each cell across 48-60 cells from 3 independent experiments, and expressed as a fraction of the mean of "Healthy-1, no treatment". $P = 0.1085$. Mitochondrial morphology is largely comparable among all conditions. (H) Fibroblasts were transfected with EGFP-peroxisome, treated with Miro1 Reducer for 30 hrs, and live imaged. The image at 0 sec is pseudo-colored in green and at 60 sec in red. The movement (the intensity of non-yellow) was quantified for each cell as described in (Tsai et al., 2014) across 22-31 cells from 3 transfections. $P = 0.7552$ among all conditions. (1) Left: The percentage of TH-positive iPSC-derived neurons out of total cells (Dapi-positive) is calculated after immunocytochemistry under 20× as described in FIG. 3. $P = 0.0748$. n=10 fields each experiment from 3-4 independent experiments. Right: iPSC-derived neurons were treated, lysed, and immunoblotted as indicated. Band intensities of Miro1 are normalized to those of ATP5β from the same blots, compared to "no treatment" except otherwise indicated. n=4. (J) PD flies were fed with 2.5 μM Miro1 Reducer for the indicated time periods and lysed for blotting DMiro. Band intensities of DMiro are normalized to those of VDAC from the same blots. n=4 independent experiments; for each experiment 5 whole flies of mutant LRRK2 or PINK1, and 15 heads of mutant SNCA flies were used. There is a trend of DMiro reduction in all 3 PD models fed with Miro1 Reducer, although it does not reach statistical significance. (K-N) Phenotypes of 14-day old PINK1 null males. PINK1$^{RV}$ is the precise excision control for PINK1$^{B9}$ (imprecise excision, null). Drug administration (2.5 μM) was started from day 2. (K) ATP levels. n=1 fly each experiment, total 6 experiments. (L) Percent of total flies with thoracic indentation. (M) Percent of total flies with abnormal wing posture. (N) Percent of total flies that could not fly. For (L-N), Chi-Square Test is used because the data are categorical; comparisons with "PINK1$^{RV}$, 0 μM". n=35-61. Scale bars: (B, G, H) 50 μm; (F) 100 μm.

Table 2. Related to FIG. 1. Demographic Information and Miro1 Values. (A) Demographic information and clinical scores are from the online databases of the consortia. Not all information is available for all subjects. Particular analyses use data from the subjects with the available information. P values are from comparing the normalized Miro1 intensities within the same subject (CCCP v.s. DMSO). (B) Demographic Information of Additional Cohorts for ELISA.

Table 3. Related to FIG. 1. Miro1 and Mitofusin2 Raw Blots. Representative raw blots for FIG. 1. For "CCCP, 0 hr", the solvent of CCCP, DMSO, was applied for 6 hrs. Line identities are in Table 2A.

Table 4. Related to FIG. 1. Summary of the Miro1 Phenotype in All Subjects Used in This Study, and Miro1 Values in Cells with Different Passage Numbers. (A) Fisher Exact Test is used to determine the P values compared to PD. The Miro1 intensities with DMSO and with CCCP are compared within the same subject in either ELISA or Western by Mann-Whitney U Test, and the numbers of the subjects with a $P > 0.05$ or $< 0.05$ are defined as "No. (Miro1 DMSO v.s. CCCP $P > 0.05$ or $< 0.05$)". (B) Miro1 intensities are calculated as in Table 2A. No significant difference is found among different passages within the same cell line.

Table 5. Related to FIG. 1. LRRK2 and Parkin Raw Blots. Representative raw blots for FIG. 1. For "CCCP, 0 hr", the solvent of CCCP, DMSO, was applied for 1 hr. Line identities are in Table 2A.

DETAILED DESCRIPTION OF THE INVENTION

Methods and compositions are provided for the assessment and treatment of Parkinson's Disease in an individual. Aspects of the methods include administering a MRO1 reducer to a subject having Parkinson's Disease. Also provided are reagents and kits for practicing the subject methods. These and other objects, advantages and features of the invention will become apparent to those persons skilled in the art upon reading the details of the compositions and methods as more fully described below.

Before the present methods and compositions are described, it is to be understood that aspects of the invention are not limited to particular method or composition described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "a cell" includes a plurality of such cells and reference to "the peptide" includes reference to one or more peptides and equivalents thereof, e.g. polypeptides, known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As used herein, the term "mitochondrial transport protein" refers to any protein that is involved in the transport of mitochondria in a cell, e.g., a neuron, fibroblast, etc. Mitochondrial transport factors include, but are not limited to, Mitochondrial Rho (Miro) proteins, trafficking kinesin (TRAK) proteins, kinesin, dynein motors, and myosin motors.

As used herein, the terms "Mitochondrial Rho", "Miro" and "Miro protein" all refer to a member of the mitochondrial Rho protein family of Rho GTPases. Miro family members have tandem GTP-binding domains, two EF hand domains that bind calcium and are larger than classical small GTPases. Examples of Miro family members include, but are not limited to, Miro1 (also known as "Arht1" and "mitochondrial Rho GTPase 1", "mitochondrial Rho 1", "ras homolog family member Ti", and "Rhot1", the sequence for which can found at GenBank Accession Numbers NP_001028738.1 and NM_001033566.1) and Miro2 (also known as "Arht2", "mitochondrial Rho GTPase 2", "mitochondrial Rho 2" and "ras homolog family member T2", and "Rhot2", GenBank Accession Numbers NP_00620124.1 and NM_138769.2).

"Mitochondrial depolarization" is the process in which the membrane potential of the mitochondria changes in the depolarizing direction from the resting potential, from negative to positive. Normal, mild calcium influx from cytosol into the mitochondrial matrix causes transient depolarization that is corrected by pumping out protons. Chemically induced mitochondrial depolarization provides a suitable assay for determining the effect of damage to mitochondria.

A number of agents are known and used experimentally to cause mitochondrial depolarization and can be used in the methods of the invention for that purpose. Such agents are generally in the class of mitochondrial uncouplers or uncoupling agents that disrupt oxidative phosphorylation in mitochondria by dissociating the reactions of ATP synthesis from the electron transport chain. The result is that the mitochondrion expends energy to generate a proton motive force, but the proton motive force is dissipated before the ATP synthase can recapture this energy and use it to make ATP.

The concentration of agent and time of exposure is sufficient to uncouple or depolarize the mitochondria. For example, CCCP at a concentration of from about 10-100 $\mu$M, for example from about 20 to 80 $\mu$M, from about 30 to 50 $\mu$M is sufficient. Dosage of other agents may provide for activity comparable to these concentrations of CCCP. The cells are incubated for a period of time sufficient to depolarize mitochondria and initiate clearance, e.g. at least about 1 hour, at least about 2 hours, and usually not more than about 24 hours, and may be from about 1 to 24 hours, from about 2 to 20 hours, from about 3 to 18 hours, from about 4 to 14 hours, from about 5 to 10 hours, and may be from about 4 to 8 hours.

Carbonyl cyanide p-trifluoro-methoxyphenyl hydrazone (FCCP) and carbonylcyanide-3-chlorophenylhydrazone (CCCP) are mitochondrial uncouplers frequently used in research. These molecules are lipophilic weak acids that act as protonophores. Due to their hydrophobic nature, these compounds can easily traffic across biological membranes and allow the protons to cross these membranes. Other molecules suitable for this purpose include 1,3-bis(3,5-dichlorophenyl)urea; dodecyltriphenylphosphonium; dinitrophenol; BAM15 ((2-fluorophenyl)6-[(2-fluorophenyl)amino](1,2,5-oxadiazolo[3,4-e]pyrazin-5-yl)amine), which is a mitochondria-specific protonophore uncoupler that possesses a similar potency to FCCP or DNP; FR58P1 (a bromoalkyl ester of a hydroquinone derivative) is another mitochondrial protonophore.

Other mitochondria-specific uncouplers include Mito-Fluo, which is a conjugate of a triphenylphosphonium cation to fluorescein, acting as a fluorescent uncoupler that accumulates preferentially in mitochondria; dodecyltriphenylphosphonium (C12TPP), which operates as a fatty acid anion carrier and facilitates fatty acid cycling across the membrane and thus mitochondria uncoupling; the Rhodamine 19 butyl ester C4R1, which acts as a mild mitochondrial uncoupler; and MitoPhotoDNP, which is a fusion of DNP, the o-nitrobenzyl group (a photoactivable group), and triphenylphosphonium. Bupivacaine, a local anesthetic agent, can act partially as a protonophore but also presents an inhibitory effect on state 3-respiration by altering the mitochondrial proton pump stoichiometry. Weak C-H acids, such as ortho-carborane ($1,2$-$C_2B_{10}H_{12}$), also have global uncoupling properties when used at concentrations comparable to FCCP (10 µM range).

Affinity Assays, which are often immunoassays, are an assay or analytic procedure that relies on the binding of the target molecule, i.e. Miro1, to receptors, antibodies or other macromolecules. A detection method is used to determine the presence and extent of the binding complexes that are formed. Many formats for such assays are known and used in the art, and are suitable for detection of Miro1 degradation following mitochondrial uncoupling or depolarization. In some embodiments, the assay format is suitable for high-throughput analysis.

Included in suitable assay formats are immunoassays that utilize antibodies specific for Miro1. Suitable antibodies for this purpose are known and commercially available as polycloncal or monoclonal compositions, e.g. from Invitrogen, including monoclonals CL1095, CL1083; from Sigma Aldrich including clone 4H4, Santa Cruz Biotechnology Anti-Rho T1 Antibody (A-8); and the like.

Assays of interest include, for example, Western blots; immunohistochemistry; immunoprecipitation; etc., and particularly include immunoassays such as enzyme-linked immunosorbent assay (ELISA), radioimmunoassay (RIA); enzyme immunoassay (EIA).

Enzyme-linked immunosorbent assays (ELISAs) are used to qualitatively and quantitatively analyze the presence or concentration of a particular soluble antigen such as Miro1, in liquid samples, such as cell lysates. These assays generally make use of the ability of multiwell plates or others to bind antibodies which trap the cognate antigen. Usually a colorimetric endpoint that can be detected via absorbance wavelength and quantitated from a known standard curve of antigen or antibody dilutions is used. The detection antibody is often labelled with an enzyme such as horseradish peroxidase or alkaline phosphatase, or a fluorescent tag, or an electrochemiluminescent label or through an intermediary label such as biotin.

Common ELISA formats include the sandwich ELISA, so named because the analyte is "sandwiched" between two different antibodies. The capture substrate in this format is a capture antibody, often a monoclonal antibody, to increase the specificity of the assay and reduce background noise. The analyte is bound to the capture antibody, then detected by binding to a detection antibody. A variation of sandwich ELISA assay, called Single-Molecule Assay (Simoa), uses beads are coated with a capture antibody; each bead is bound to either one or zero target molecule, and individual beads are detected with another antibody (detection antibody) and a labeling enzyme.

Other ELISA formats include indirect ELISA, where the capture substrate is the specific antigen that is being tested and the detection step is mediated by a primary antibody and an enzyme-conjugated secondary antibody which is reactive against the primary antibody. Thus, the primary antibody that recognizes the antigen is not labeled. In a direct ELISA the capture substrate is the specific antigen that is being tested, and the enzyme that catalyzes the color-change reaction is conjugated to the antigen detector antibody.

Immuno-PCR (I-PCR) is a technique that combines the sensitivity of the nucleic acid amplification by PCR with the specificity of the antibody-based assays resulting in an increase of the detection sensitivity.

The term "patient sample" or "sample" as used herein refers to a sample from an animal, most preferably a human, seeking assessment or treatment of a disease, e.g. an movement disorder such as PD. Samples of the present invention include, without limitation, samples comprising cells, conveniently blood, biopsy, tissue scraping, hair roots, and the like, such as a biopsy specimen or tissue cultures or cells derived therefrom and the progeny thereof. The term encompasses samples that have been manipulated in any way after their procurement, such as by treatment with reagents, cell cultures, or enrichment for certain components. The term encompasses a clinical sample, and also includes cells in cell culture, cell supernatants, cell lysates, serum, plasma, biological fluids, and tissue samples. Samples containing fibroblasts are convenient for the assays described herein, and can be obtained by a superficial punch skin biopsy under a local anesthetic. Peripheral blood is another useful source of cells.

The terms "treatment", "treating" and the like are used herein to generally mean obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. Treatment may also refer to experimental procedures in which a cell or animal model is exposed to a regimen, e.g. a drug candidate.

"Treatment" includes: (a) preventing the disease from occurring in a subject which may be predisposed to the disease but has not yet been diagnosed as having it; (b) inhibiting the disease, i.e., arresting its development; or (c) relieving the disease, i.e., causing regression of the disease. The therapeutic agent may be administered before, during or after the onset of disease or injury. The treatment of ongoing disease, where the treatment stabilizes or reduces the undesirable clinical symptoms of the patient, is of particular interest. Such treatment is desirably performed prior to complete loss of function in the affected tissues. The subject therapy can be administered during early symptomatic stage of the disease, and in some cases during symptomatic stages of the disease.

The terms "individual," "subject," "host," and "patient," are used to refer any mammalian subject for whom diagnosis, treatment, or therapy is desired, particularly humans.

The term "susceptibility", as described herein, means primarily increased susceptibility. Thus, the evaluation of a sample from an individual that shows decreased degradation of Miro1 on damaged or depolarized mitochondria is characteristic of increased susceptibility to development of Parkinson's disease, as characterized by a relative risk of greater than one.

Movement disorders. Movement disorders are commonly classified as those with decreased or slow movement (hypokinetic disorders) or increased movement (hyperkinetic disorders). The classic and most common hypokinetic disorder is Parkinson disease. Hyperkinetic disorders include tremor, myoclonus, dystonia, chorea, and tics.

Atypical parkinsonism refers to a group of neurodegenerative disorders other than Parkinson disease that have some features of Parkinson disease but have some different clinical features and a different pathology. As shown herein, the Miro1 status of an individual, assessed by the methods described herein, provides a distinction between PD and atypical parkinsonism. Atypical parkinsonism encompasses neurodegenerative disorders such as progressive supranuclear palsy, dementia with Lewy bodies, corticobasal ganglionic degeneration, and multiple system atrophy. Deficits that suggest neurodegenerative disorders other than Parkinson disease include gaze palsies, signs of corticospinal tract dysfunction (eg, hyperreflexia), myoclonus, autonomic dysfunction (if early or severe), cerebellar ataxia, prominent dystonia, ideomotor apraxia (inability to mimic hand motions), early dementia, early falls, and confinement to a wheelchair.

Parkinson's disease. Parkinson's disease (PD) also known as idiopathic or primary parkinsonism, hypokinetic rigid syndrome/HRS, or paralysis agitans, is a degenerative disorder of the central nervous system. The motor symptoms of Parkinson's disease result from the death of dopamine-generating neurons in the substantia nigra, a region of the midbrain, and putamen; the cause of this cell death is unknown. Early in the course of the disease, the most obvious symptoms are movement-related; these include shaking, rigidity, resting tremors, bradykinesia, postural stability, slowness of movement and difficulty with walking and gait. Later, thinking and behavioral problems may arise, with dementia, e.g. cognitive impairment, hallucinations, delusion, behavioral abnormalities, depression, disturbance of sleep and wakefulness, commonly occurring in the advanced stages of the disease, whereas depression is the most common psychiatric symptom. Other symptoms include sensory (loss of smell), sleep (disturbance of sleep and wakefulness) and emotional problems, constipation, hypotension, urinary frequency, impotence and sweating. Parkinson's disease is more common in older people, with most cases occurring after the age of 50.

Parkinson's Disease may be of the familial form or the sporadic form. By a familial form, it is meant that the disease is inherited, i.e. by the passage of a heritable gene mutation from parent to child through the gametes. A number of different heritable mutations have been associated with PD, including for example, mutations in PTEN-induced putative kinase 1 (PINK-1); Parkin (also known as RBR E3 ubiquitin protein ligase, or PARK2); leucine-rich repeat kinase 2 (LRRK2); alpha-Synuclein (SNCA, PARK4); ubiquitin carboxy-terminal hydrolase L1 (UCHL1); parkinson protein 7 (PARK7, DJ-1); ATPase type 13A2 (ATP13A2); phospholipase A2, group VI (PLA2G6); DnaJ (Hsp40) homolog, subfamily C, member 6 (DNAJC6, PARK19); eukaryotic translation initiation factor 4 gamma, 1 (EIF4G1, PARK18); F-box protein 7 (FBXO7); GRB10 interacting GYF protein 2 (GIGYF2); HtrA serine peptidase 2 (HTRA2); synaptojanin 1 (SYNJ1); or vacuolar protein sorting 35 homolog (VPS35). By a sporadic form, it is meant that the disease occurs sporadically, i.e. due to sporadic mutation of a gene, e.g. one of the aforementioned genes.

Compositions and Methods

Provided herein are Miro1 reducers, which reduce the presence or activity of Miro1 in a cell and are useful for the treatment of Parkinson's Disease. As discussed above, mitochondrial transport proteins are proteins that are involved in the transport of mitochondria in a cell, e.g., transport of mitochondria from a neuron cell body to and along an axon.

In some aspects of the invention, the Miro1 reducer is provided in a pharmaceutical composition, wherein the pharmaceutical composition comprises a therapeutically effective amount of a compound of Formula I or a pharmaceutically acceptable salt or derivative therefrom:

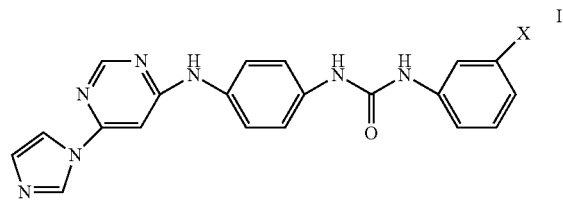

where X is F, Cl, Br, I, together with a suitable amount of carrier so as to provide the form for proper administration to a patient. In some embodiments X is F.

A Miro1 reducer will inhibit the level or biological activity of Miro1 by 20% or more, for example, 30% or more, 40% or more, or 50% or more, sometimes 60% or more, 70% or more, or 80% or more, e.g. 90%, 95%, or 100%, relative to an untreated control not contacted with the reducer. A reducer may be validated as such by any convenient method in the art for detecting the level and/or activity of Miro1 in the presence versus absence of the Miro1 reducer. In some embodiments a reducer does not inhibit basal levels of Miro1, but reduces the level or activity of Miro1 following damage to mitochondria, e.g. uncoupling, deprotonation, etc.

For example, Miro1 degradation can be assessed by the assays described herein. Alternatively, the level and/or the phosphorylation state of a Miro protein (Ser156, Thr298 or Thr299 of Miro1 and Miro2, see, e.g., Wang et al. Cell 2011, 147(4): 893-906) may be detected, for example by immunoprecipitation with a mitochondrial transport protein-specific antibody followed by Western blotting with a phospho-specific antibody, where an increase in phosphorylation of Miro proteins or a decrease in phosphorylation of Khc following contact with the agent may indicate that the agent will treat Parkinson's Disease. As another example, the level and/or the ubiquitination of a Miro protein may be detected, for example by immunoprecipitation with a mitochondrial transport protein-specific antibody followed by Western blotting with a ubiquitin-specific antibody, where an increase in ubiquitination following contact with the candidate agent indicates that the agent will treat Parkinson's Disease. As another example, the ability of the target mitochondrial protein to transport mitochondria within a cell may be assessed by, for example, treating cultured cells (e.g., neurons) with the Miro1 reducer and observing the transport of mitochondria in the cells as compared to cells not treating with the Miro1 reducer, e.g., using live cell imaging techniques (see, e.g., Brickley and Stephenson J. Biol Chem 286(20): 18079-92 (2011); Misko et al. J Neurosci 30(19): 4232-40 (2010); Russo G J et al. J. Neurosci 29(17):5443-55 (2009)). As another example, because the formation of a complex between Miro (e.g., Miro 1 and 2), TRAK (e.g., TRAK1 and 2), and Khc is essential for mitochondrial transport in neurons (see e.g., Brickley and Stephenson J. Biol Chem 286(20): 18079-92 (2011)), the effect of Miro1 reducer on Miro function may be assessed by assessing the ability of Miro, TRAK and Khc to form a complex in the presence of the Miro1 reducer. Such an assessment can be performed using any technique to determine protein-protein interaction including, but not limited to, co-immunoprecipitation and affinity purification techniques. In specific embodiments, the ability is assessed in a cell having a familial PD mutation, e.g. a PINK1 or LRRK2 mutation.

Antibody and small molecule inhibitors may be screened using a variety of methods to detect target binding in vitro and in vivo. e.g., ELISA assays, etc. These methods include, but are not limited to, methods that measure binding affinity to a target, biodistribution of the compound within an animal or cell, or compound mediated cytotoxicity. As a first test, the antibody or small molecule may be tested for binding against the target mitochondrial transport protein. After selective binding is established, the candidate antibody may be tested for appropriate activity in an in vivo model. These and other screening methods known in the art provide information on the ability of a compound to bind to, modulate, or otherwise interact with the specified target and are a measure of the compound's efficacy.

The reducer described herein may be administered alone or in combination with any pharmaceutically acceptable carrier or salt known in the art and as described below.

Pharmaceutical Compositions

In some embodiments, a pharmaceutical composition comprising an effective dose of Miro1 reducer is provided, which dose may be sufficient to achieve a therapeutic level of Miro1 of at least 1 µM, at least 5 µM, at least 10 µM, at least 20 µM, up to about 1 mM, up to about 500 µM, up to about 250 µM, up to about 100 µM, up to about 75 µM, up to about 50 IM. A unit dose may be, for example, 1 µg/kg, 10 µg/kg, 100 µg/kg, 500 µg/kg, 1 mg/kg, 5 mg/kg, 10 mg/kg, 50 mg/kg, 100 mg/kg, or more.

The term "pharmaceutically acceptable" means approved by a regulatory agency of the Federal or a state government or listed in the U.S. Pharmacopeia or other generally recognized foreign pharmacopeia for use in animals, and more particularly in humans. The term "carrier" or "vehicle" refers to a diluent, adjuvant, excipient, or vehicle with which the Miro1 reducer is administered. Such pharmaceutical carriers can be, for example, lipids, e.g. liposomes, e.g. liposome dendrimers; sterile liquids, such as saline solutions in water and oils, including those of petroleum, animal, vegetable or synthetic origin, such as peanut oil, soybean oil, mineral oil, sesame oil and the like. A saline solution is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained-release formulations and the like. The composition can be formulated as a suppository, with traditional binders and carriers such as triglycerides. The reducer can be formulated as neutral or salt forms. Pharmaceutically acceptable salts include those formed with free amino groups such as those derived from hydrochloric, phosphoric, acetic, oxalic, tartaric acids, etc., and those formed with free carboxyl groups such as those derived from sodium, potassium, ammonium, calcium, ferric hydroxides, isopropylamine, triethylamine, 2-ethylamino ethanol, histidine, procaine, etc. Examples of suitable pharmaceutical carriers are described in "Remington's Pharmaceutical Sciences" by E. W. Martin, hereby incorporated by reference herein in its entirety. Such compositions will contain a therapeutically effective amount of the Miro1 reducer, preferably in purified form, together with a suitable amount of carrier so as to provide the form for proper administration to the patient. The formulation should suit the mode of administration.

The pharmaceutical composition can also include any of a variety of stabilizing agents, such as an antioxidant for example. When the pharmaceutical composition includes a polypeptide, the polypeptide can be complexed with various well-known compounds that enhance the in vivo stability of the polypeptide, or otherwise enhance its pharmacological properties (e.g., increase the half-life of the polypeptide, reduce its toxicity, enhance solubility or uptake). Examples of such modifications or complexing agents include sulfate, gluconate, citrate and phosphate. The polypeptides of a composition can also be complexed with molecules that enhance their in vivo attributes. Such molecules include, for example, carbohydrates, polyamines, amino acids, other peptides, ions (e.g., sodium, potassium, calcium, magnesium, manganese), and lipids.

Further guidance regarding formulations that are suitable for various types of administration can be found in Remington's Pharmaceutical Sciences, Mace Publishing Company, Philadelphia, Pa., 17th ed. (1985). For a brief review of methods for drug delivery, see, Langer, Science 249: 1527-1533 (1990).

The components used to formulate the pharmaceutical compositions are preferably of high purity and are substantially free of potentially harmful contaminants (e.g., at least National Food (NF) grade, generally at least analytical grade, and more typically at least pharmaceutical grade). Moreover, compositions intended for in vivo use are usually sterile. To the extent that a given compound must be synthesized prior to use, the resulting product is typically substantially free of any potentially toxic agents, particularly any endotoxins, which may be present during the synthesis or purification process.

The subject pharmaceutical composition is typically sterile. Sterility is readily accomplished by filtration through sterile filtration membranes (e.g., 0.2 µm membranes). Therapeutic compositions generally are placed into a container having a sterile access port, for example, an intravenous solution bag or vial having a stopper pierceable by a hypodermic injection needle. The pharmaceutical composition may be stored in unit or multi-dose containers, for example, sealed ampules or vials, as an aqueous solution or as a lyophilized formulation for reconstitution. As an example of a lyophilized formulation, 10-mL vials are filled with 5 ml of sterile-filtered 1% (w/v) aqueous solution of compound, and the resulting mixture is lyophilized. The pharmaceutical composition comprising the lyophilized Miro1 reducer is prepared by reconstituting the lyophilized compound, for example, by using bacteriostatic Water-for-Injection.

The pharmaceutical composition can be formulated for intravenous, oral, via implant, transmucosal, transdermal, intramuscular, intrathecal, or subcutaneous administration. In some embodiments, the pharmaceutical composition is formulated for intravenous administration. In other embodiments, the pharmaceutical composition is formulated for subcutaneous administration. The following delivery systems, which employ a number of routinely used pharmaceutical carriers, are only representative of the many embodiments envisioned for administering the instant compositions.

Injectable drug delivery systems include solutions, suspensions, gels, microspheres and polymeric injectables, and can comprise excipients such as solubility-altering agents (e.g., ethanol, propylene glycol and sucrose) and polymers (e.g., polycaprylactones and PLGAs). Implantable systems include rods and discs, and can contain excipients such as PLGA and polycaprylactone. Osteopontin or nucleic acids of the invention can also be administered attached to particles using a gene gun.

Oral delivery systems include tablets and capsules. These can contain excipients such as binders (e.g., hydroxypropylmethylcellulose, polyvinyl pyrolidone, other cellulosic materials and starch), diluents (e.g., lactose and other sugars, starch, dicalcium phosphate and cellulosic materials), disintegrating agents (e.g., starch polymers and cellulosic materials) and lubricating agents (e.g., stearates and talc).

Transmucosal delivery systems include patches, tablets, suppositories, pessaries, gels and creams, and can contain excipients such as solubilizers and enhancers (e.g., propylene glycol, bile salts and amino acids), and other vehicles (e.g., polyethylene glycol, fatty acid esters and derivatives, and hydrophilic polymers such as hydroxypropylmethylcellulose and hyaluronic acid).

Dermal delivery systems include, for example, aqueous and nonaqueous gels, creams, multiple emulsions, microemulsions, liposomes, ointments, aqueous and nonaqueous solutions, lotions, aerosols, hydrocarbon bases and powders, and can contain excipients such as solubilizers, permeation enhancers (e.g., fatty acids, fatty acid esters, fatty alcohols and amino acids), and hydrophilic polymers (e.g., polycarbophil and polyvinylpyrolidone). In one embodiment, the pharmaceutically acceptable carrier is a liposome or a transdermal enhancer.

In certain embodiments, the subject pharmaceutical composition is formulated to cross the blood brain barrier (BBB). One strategy for drug delivery through the blood brain barrier (BBB) entails disruption of the BBB, either by osmotic means such as mannitol or leukotrienes, or biochemically by the use of vasoactive substances such as bradykinin. A BBB disrupting agent can be co-administered with the therapeutic compositions when the compositions are administered by intravascular injection. Other strategies to go through the BBB may entail the use of endogenous transport systems, including caveoil-1 mediated transcytosis, carrier-mediated transporters such as glucose and amino acid carriers, receptor-mediated transcytosis for insulin or transferrin, and active efflux transporters such as p-glycoprotein. Active transport moieties may also be conjugated to the therapeutic compounds for use in the invention to facilitate transport across the endothelial wall of the blood vessel. Alternatively, drug delivery of the ND pharmaceutical composition behind the BBB may be by local delivery, for example by intrathecal delivery, e.g., through an Ommaya reservoir (see, e.g., U.S. Pat. Nos. 5,222,982 and 5,385,582, incorporated herein by reference); by bolus injection, e.g., by a syringe, e.g., intravitreally or intracranially; by continuous infusion, e.g., by cannulation, e.g., with convection (see, e.g., US Application No. 20070254842, incorporated here by reference); or by implanting a device upon which the Miro1 reducer pharmaceutical composition has been reversibly affixed (see e.g., US Application Nos. 20080081064 and 20090196903, incorporated herein by reference).

Components of the pharmaceutical composition can be supplied either separately or mixed together in unit dosage form, for example, as a dry lyophilized powder or water free concentrate. Where the composition is to be administered by infusion, it can be dispensed with an infusion bottle containing sterile pharmaceutical grade water or saline. Where the composition is administered by injection, an ample of sterile water for injection or saline can be provided so that the ingredients may be mixed prior to administration.

In some embodiments, the pharmaceutical composition is supplied as a dry sterilized lyophilized powder that is capable of being reconstituted to the appropriate concentration for administration to a subject. In some embodiments, the pharmaceutical composition is supplied as a water free concentrate. In some embodiments, the pharmaceutical composition is supplied as a dry sterile lyophilized powder at a unit dosage of at least 0.5 mg, at least 1 mg, at least 2 mg, at least 3 mg, at least 5 mg, at least 10 mg, at least 15 mg, at least 25 mg, at least 30 mg, at least 35 mg, at least 45 mg, at least 50 mg, at least 60 mg, or at least 75 mg.

Solutions, suspensions and powders for reconstitutable delivery systems include vehicles such as suspending agents (e.g., gums, xanthans, cellulosics and sugars), humectants (e.g., sorbitol), solubilizers (e.g., ethanol, water, PEG and propylene glycol), surfactants (e.g., sodium lauryl sulfate, Spans, Tweens, and cetyl pyridine), preservatives and antioxidants (e.g., parabens, vitamins E and C, and ascorbic acid), anti-caking agents, coating agents, and chelating agents (e.g., EDTA).

In some embodiments, the pharmaceutical composition is formulated as a salt form. Pharmaceutically acceptable salts include those formed with anions such as those derived from hydrochloric, phosphoric, acetic, oxalic, tartaric acids, etc., and those formed with cations such as those derived from sodium, potassium, ammonium, calcium, ferric hydroxides, isopropylamine, triethylamine, 2-ethylamino ethanol, histidine, procaine, etc.

Methods of Treatment

In some aspects of the invention, methods are provided for the treatment or amelioration of Parkinson's Disease in a subject having or at risk for developing the Parkinson's Disease, the method comprising administering to the subject a therapeutically effective amount of Miro1 reducer or pharmaceutical composition thereof as described herein. In other words, cells of the subject, e.g. neuronal cells, are contacted in vivo with Miro1 reducer. For example, in the treatment of a subject having Parkinson's Disease, one or more neurons, e.g. dopaminergic neurons, e.g. a dopaminergic neuron residing in the substantia nigra of the midbrain and/or putamen, is contacted with Miro1 reducer. Cells in vivo may be contacted with Miro1 reducer by any convenient method for the administration of polypeptides, and nucleic acids, or small molecules to a subject, e.g. as described herein or known in the art. Often, the subject is a mammal. Mammalian species that may be treated with the present methods include canines; felines; equines; bovines; ovines; etc. and primates, particularly humans. In some embodiments, the method is for the treatment of a human. Animal models, particularly small mammals, e.g., murine, lagomorpha, etc. may be used for experimental investigations By a "therapeutically effective amount" of the Miro1 reducer it is meant an amount that is required to reduce the severity, the duration and/or the symptoms of the Parkinson's Disease, e.g. as described herein or as known in the art. For example, the therapeutically effective amount may slow the rate of progression of the disease and the increase of severity of clinical symptoms, may halt the progression of the disease and the clinical symptoms, or may cause a regression of the disease and the clinical symptoms. In some instances, the method further comprises the step of measuring one or more of the clinical symptoms of the Parkinson's Disease, e.g. motor symptoms, neuronal symptoms, etc., e.g. as described herein or known in the art before and/or after treatment with the Miro1 reducer and determining that the one or more symptoms have been reduced.

The calculation of the effective amount or effective dose of the Miro1 reducer or pharmaceutical composition to be administered is within the skill of one of ordinary skill in the art, and will be routine to those persons skilled in the art by using assays known in the art, e.g. as described herein. The effective amount of Miro1 reducer pharmaceutical composition to be given to a particular patient will depend on a variety of factors, several of which will differ from patient to patient. A competent clinician will be able to determine an effective amount of a therapeutic agent to administer to a patient to halt or reverse the progression the disease condition as required. For example, the effective amount may be dependent upon the route of administration and the seriousness of the Parkinson's Disease, and should be decided according to the judgment of the practitioner and each human patient's circumstances.

Determining a therapeutically effective amount of the Miro1 reducer can be done based on animal data using routine computational methods. For example, effective amounts may be extrapolated from dose-response curves derived from preclinical protocols either in vitro (e.g., dopaminergic neuron cultures, such as the ones described below, treated with rotenone or MPP+ for 24h, or with Epoxymicin for 48h) or using any of the in vivo Parkinson's Disease animal models known in the art (e.g., 6-hydroxydopamine (6-OHDA) rat model, MPTP mouse or primate model or rotenone model). See, for example, Duty et al., Br J Pharmacol. 164(4): 1357-1391 (2011), incorporated herein by reference. Utilizing LD50 animal data, and other information available for the agent, a clinician can determine the maximum safe dose for an individual, depending on the route of administration. For instance, an intravenously administered dose may be more than an intrathecally administered dose, given the greater body of fluid into which the therapeutic composition is being administered. Similarly, compositions which are rapidly cleared from the body may be administered at higher doses, or in repeated doses, in order to maintain a therapeutic concentration. Utilizing ordinary skill, the competent clinician will be able to optimize the dosage of a particular therapeutic in the course of routine clinical trials.

In some embodiments, the effective amount of the pharmaceutical composition provided herein is between about 0.025 mg/kg and about 1000 mg/kg body weight of a human subject. In certain embodiments, the pharmaceutical composition is administered to a human subject at an amount of about 1000 mg/kg body weight or less, about 950 mg/kg body weight or less, about 900 mg/kg body weight or less, about 850 mg/kg body weight or less, about 800 mg/kg body weight or less, about 750 mg/kg body weight or less, about 700 mg/kg body weight or less, about 650 mg/kg body weight or less, about 600 mg/kg body weight or less, about 550 mg/kg body weight or less, about 500 mg/kg body weight or less, about 450 mg/kg body weight or less, about 400 mg/kg body weight or less, about 350 mg/kg body weight or less, about 300 mg/kg body weight or less, about 250 mg/kg body weight or less, about 200 mg/kg body weight or less, about 150 mg/kg body weight or less, about 100 mg/kg body weight or less, about 95 mg/kg body weight or less, about 90 mg/kg body weight or less, about 85 mg/kg body weight or less, about 80 mg/kg body weight or less, about 75 mg/kg body weight or less, about 70 mg/kg body weight or less, or about 65 mg/kg body weight or less.

In some embodiments, the effective amount of the pharmaceutical composition provided herein is between about 0.025 mg/kg and about 60 mg/kg body weight of a human subject. In some embodiments, the effective amount of an antibody of the pharmaceutical composition provided herein is about 0.025 mg/kg or less, about 0.05 mg/kg or less, about 0.10 mg/kg or less, about 0.20 mg/kg or less, about 0.40 mg/kg or less, about 0.80 mg/kg or less, about 1.0 mg/kg or less, about 1.5 mg/kg or less, about 3 mg/kg or less, about 5 mg/kg or less, about 10 mg/kg or less, about 15 mg/kg or less, about 20 mg/kg or less, about 25 mg/kg or less, about 30 mg/kg or less, about 35 mg/kg or less, about 40 mg/kg or less, about 45 mg/kg or less, about 50 mg/kg or about 60 mg/kg or less.

The Miro1 reducer can be administered for prophylactic and/or therapeutic treatments. Toxicity and therapeutic efficacy of the active ingredient can be determined according to standard pharmaceutical procedures in cell cultures and/or experimental animals, including, for example, determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Compounds that exhibit large therapeutic indices are preferred.

The data obtained from cell culture and/or animal studies can be used in formulating a range of dosages for humans. The dosage of the active ingredient typically lines within a range of circulating concentrations that include the $ED_{50}$ with low toxicity. The dosage can vary within this range depending upon the dosage form employed and the route of administration utilized. The Miro1 reducer can be administered daily, semi-weekly, weekly, semi-monthly, monthly, etc., at a dose of from about 0.01 mg, from about 0.1 mg, from about 1 mg, from about 5 mg, from about 10 mg, from about 100 mg or more per kilogram of body weight when administered systemically. Smaller doses may be utilized in localized administration, e.g., in direct administration to ocular nerves, etc.

Administration of the Miro1 reducer can be achieved in various ways, including oral, buccal, rectal, parenteral, intraperitoneal, intradermal, transdermal, intracheal, intracranial, intraventricular, intracerebral, etc., administration. The pharmaceutical composition comprising the Miro1 reducer may be systemic after administration or may be localized by the use of regional administration, intramural administration, or use of an implant that acts to retain the active dose at the site of implantation. As discussed above, the pharmaceutical composition comprising the Miro1 reducer may be formulated for immediate activity or they may be formulated for sustained release.

In certain embodiments, the Miro1 reducer or pharmaceutical composition thereof is administered in combination with a second therapeutic agent for the treatment or amelioration of the Parkinson's Disease. For example, the subject methods may comprise administration of a second therapeutic agent known in the art to treat Parkinson's disease, e.g., levodopa (alone or in combination with a dopa decarboxylase inhibitor or COMT inhibitor), dopamine agonists (e.g., bromocriptine, pergolide, pramipexole, ropinirole, piribedil, cabergoline, apomorphine, and lisuride), MAO-B inhibitors (e.g., selegiline and rasagiline), amantadine, an anticholinergic, or a polypeptide, peptide, antibody, nucleic acid, or small molecule that acts as a PUM1 antagonist, an SR protein antagonist, a Parkin agonist, a PINK1 agonist, an 4E-BP1 agonist, a Drp1 agonist, an Atg1 agonist, a TauS2A agonist, a Rbf1 agonist, a Dp antagonist, an E2f1 antagonist, a Polo-like kinase 2 antagonist or a Notch agonist. By an agonist, it is meant an agent that induces, promotes, enhances the expression or activity of a gene or gene product, for example, a cDNA that encodes one of the aforementioned gene products, a polypeptide or peptide mimetic that encodes one of the aforementioned gene products, a polypeptide or peptide that encodes a protein that activates one of the aforementioned gene products, an activating antibody that is specific for one of the aforementioned gene products, and the like. By an antagonist, it is meant an agent that reduces, suppresses, or inhibits the expression or activity of a gene or gene product, for example, an RNA (e.g. siRNA, antisense RNA, etc., as described elsewhere herein or known in the art) that is specific for one of the aforementioned gene products, a blocking antibody that is specific for one of the aforementioned gene products, or a small molecule that inhibits the activity of one of the aforementioned gene products).

Methods to Assay Miro1 Status

Assays are provided for determining the Miro1 status of a cell or population of cells. Miro1 is normally removed from damaged, e.g. depolarized, mitochondria to facilitate their clearance via mitophagy, but a defect in this degradation can occur, which defect can be detected using biochemical assays. The defect in degradation is strongly associated with PD or a predisposition to PD. A high percentage of Parkinson's Disease patients are deficient in the removal of Miro1 following depolarization. However, Miro1 is efficiently degraded upon depolarization in control cells. Detection of this PD-associated defect is useful for diagnosis of PD and prognosis of susceptibility to PD, optionally including the step of treating an individual thus diagnosed; monitoring of clinical response to PD following treatment, in the context of a clinical trial, etc.; screening drugs for efficacy in reducing this defect in Miro1 degradation, etc. The methods allow assessment of Parkinson's disease accurately, early and in a clinically practical way.

The methods of analysis can be made by examining a cell composition for the presence of a Miro1 polypeptide following mitochondrial uncoupling, including chemically induced depolarization. These assay methods can be performed with cell lines, cells obtained from an individual, including without limitation biological samples such as fibroblasts, peripheral blood lymphocytes, and the like. The assay is generally performed on viable, i.e. living cells. Fibroblasts are a convenient source of cells from individuals, and can be easily obtained from patients by a minimally-invasive, painless procedure ENREF 12. Cultured cells may be derived from patient or control samples; and may be modified to generate genetically-modified cells, in vitro differentiated cells, cells exposed to a candidate therapeutic agent; and the like. In some embodiments the assay is performed on a population of cells from an individual to determine the Miro1 phenotype of the individual.

In addition, cells that have been genetically altered, e.g. by transfection or transduction with recombinant genes or by antisense technology, to provide a gain or loss of genetic function, may be utilized with the invention. Methods for generating genetically modified cells are known in the art, see for example "Current Protocols in Molecular Biology", Ausubel et al., eds, John Wiley & Sons, New York, N.Y., 2000. The genetic alteration may be a knock-out, usually where homologous recombination results in a deletion that knocks out expression of a targeted gene; or a knock-in, where a genetic sequence not normally present in the cell is stably introduced.

A variety of methods may be used in the present invention to achieve a knock-out, including site-specific recombination, expression of anti-sense or dominant negative mutations, and the like. Knockouts have a partial or complete loss of function in one or both alleles of the endogenous gene in the case of gene targeting. Preferably expression of the targeted gene product is undetectable or insignificant in the cells being analyzed. This may be achieved by introduction of a disruption of the coding sequence, e.g. insertion of one or more stop codons, insertion of a DNA fragment, etc., deletion of coding sequence, substitution of stop codons for coding sequence, etc. In some cases the introduced sequences are ultimately deleted from the genome, leaving a net change to the native sequence.

A cell sample may comprise, for example, at least about $10^2$ cells, at least about $10^3$ cells, at least about $10^4$ cells, at least about $10^5$ cells, at least about $10^6$ cells, at least about $10^7$ cells, or more. Higher numbers of cells are optionally assayed in multiple aliquots. The cells are contacted with an agent that uncouples or depolarizes mitochondria. The concentration of agent and time of exposure is sufficient to uncouple or depolarize the mitochondria. For example, CCCP at a concentration of from about 10-100 μM, for example from about 20 to 80 μM, from about 30 to 50 μM is sufficient. Dosage of other agents may provide for activity comparable to these concentrations of CCCP. The cells are incubated for a period of time sufficient to depolarize mitochondria and initiate clearance, e.g. at least about 1 hour, at least about 2 hours, and usually not more than about 24 hours, and may be from about 1 to 24 hours, from about 2 to 20 hours, from about 3 to 18 hours, from about 4 to 14 hours, from about 5 to 10 hours, and may be from about 4 to 8 hours.

In some embodiments the agent is a mitochondria-specific uncoupler, e.g. a protonophore. Agents suitable for this purpose include FCCP, CCCP, DNP, BAM15, etc., as known in the art and described herein. Following mitochondrial depolarization, the cells are lysed and assessed for levels of Miro1, where a deficiency in Miro1 degradation relative to a control is indicative of an association with PD. The deficiency may be expressed, for example, as the ratio in Miro1 levels of a cell lysate subjected to a mitochondrial uncoupling agent relative to the same cells in the absence of an uncoupling agent. PD associated cells may have at least 2-fold the Miro1 present, at least 3-fold, at least 4-fold, or more relative to a normal cell.

A test sample from an individual is assessed for the presence of an alteration in Miro1 degradation in response to mitochondrial uncoupling. The term "alteration" in the polypeptide levels, as used herein, refers to an alteration in levels compared with a control sample. A control sample is a sample that corresponds to the test sample (e.g., is from the same type of cells), and is from an individual who is not affected by a susceptibility to PD. An alteration in the level of the polypeptide in the test sample, as compared with the control sample, is indicative of a susceptibility to PD. Protein levels can be determined by a variety of methods, including enzyme linked immunosorbent assays (ELISAs), Western blots, immunoprecipitations and immunofluorescence, etc.

For example, in one aspect, an antibody capable of binding to the polypeptide (e.g., as described above), can be used for capture or detection. Antibodies can be polyclonal, or more preferably, monoclonal. An intact antibody, or a fragment thereof (e.g., Fab or F(ab')$_2$) can be used. The term "labeled", with regard to the probe or antibody, is intended to encompass direct labeling of the probe or antibody by coupling (i.e., physically linking) a detectable substance to the probe or antibody, as well as indirect labeling of the probe or antibody by reactivity with another reagent that is directly labeled. Examples of indirect labeling include detection of a primary antibody using a fluorescently labeled secondary antibody, enzyme linked assays, radiolabeled antibodies; and the like as known in the art.

Miro1 degradation may be monitored in a variety of ways. Western blotting analysis, using an antibody that specifically binds to Miro1 can be used to identify the presence in a test sample, e.g. following cell fractionation, and may be quantitative. In other embodiments, a high throughput immunoassay is preferred. Conveniently, the removal of Miro1 is detected in a patient sample by an immunoassay, such as ELISA or other high throughput affinity assays.

In some embodiments a Miro1 assay as described above is utilized for the diagnosis and clinical monitoring of movement disorders, which diseases include, without limitation, Parkinson's disease. In some embodiments, the methods of the invention are used in determining the efficacy of a therapy for treatment of a movement disorder, e.g. in vitro, such as drug screening assays and the like; at an individual level; in the analysis of a group of patients, e.g. in a clinical trial format; etc. Clinical trial embodiments may involve the comparison of two or more time points for a patient or group of patients. The patient status is expected to differ between the two time points as the result of administration of a therapeutic agent, therapeutic regimen, or challenge with a disease-inducing agent to a patient undergoing treatment. The response of a patient with a movement disorder to therapy is assessed by detecting the ability of a cell sample from a patient, including without limitation a fibroblast sample, to degrade Miro1 after mitochondria damage, e.g. mitochondrial depolarization.

In some embodiments, the method comprises identifying a patient as having PD or a predisposition to PD, e.g. by criteria described above for Miro1 degradation; administering a dose of a therapeutic agent to the patient, and quantitating the degradation of Miro1 in response to mitochondrial depolarization in at least one patient sample.

In some embodiments, the methods of the invention are used in determining the efficacy of a therapy for treatment of a movement disorder, either at an individual level, or in the analysis of a group of patients, e.g. in a clinical trial format. Such embodiments typically involve the comparison of two time points for a patient or group of patients. The patient status is expected to differ between the two time points as the result of a therapeutic agent, therapeutic regimen, or disease challenge to a patient undergoing treatment.

For regulatory approval of treatments that offer symptomatic benefit in Parkinson's disease patients, clinical trials have used a double-blind, placebo-controlled, parallel group design with fixed or flexible dosing strategy. A variety of efficacy outcome measures (one or more combinations of subscales of the Unified Parkinson's Disease Rating Scale [UPDRS]) and need for additional symptomatic therapy such as dopaminergic agonists, levodopa, have been used to assess the effects of treatment.

The current criteria for approval of drugs for Parkinson's disease is based on the change in "total" UPDRS (sum of parts I, II, and III) or individual parts of "total" UPDRS at the last visit do not differentiate drug effects that could be symptomatic, disease modifying, or both. A two-phase study design (e.g., randomized withdrawal, delayed start) has been proposed to discern symptomatic and disease-modifying effects. An alternate design known as a randomized start design or delayed start design has been proposed. In addition to the UPDRS and PDQ, many other cognitive scales and measures of disability and symptoms are commonly used in PD treatment and research.

In clinical trials utilizing a delayed start design, patients are initially randomized to placebo or study drug for a certain duration (e.g., 36 weeks). This phase is referred to as the placebo control phase. At the end of the placebo control phase, patients who were randomized to placebo are switched to the study drug. The phase on study drug post 36 weeks is referred to as the active control phase. Patients who were randomized to the study drug initially during the placebo control phase will continue to receive drug in the active control phase. The patients who received placebo in the placebo control phase are referred to as the delayed start group. Patients who received treatment in both phases are referred to as the early start group. The evidence of a disease-modifying benefit can be demonstrated by testing the following hypotheses: In the placebo control phase, the slope of total UPDRS change over time for the study drug group is shallower than that for the placebo group; at the end of the active control phase, the early-start group would have a lower total UPDRS change compared to the delayed start group; in the active control phase, the slope of total UPDRS change over time for the early and delayed start groups remains parallel.

Patient samples include a variety of bodily fluids in which cells are present for analysis. The samples will be taken prior to administration of a candidate agent, and at suitable time points following administration, e.g. at 15 minutes, 30 minutes, 1 hour, 1.5 hours, 2 hours, 2.5 hours, 3 hours, 4 hours, 6 hours, 1 day, 2 days, 3 days, 4 days, 1 week, 2 weeks, 3 weeks, etc., following administration.

Examples of formats for such embodiments may include, without limitation, testing Miro1 degradation at two or more time points, where a first time point is a diagnosed but untreated patient; and a second or additional time point(s) is a patient treated with a candidate therapeutic agent or regimen.

In such clinical trial formats, each set of time points may correspond to a single patient, to a patient group, e.g. a cohort group, or to a mixture of individual and group data. Additional control data may also be included in such clinical trial formats, e.g. a placebo group, a disease-free group, and the like, as are known in the art. Formats of interest include crossover studies, randomized, double-blind, placebo-controlled, parallel group trial is also capable of testing drug efficacy, and the like. See, for example, Clinical Trials: A Methodologic Perspective Second Edition, S. Piantadosi, Wiley-Interscience; 2005, ISBN-13: 978-0471727811; and Design and Analysis of Clinical Trials: Concepts and Methodologies, S. Chow and J. Liu, Wiley-Interscience; 2003; ISBN-13: 978-0471249856, each herein specifically incorporated by reference.

In one embodiment, a blinded crossover clinical trial format is utilized. In another embodiment a randomized, double-blind, placebo-controlled, parallel group trial is used to test drug efficacy. In one embodiment, individuals identified as having Parkinson's disease undergo three sequential treatment periods, each of a set duration. Subjects will be assessed with at entry and at the end of each treatment period.

Also provided are databases of pharmacologic analyses. Such databases will typically comprise analysis profiles of various individuals following a clinical protocol of interest etc., where such profiles are further described below.

The profiles and databases thereof may be provided in a variety of media to facilitate their use. "Media" refers to a manufacture that contains the expression profile information of the present invention. The databases of the present invention can be recorded on computer readable media, e.g. any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. "Recorded" refers to a process for storing information on computer readable medium, using any such methods as known in the art. Any convenient data storage structure may be chosen, based on the means used to access the stored information. A variety of data processor programs and formats can be used for storage, e.g. word processing text file, database format, etc.

As used herein, "a computer-based system" refers to the hardware means, software means, and data storage means used to analyze the information of the present invention. The minimum hardware of the computer-based systems of the present invention comprises a central processing unit (CPU), input means, output means, and data storage means. A skilled artisan can readily appreciate that any one of the currently available computer-based system are suitable for use in the present invention. The data storage means may comprise any manufacture comprising a recording of the present information as described above, or a memory access means that can access such a manufacture.

A variety of structural formats for the input and output means can be used to input and output the information in the computer-based systems of the present invention. Such presentation provides a skilled artisan with a ranking of similarities and identifies the degree of similarity contained in the test expression profile.

Screening Methods

In some aspects of the invention, methods are provided for screening candidate agents for activity in treating Parkinson's Disease in an individual having Parkinson's Disease. To that end, it has been shown that mitochondrial transport proteins, for example, Miro proteins, trafficking kinases, and the kinesin heavy chain, promote the development or progression of Parkinson's Disease or the symptoms thereof. Accordingly, screening for candidate agents that inhibit the expression or activity of mitochondrial transport proteins in cells can identify agents that will be useful in treating Parkinson's Disease in patients. In particular agents are tested for the ability to reduce levels of Miro1 following mitochondrial depolarization, and preferably without a substantial reduction in basal Miro1 levels.

Test agents can be obtained using any of the numerous approaches in combinatorial library methods known in the art, including: biological libraries; spatially addressable parallel solid phase or solution phase libraries; synthetic library methods requiring deconvolution; the 'one-bead one-compound' library method; and synthetic library methods using affinity chromatography selection.

In one embodiment, to identify agents that after Miro1 degradation; a cell, e.g. a viable cell or population of cells, is contacted with an agent to be tested; alternatively, the protein can be contacted directly with the agent to be tested. The level (amount) of activity is assessed either directly or indirectly, and is compared with the level of activity in a control, e.g. in the absence of the agent to be tested. If the level of the activity in the presence of the agent differs, by an amount that is statistically significant, from the level of the activity in the absence of the agent, then the agent is an agent that alters the activity.

This invention further pertains to novel agents identified by the above-described screening assays. Accordingly, it is within the scope of this invention to further use an agent identified as described herein in the methods of treatment described herein. For example, an agent identified as described herein can be used to alter Miro1 degradation with the agent identified as described herein.

For example, in screening assays for biologically active agents, cells expressing the mitochondrial transport protein of interest are contacted with a candidate agent of interest and the effect of the candidate agent on the expression or function of the mitochondrial transport protein is assessed by monitoring one or more mitochondria-associated parameters. In particular the activity of a candidate agent can be assessed by determining the level of Miro1 following mitochondria depolarization.

Parameters are quantifiable components of cells, particularly components that can be accurately measured, desirably in a high throughput system. A parameter can be any cell component or cell product including cell surface determinant, receptor, protein or conformational or posttranslational modification thereof, lipid, carbohydrate, organic or inorganic molecule, nucleic acid, e.g. mRNA, DNA, etc. or a portion derived from such a cell component or combinations thereof. While most parameters will provide a quantitative readout, in some instances a semi-quantitative or qualitative result will be acceptable. Readouts may include a single determined value, or may include mean, median value or the variance, etc. Characteristically a range of parameter readout values will be obtained for each parameter from a multiplicity of the same assays. Variability is expected and a range of values for each of the set of test parameters will be obtained using standard statistical methods with a common statistical method used to provide single values. Thus, for example, one such method may comprise contacting a cell that expresses mitochondrial transport proteins with a candidate agent; and comparing the mitochondria-associated parameter to the mitochondria-associated parameter in a cell that expresses the mitochondrial transport proteins but was not contacted with the candidate agent, wherein a difference in the parameter in the cell contacted with the candidate agent indicates that the candidate agent will treat the Parkinson's Disease.

One example of a mitochondria-associated parameter that may be quantified when screening for agents that will treat Parkinson's Disease would be the phosphorylation state of a Miro protein (Ser156, Thr298 or Thr299 of Miro1 and Miro2), a TRAK protein, or Khc (Ser residues, see, e.g., Lee and Hollenbeck J Biol Chem. 1995 270(10):5600-5), by for example, immunoprecipitation with mitochondrial transport protein-specific antibodies followed by Western blotting with phospho-specific antibodies where an increase in phosphorylation of Miro proteins or a decrease in phosphorylation of Khc following contact with the candidate agent indicates that the candidate agent may treat Parkinson's Disease. Another example of a parameter would be the state of ubiquitination of a Miro protein, a TRAK protein, or Khc, by, for example, immunoprecipitation with mitochondrial transport protein-specific antibodies followed by Western blotting with ubiquitin-specific antibodies, where an increase in ubiquitination following contact with the candidate agent indicates that the agent will treat Parkinson's Disease. Yet another example would be the rate at which mitochondria are transported around the cell, measurable by, for example live cell imaging techniques, where a decrease in the rate of transport after contacting the cell with candidate agent indicates that the agent will treat Parkinson's Disease. Another example would be the length of the mitochondria in a cell, where a decrease in the length of the mitochondria after contacting the cell with candidate agent indicates that the agent will treat Parkinson's Disease. Other output parameters could include those that are reflective of the ability of Miro proteins, TRAK proteins, and khc to form a complex (see e.g., Brickley and Stephenson J. Biol Chem 286(20): 18079-92 (2011)) in the presence of the Miro1 reducer, which may be assessed by, for example, co-immunoprecipitation or affinity purification techniques, where a decrease in complex formation after contacting the cell with candidate agent indicates that the agent will treat Parkinson's Disease. In some instances, one parameter is measured. In some instances, multiple parameters are measured.

All cells comprise mitochondria, and thus, any cell may be used in the subject screening methods. In some instances, the cell is a cell type that is typically affected by Parkinson's Disease, e.g. a muscle cell or a neuron, e.g. a motor neuron. In certain instances, the cell comprises a genetic mutation, i.e. a mutation in a nuclear or mitochondrial gene, which is associated with Parkinson's Disease. In some instances, the cell may be acutely cultured from an individual that has Parkinson's Disease.

Candidate agents of interest are biologically active agents that encompass numerous chemical classes, primarily organic molecules, which may include organometallic molecules, inorganic molecules, genetic sequences, etc. An important aspect of the invention is to evaluate candidate drugs, select therapeutic antibodies and protein-based therapeutics, with preferred biological response functions. Candidate agents comprise functional groups necessary for structural interaction with proteins, particularly hydrogen bonding, and typically include at least an amine, carbonyl, hydroxyl or carboxyl group, frequently at least two of the functional chemical groups. The candidate agents often comprise cyclical carbon or heterocyclic structures and/or aromatic or polyaromatic structures substituted with one or more of the above functional groups. Candidate agents are also found among biomolecules, including peptides, polynucleotides, saccharides, fatty acids, steroids, purines, pyrimidines, derivatives, structural analogs or combinations thereof.

Included are pharmacologically active drugs, genetically active molecules, etc. Compounds of interest include chemotherapeutic agents, anti-inflammatory agents, hormones or hormone antagonists, ion channel modifiers, and neuroactive agents. Exemplary of pharmaceutical agents suitable for this invention are those described in, "The Pharmacological Basis of Therapeutics," Goodman and Gilman, McGraw-Hill, New York, N.Y., (1996), Ninth edition, under the sections: Drugs Acting at Synaptic and Neuroeffector Junctional Sites; Drugs Acting on the Central Nervous System; Autacoids: Drug Therapy of Inflammation; Water, Salts and Ions; Drugs Affecting Renal Function and Electrolyte Metabolism; Cardiovascular Drugs; Drugs Affecting Gastrointestinal Function; Drugs Affecting Uterine Motility; Chemotherapy of Parasitic Infections; Chemotherapy of Microbial Diseases; Chemotherapy of Neoplastic Diseases; Drugs Used for Immunosuppression; Drugs Acting on Blood-Forming organs; Hormones and Hormone Antagonists; Vitamins, Dermatology; and Toxicology, all incorporated herein by reference.

Test compounds include all of the classes of molecules described above, and may further comprise samples of unknown content. Of interest are complex mixtures of naturally occurring compounds derived from natural sources such as plants. While many samples will comprise compounds in solution, solid samples that can be dissolved in a suitable solvent may also be assayed. Samples of interest include environmental samples, e.g. ground water, sea water, mining waste, etc.; biological samples, e.g. lysates prepared from crops, tissue samples, etc.; manufacturing samples, e.g. time course during preparation of pharmaceuticals; as well as libraries of compounds prepared for analysis; and the like. Samples of interest include compounds being assessed for potential therapeutic value, i.e. drug candidates.

The term sample also includes the fluids described above to which additional components have been added, for example components that affect the ionic strength, pH, total protein concentration, etc. In addition, the samples may be treated to achieve at least partial fractionation or concentration. Biological samples may be stored if care is taken to reduce degradation of the compound, e.g. under nitrogen, frozen, or a combination thereof. The volume of sample used is sufficient to allow for measurable detection, usually from about 0.1:1 to 1 ml of a biological sample is sufficient.

Compounds, including candidate agents, are obtained from a wide variety of sources including libraries of synthetic or natural compounds. For example, numerous means are available for random and directed synthesis of a wide variety of organic compounds, including biomolecules, including expression of randomized oligonucleotides and oligopeptides. Alternatively, libraries of natural compounds in the form of bacterial, fungal, plant and animal extracts are available or readily produced. Additionally, natural or synthetically produced libraries and compounds are readily modified through conventional chemical, physical and biochemical means, and may be used to produce combinatorial libraries. Known pharmacological agents may be subjected to directed or random chemical modifications, such as acylation, alkylation, esterification, amidification, etc. to produce structural analogs.

As used herein, the term "genetic agent" refers to polynucleotides and analogs thereof, which agents are tested in the screening assays of the invention by addition of the genetic agent to a cell. The introduction of the genetic agent results in an alteration of the total genetic composition of the cell. Genetic agents such as DNA can result in an experimentally introduced change in the genome of a cell, generally through the integration of the sequence into a chromosome. Genetic changes can also be transient, where the exogenous sequence is not integrated but is maintained as an episomal agents. Genetic agents, such as antisense oligonucleotides, can also affect the expression of proteins without changing the cell's genotype, by interfering with the transcription or translation of mRNA. The effect of a genetic agent is to increase or decrease expression of one or more gene products in the cell.

Agents are screened for biological activity by adding the agent to at least one and usually a plurality of cell samples. The change in parameter readout in response to the agent is measured, desirably normalized, and the resulting data may then be evaluated by comparison to reference datasets. The reference datasets may include basal readouts in the presence and absence of a decoupling agent, etc. Agents of interest for analysis include any biologically active molecule with the capability of modulating, directly or indirectly, the Miro1 phenotype of interest of a cell of interest.

The agents are conveniently added in solution, or readily soluble form, to the medium of cells in culture. The agents may be added in a flow-through system, as a stream, intermittent or continuous, or alternatively, adding a bolus of the compound, singly or incrementally, to an otherwise static solution. In a flow-through system, two fluids are used, where one is a physiologically neutral solution, and the other is the same solution with the test compound added. The first fluid is passed over the cells, followed by the second. In a single solution method, a bolus of the test compound is added to the volume of medium surrounding the cells. The overall concentrations of the components of the culture medium should not change significantly with the addition of the bolus, or between the two solutions in a flow through method.

Agent formulations preferably essentially of a biologically active compound and a physiologically acceptable carrier, e.g. water, ethanol, DMSO, etc. However, if a compound is liquid without a solvent, the formulation may consist essentially of the compound itself.

A plurality of assays may be run in parallel with different agent concentrations to obtain a differential response to the various concentrations. As known in the art, determining the effective concentration of an agent typically uses a range of concentrations resulting from 1:10, or other log scale, dilutions. The concentrations may be further refined with a second series of dilutions, if necessary. Typically, one of these concentrations serves as a negative control, i.e. at zero concentration or below the level of detection of the agent or at or below the concentration of agent that does not give a detectable change in the phenotype.

Kits

Also provided are reagents, devices and kits thereof for practicing one or more of the above-described methods. The subject reagents, devices and kits thereof may vary greatly. Reagents and devices of interest include those mentioned above with respect to the methods of treating Parkinson's Disease in a subject.

In one embodiment a kit comprises reagents and substrates for assay use. For example, a kit may comprise a plate coated with a Miro1 capture antibody; materials for mitochondrial depolarization such as a suitably packaged CCCP, FCCP, etc. reagent; and a Miro1 detection antibody. Positive and negative controls may be included.

In another embodiment, a kit includes a Miro1 reducer and a pharmaceutically acceptable carrier. In particular embodiments, the Miro1 reducer and the pharmaceutically acceptable carrier are packaged separately. For example, the Miro1 reducer may be included in the kit in a dry form, packaged in a container or vial, separate from the carrier. In other embodiments, the Miro1 reducer is formulated in a pharmaceutically acceptable carrier.

In certain embodiments, the kit further includes at least one additional therapeutic agent. In particular embodiments, the additional therapeutic agent is selected from the group consisting of levodopa, a dopamine agonist, a MAO-B inhibitor, amantadine, an anticholinergic, a PUM1 antagonist, an SR protein antagonist, a Parkin agonist, a PINK1 agonist, an 4E-BP1 agonist, a Drp1 agonist, an Atg1 agonist, a TauS2A agonist, a Rbf1 agonist, a Dp antagonist, an E2f1 antagonist, a Polo-like kinase 2 antagonist and a Notch agonist.

In addition to the above components, the subject kits will further include instructions for practicing the subject methods (e.g., instructions regarding route of administration, dose, dosage regimen, site of administration, and the like). These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., diskette, CD, etc., on which the information has been recorded. Yet another means that may be present is a website address which may be used via the internet to access the information at a removed site. Any convenient means may be present in the kits.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

General methods in molecular and cellular biochemistry can be found in such standard textbooks as Molecular Cloning: A Laboratory Manual, 3rd Ed. (Sambrook et al., HaRBor Laboratory Press 2001); Short Protocols in Molecular Biology, 4th Ed. (Ausubel et al. eds., John Wiley & Sons 1999); Protein Methods (Bollag et al., John Wiley & Sons 1996); Nonviral Vectors for Gene Therapy (Wagner et al. eds., Academic Press 1999); Viral Vectors (Kaplift & Loewy eds., Academic Press 1995); Immunology Methods Manual (I. Lefkovits ed., Academic Press 1997); and Cell and Tissue Culture: Laboratory Procedures in Biotechnology (Doyle & Griffiths, John Wiley & Sons 1998), the disclosures of which are incorporated herein by reference. Reagents, cloning vectors, and kits for genetic manipulation referred to in this disclosure are available from commercial vendors such as BioRad, Stratagene, Invitrogen, Sigma-Aldrich, and ClonTech.

Example 1

Miro1 Marks Parkinson's Disease and Miro1 Reducer Rescues Neuron Loss in Parkinson's Models The identification of molecular targets and pharmacodynamic markers for Parkinson's disease (PD) empowers more effective clinical management and experimental therapies. Miro1 is localized on the mitochondrial surface and mediates mitochondrial motility. Miro1 is removed from depolarized mitochondria to facilitate their clearance via mitophagy. Here we explore the clinical utility of Miro1 for detecting PD and for gauging potential treatments. We measured the Miro1 response to mitochondrial depolarization using biochemical assays in skin fibroblasts from a broad spectrum of PD patients, and discovered that more than 94% of patient fibroblast cell lines fail to remove Miro1 following depolarization. We further identified a small molecule that can repair this defect of Miro1 removal in PD fibroblasts. Treating patient-derived neurons and fly models with this compound is shown to rescue locomotor deficits and dopaminergic neurodegeneration. Our results indicate that tracking this Miro1 marker and engaging in Miro1-based therapies provides an approach personalized therapies.

Miro1 Is Resistant to Removal from Depolarized Mitochondria in Skin Fibroblasts from a Large Population of PD Patients. Skin fibroblasts can be easily obtained from patients by a minimally-invasive, painless procedure ENREF 12. We aimed to determine the frequency of the Miro1 phenotype in skin fibroblasts from a large cohort of both sporadic and familial PD patients. We fractioned mitochondria after a CCCP treatment that depolarizes the mitochondrial membrane potential ($\Delta\Psi m$). In wild-type controls at 6 hrs following treatment, both Miro1 and Mitofusin2 were removed from damaged mitochondria as detected by Western blotting (FIG. 1A, B).

The OMM protein Mitofusin2 is a target of the PINK1-Parkin pathway, but not of LRRK2, for depolarization-triggered degradation. We included Mitofusin2 in our readout to compare its phenotypic frequency in PD with Miro1's. We screened a total of 71 PD and 3 at-risk fibroblast lines comprising the entire PD fibroblast collection at the National Institute of Neurological Disorders and Stroke (NINDS) human and cell repository and the first released PD-control cohort from the Parkinson's Progression Markers Initiative (PPMI). All patients were diagnosed with PD and without the presence of signs for other neurological disorders. At-risk subjects are younger asymptomatic family members of the probands and harbor the same genetic mutations (in LRRK2 or SNCA). Twenty-eight patients have a positive family history. We included 22 controls that consisted of 12 age/gender/race-matched healthy subjects recruited from the same cohorts and 10 subjects with other neurological disorders including Huntington's (HD) or Alzheimer's disease (AD) (Table 1A). We conducted our assay in a blinded manner.

TABLE 1

Summary of the Miro1 Phenotype in All Subjects Used in This Study.

| Disease | No. (Miro1 DMSO v.s. CCCP P < 0.05) | No. (Miro1 DMSO v.s. CCCP P > 0.05) | P (Fisher Exact) compared to PD | No. confirmed by ELISA | No. confirmed by Western |
|---|---|---|---|---|---|
| PD      | 5  | 78 (94%)  |           | 24 | 73 |
| PD Risk | 0  | 5 (100%)  | 1         | 5  | 5  |
| Healthy | 52 | 0 (0%)    | <0.00001  | 52 | 12 |
| HD      | 6  | 0 (0%)    | <0.0001   | 2  | 6  |
| AD      | 4  | 0 (0%)    | <0.0001   | 1  | 4  |
| DLB     | 4  | 0 (0%)    | <0.0001   | 4  | 0  |
| PSP     | 3  | 0 (0%)    | 0.0005    | 3  | 2  |
| CBD     | 2  | 0 (0%)    | 0.0059    | 2  | 2  |
| FTD     | 3  | 0 (0%)    | 0.0005    | 3  | 0  |

Fisher Exact Test was used to determine the P values compared to PD. The Miro1 intensities with DMSO and with CCCP were compared within the same subject in either ELISA or Western by Mann-Whitney Test, and the numbers of the subjects with a P > 0.05 or <0.05 were defined as "No. (Miro1 DMSO v.s. CCCP P > 0.05 or <0.05)".

Notably, we discovered a unifying impairment in removing Miro1 from the mitochondrial fractions at 6 hrs after CCCP treatment in 69 PD and at-risk lines (93.2%). By contrast, Miro1 was efficiently removed following depolarization in every single control subject (0%) (Table 1A, 2). The phenotype was more strikingly demonstrated when we imported the mean band intensities into a heat map where a lack of color change after treatment reflects the failure to remove Miro1 (FIG. 1D). The lack of color change of Miro1 occurred broadly in PD patients. A smaller fraction of PD cell lines also failed to remove Mitofusin2 after CCCP treatment (FIG. 1D). Basal protein levels of Miro1 and Mitofusin2 were largely comparable among all lines (FIG. 1D, Table 1, P>0.0906).

This phenotype in Miro1 removal was significantly associated with PD (P<0.00001; Table 3A). The ratio of Miro1 intensity (with CCCP/with DMSO) was also significantly correlated with PD (P<0.0001; FIG. 4A), but not with age (at sampling and onset) or gender (FIG. 4B-D). There was no significant correlation between the Miro1 ratio and the disease progression (years with PD) or the clinical manifestations in patients with the Unified Parkinson's Disease Rating Scale (UPDRS), Hoehn and Yahr Scale, or Mini-Mental Status Examination (FIG. 4E-H). We confirmed that the cell passaging numbers within the range of 5-19 had no influence on the phenotype (Table 3B). Taken together, these observations show that the failure to remove Miro1 from damaged mitochondria is a common cellular defect in a large population of PD patients.

The LRRK2 and PINK-Parkin Pathways Are Broadly Affected in PD Fibroblasts. We have previously identified two parallel molecular pathways, both of which are essential for removing Miro from the OMM of depolarized mitochondria-LRRK2 and the PINK1-Parkin axis. To investigate the mechanisms underlying Miro1 accumulation on damaged mitochondria in PD fibroblasts, we tested the hypothesis that the buildup was due to the Impairments of the LRRK2 or PINK1-Parkin pathway. We have established that in wild-type control fibroblasts mitochondrial depolarization by CCCP treatment for only 1 hr triggers the recruitment of cytosolic LRRK2 and Parkin to mitochondria and Miro1, prior to Miro1 removal at 6 hrs (FIG. 1A, C). Antibodies against LRRK2, Parkin, and Miro1 have been validated in human cells lacking the corresponding genes.

We used this readout to screen all 96 fibroblast lines, and found a variety of phenotypes in patients' cells. Some cell lines were impaired only in recruiting LRRK2 to depolarized mitochondria, some impaired only in recruiting Parkin, and some cell lines were defective in recruiting both proteins. Because the failure to relocate LRRK2 to damaged mitochondria disrupts the following removal of Miro1 but not of Mitofusin2, this result may explain the lower frequency of the Mitofusin2 phenotype than Miro1 in those patients (FIG. 1D). We discovered that in 7 PD cell lines the recruitment of both LRRK2 and Parkin to damaged mitochondria appeared as normal when compared to the controls, while Miro1 removal was still compromised (FIG. 1D, FIGS. 9-11), suggesting that additional mechanisms might be at play in those cells. Basal levels of LRRK2 and Parkin were comparable in all lines (FIG. 12; P>0.8684). Collectively, our results provide evidence that the LRRK2 and PINK1-Parkin pathways are largely affected in PD patients' fibroblasts, leading to a convergent downstream failure to remove Miro1 from damaged mitochondria.

Figure 1E:
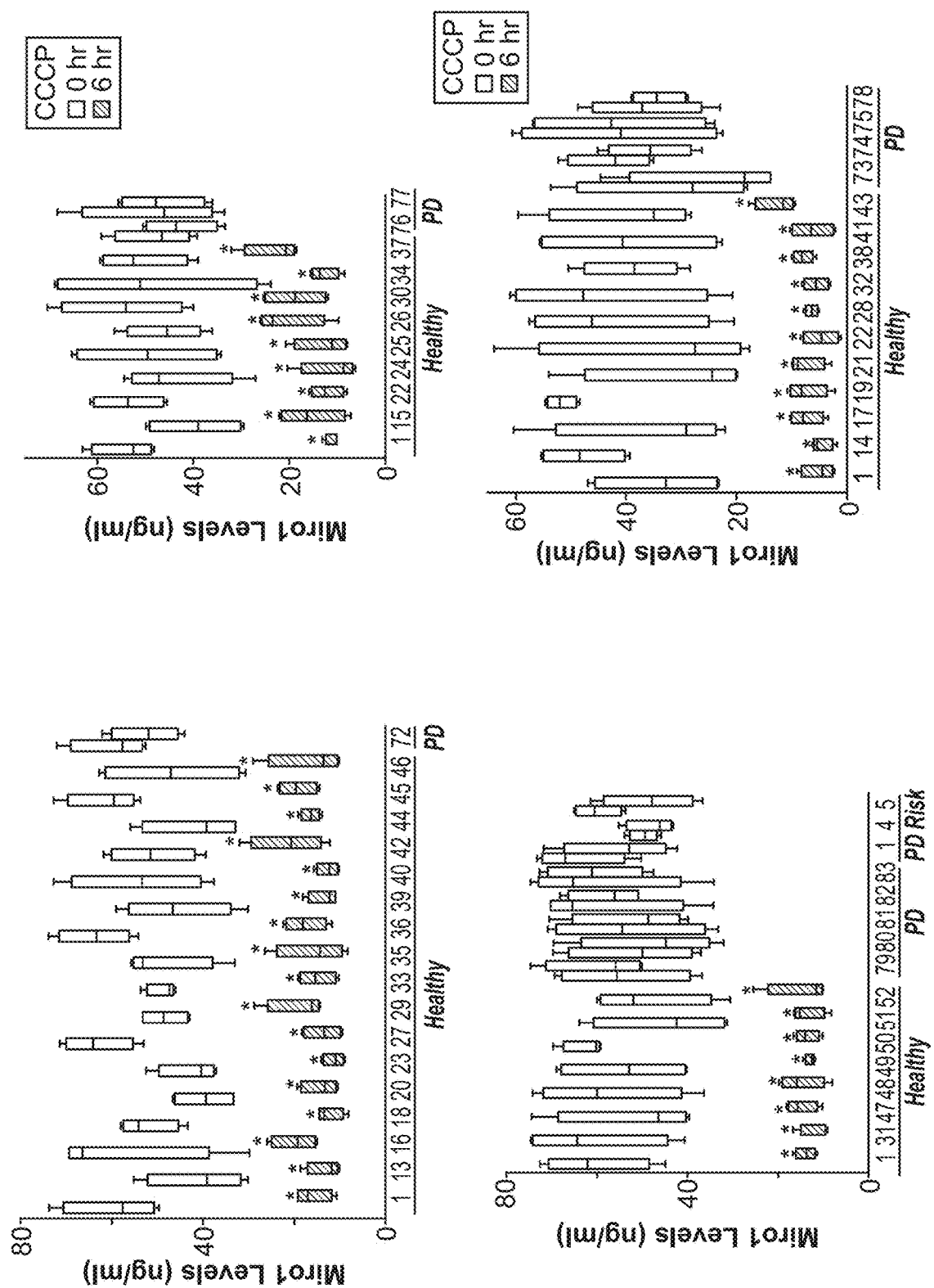
Figure 1F:
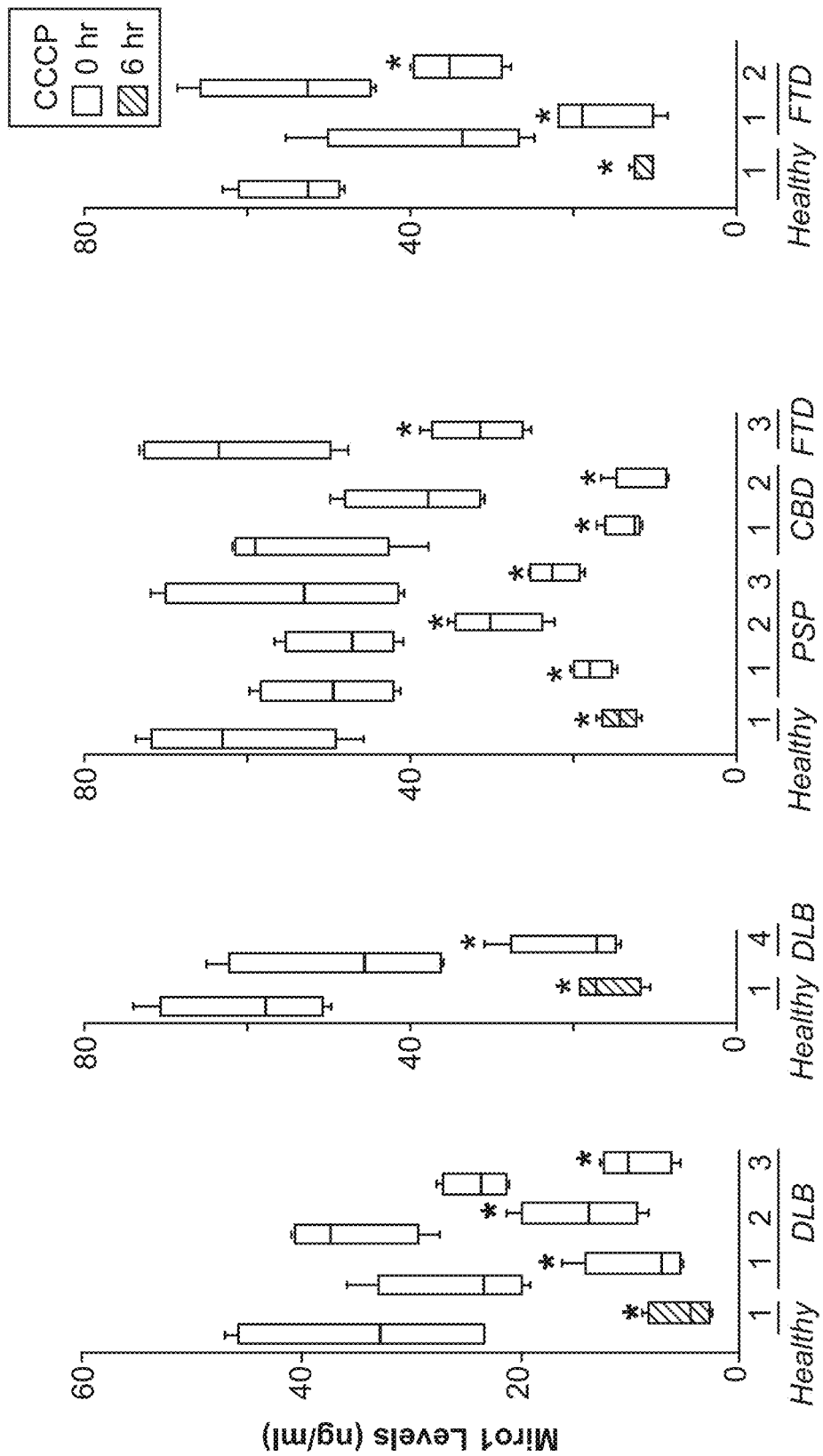
Figure 12A:
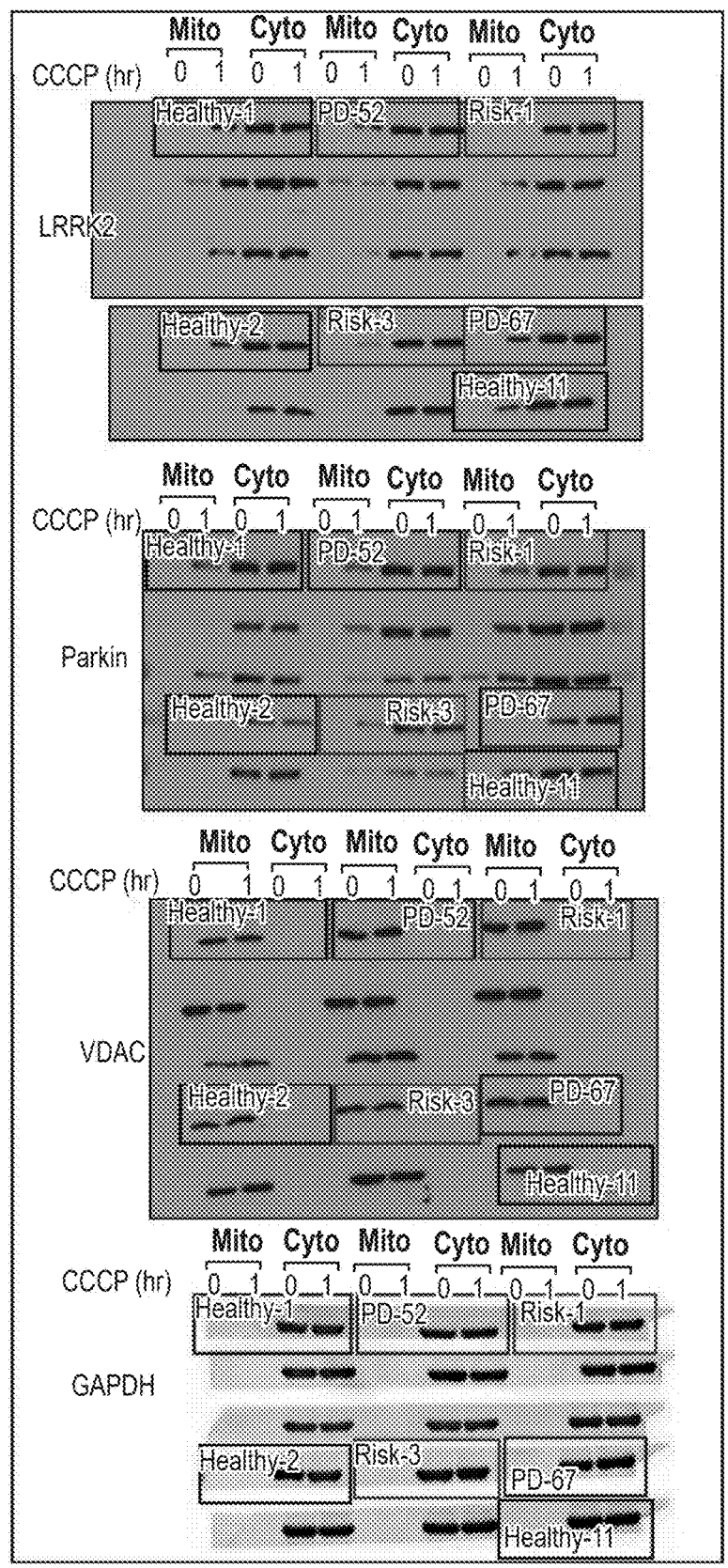
Figure 12B:
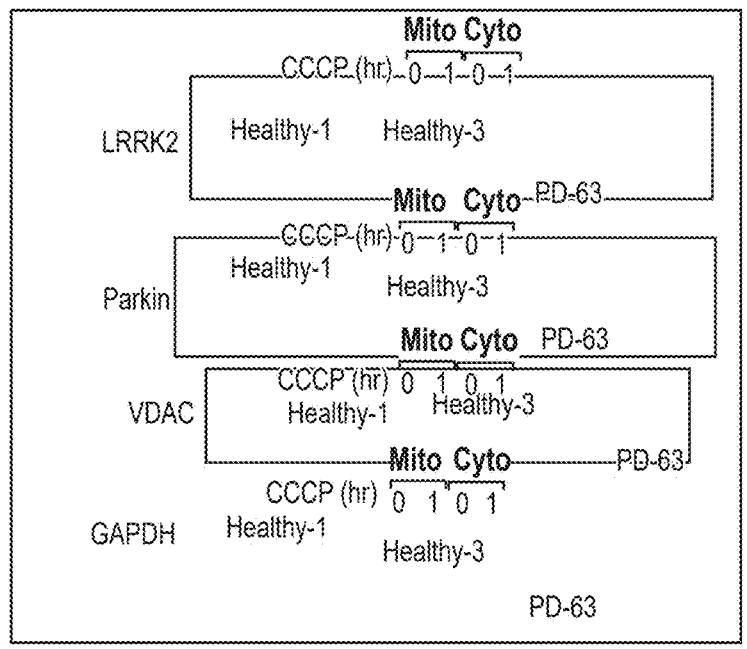
Figure 12C:
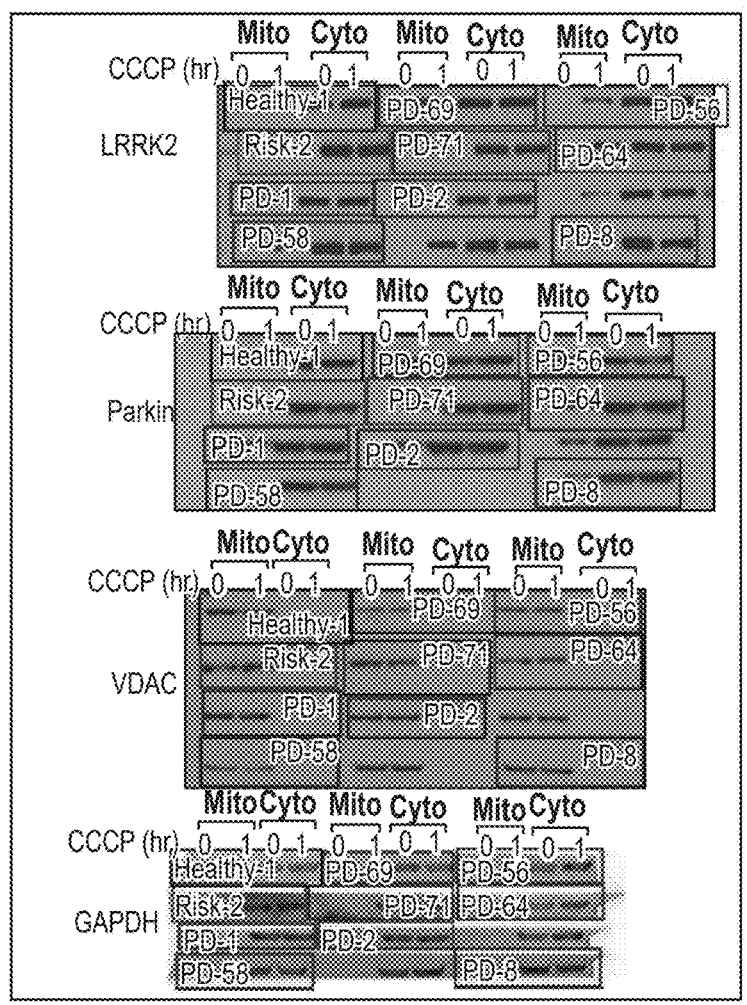
Figure 12D:
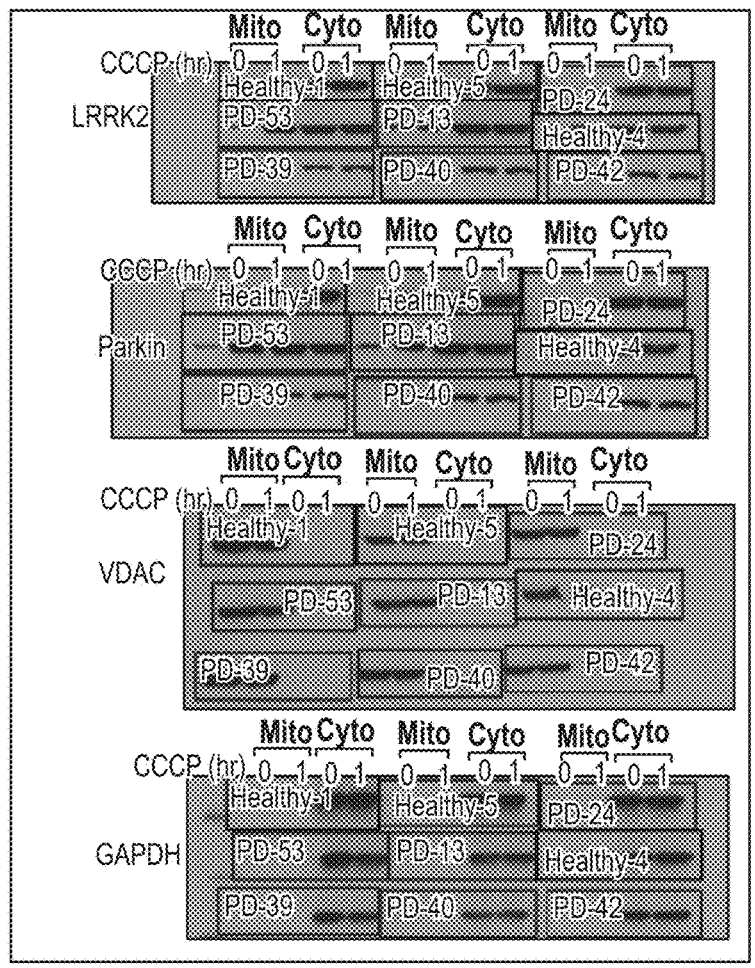
Figure 12E:
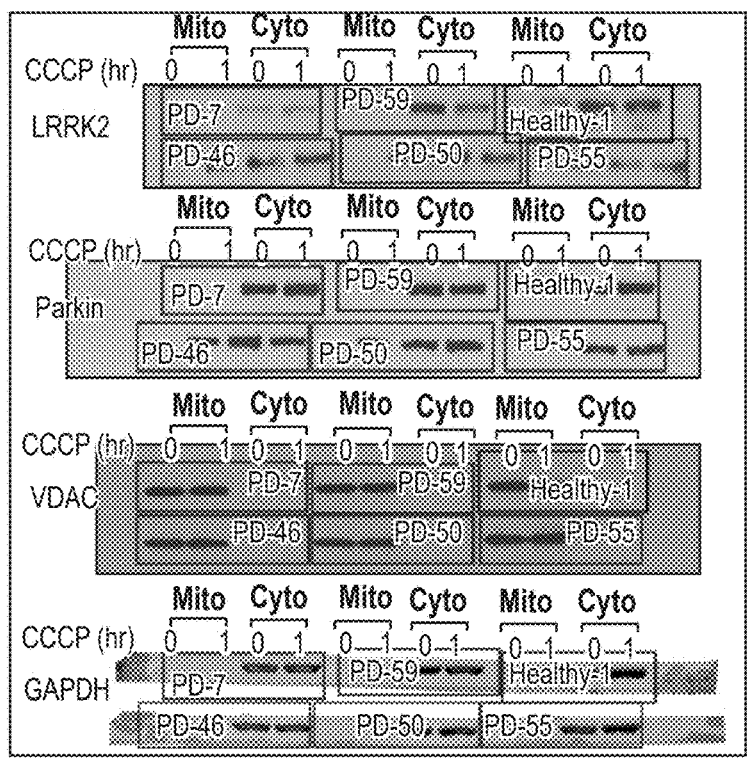
Figure 12F:
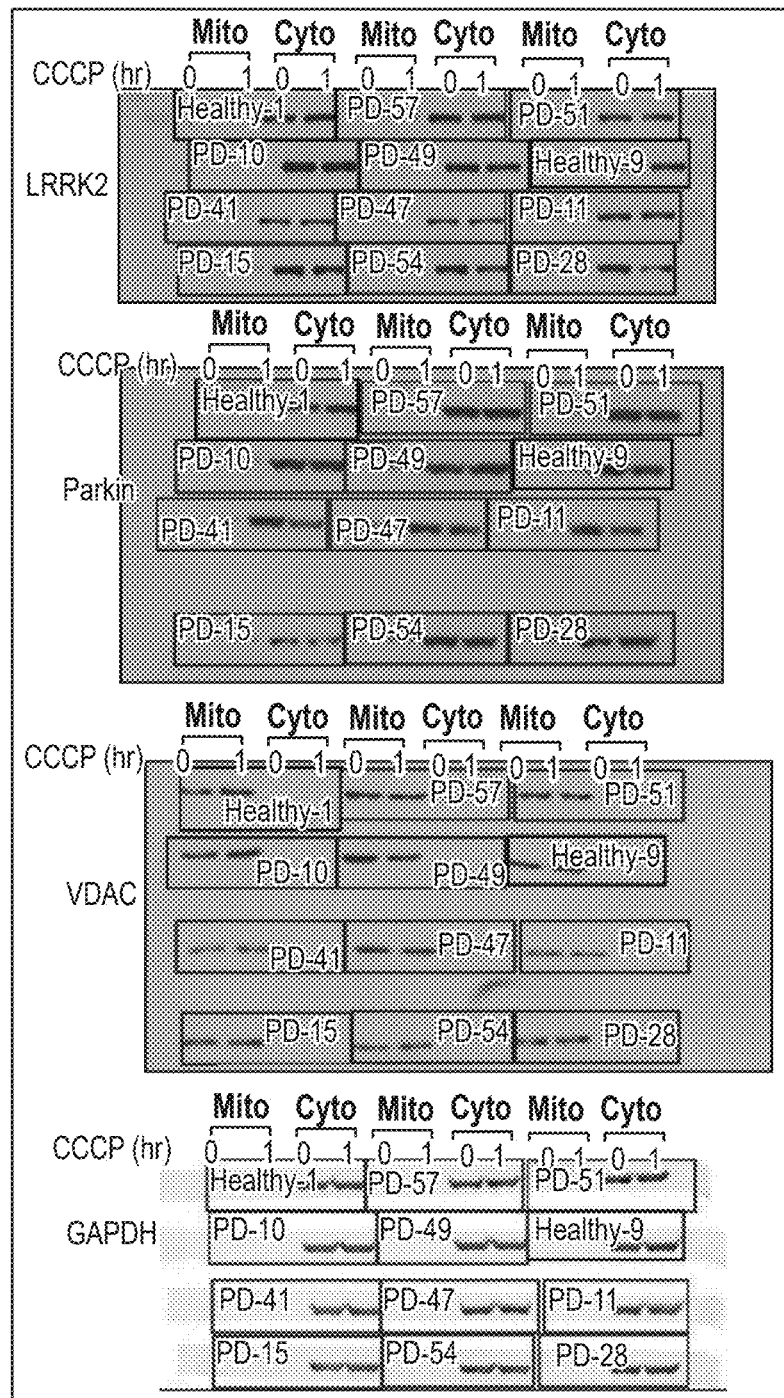
Figure 12G:
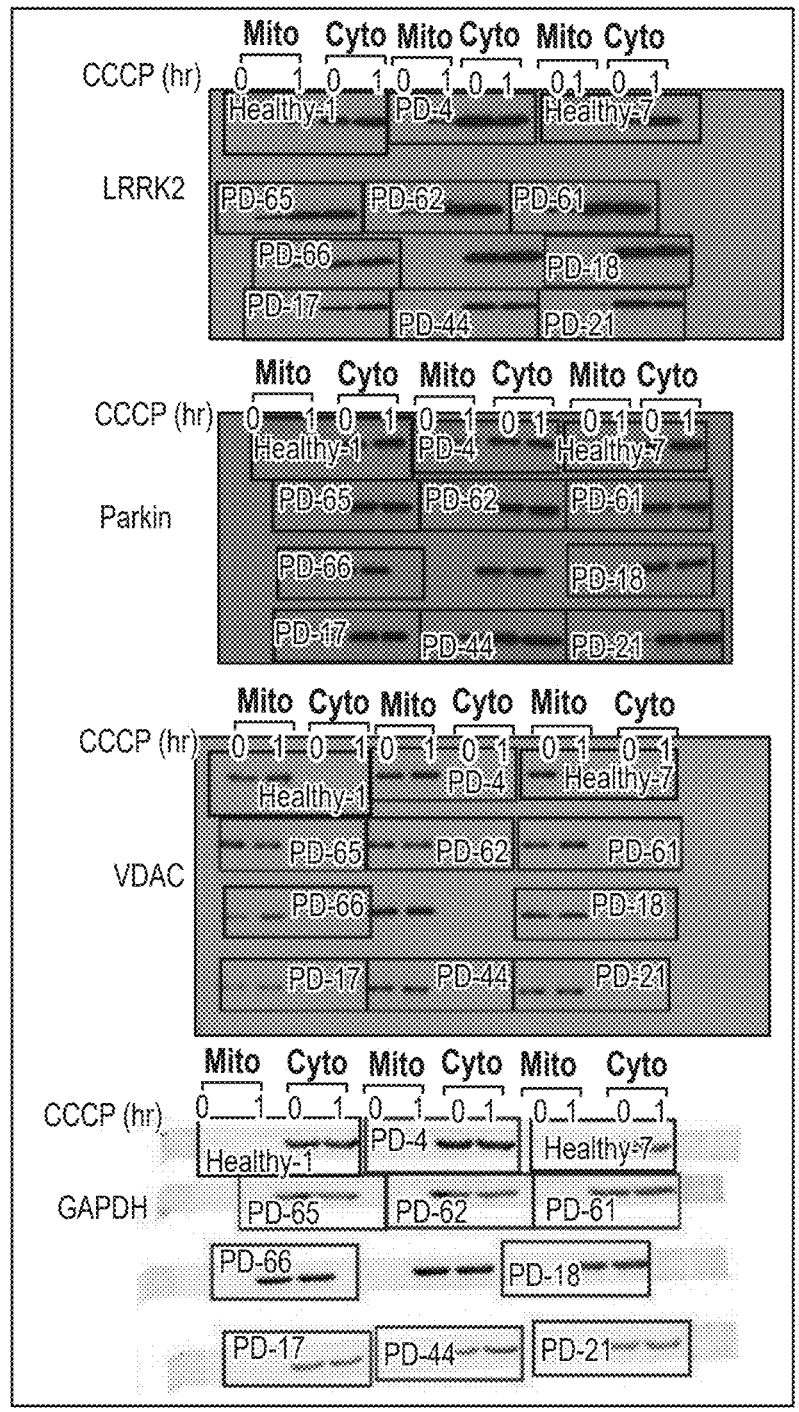
Figure 12H:
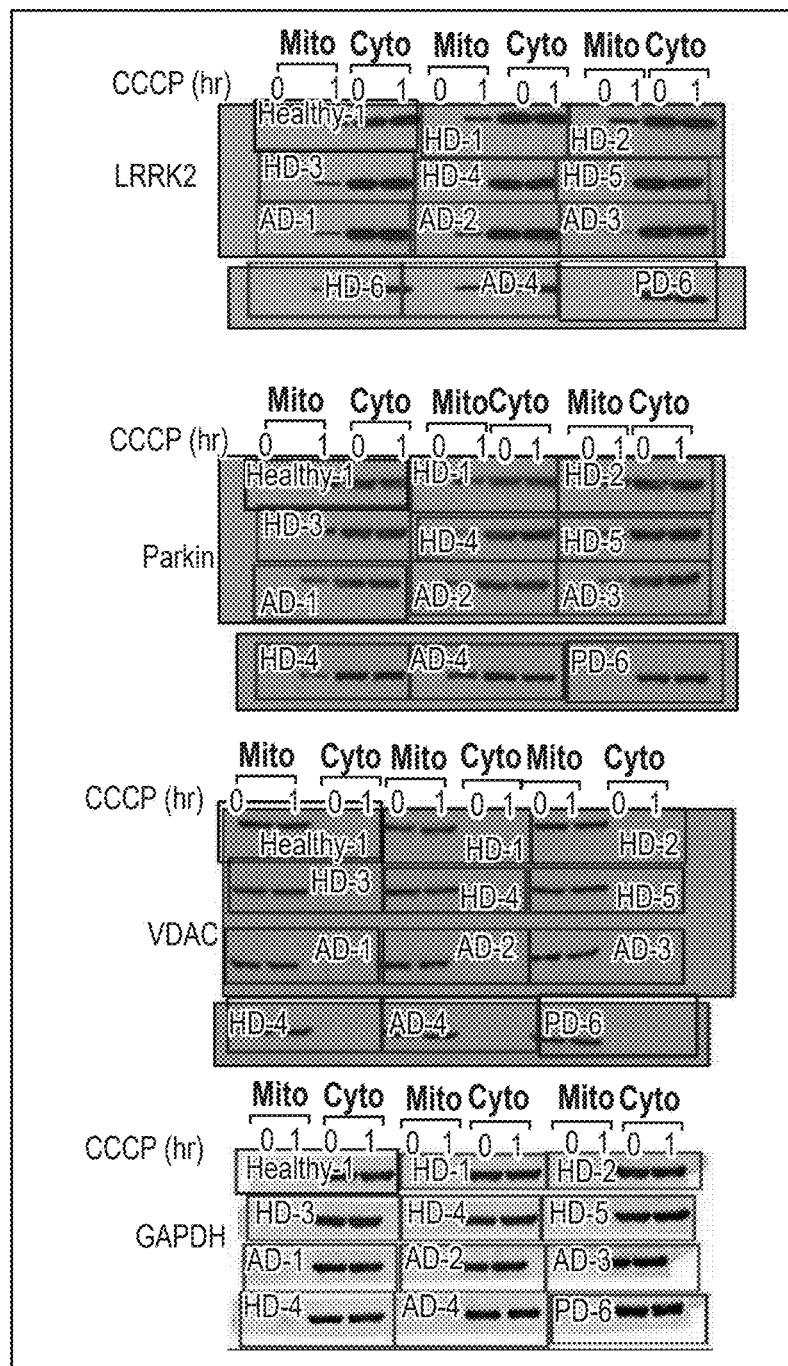
Figure 12I:
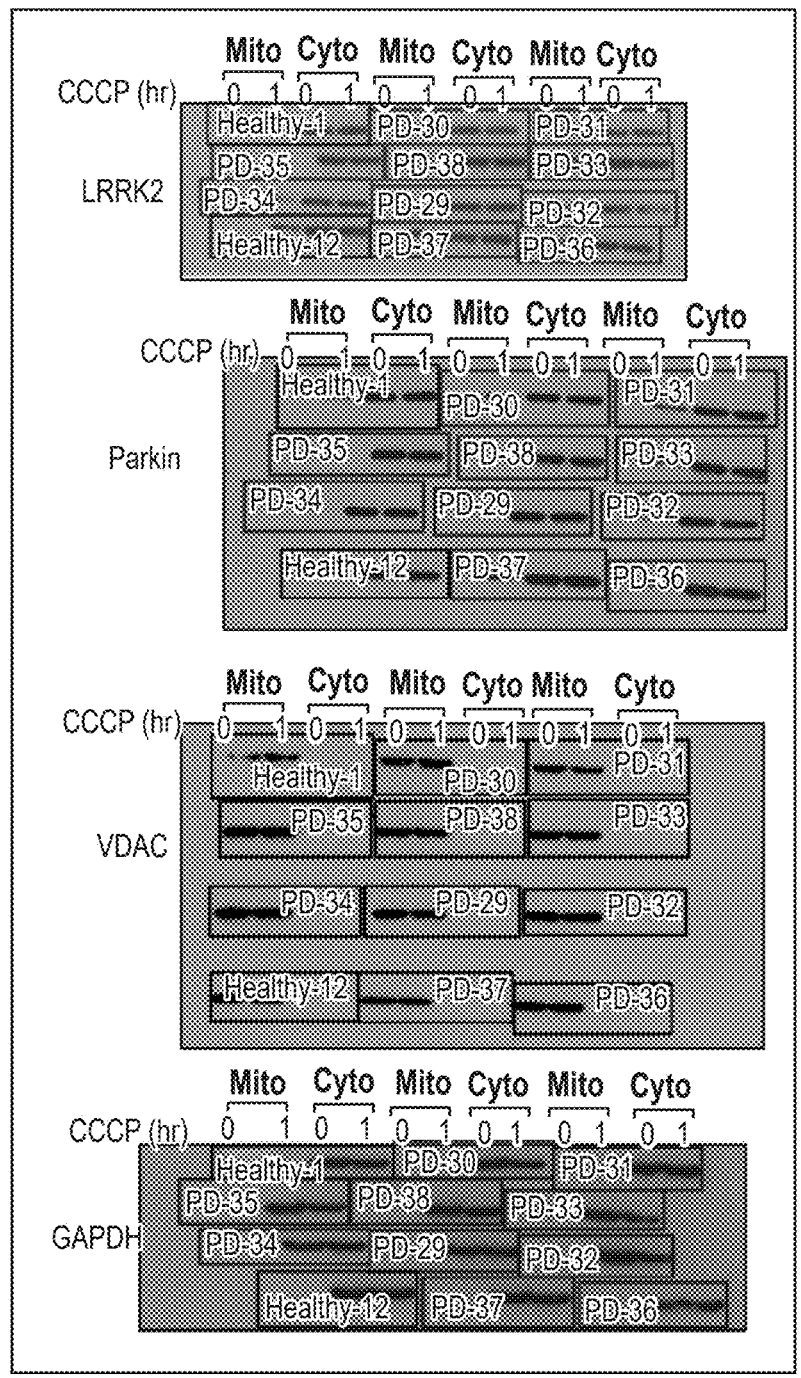
Figure 12J:
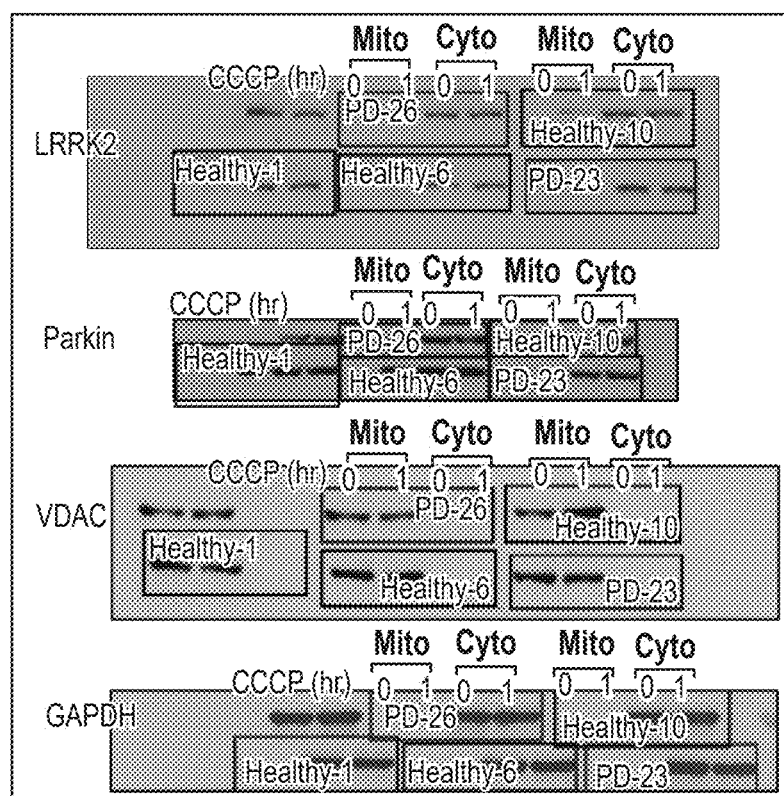
Figure 12K:
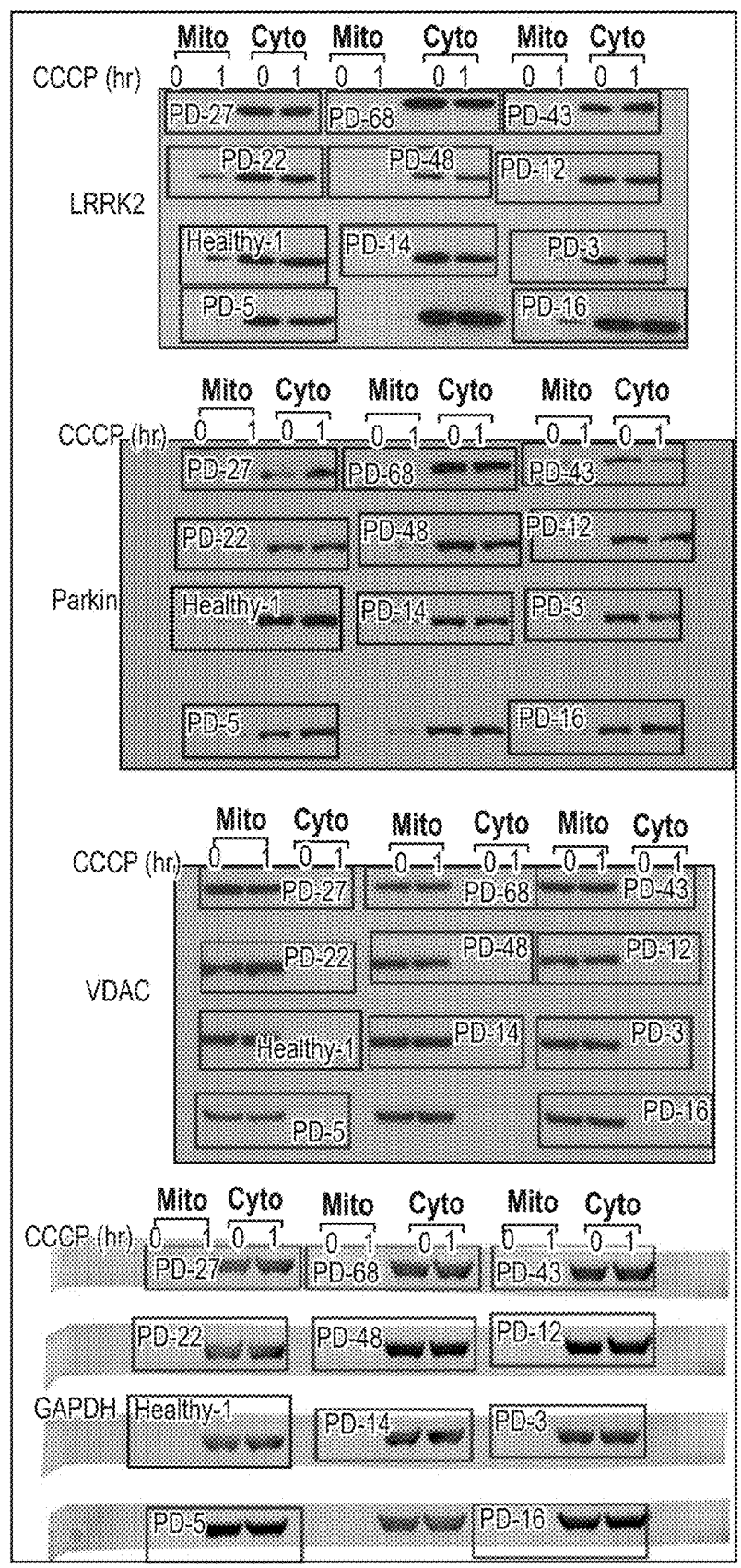
Figure 12L:
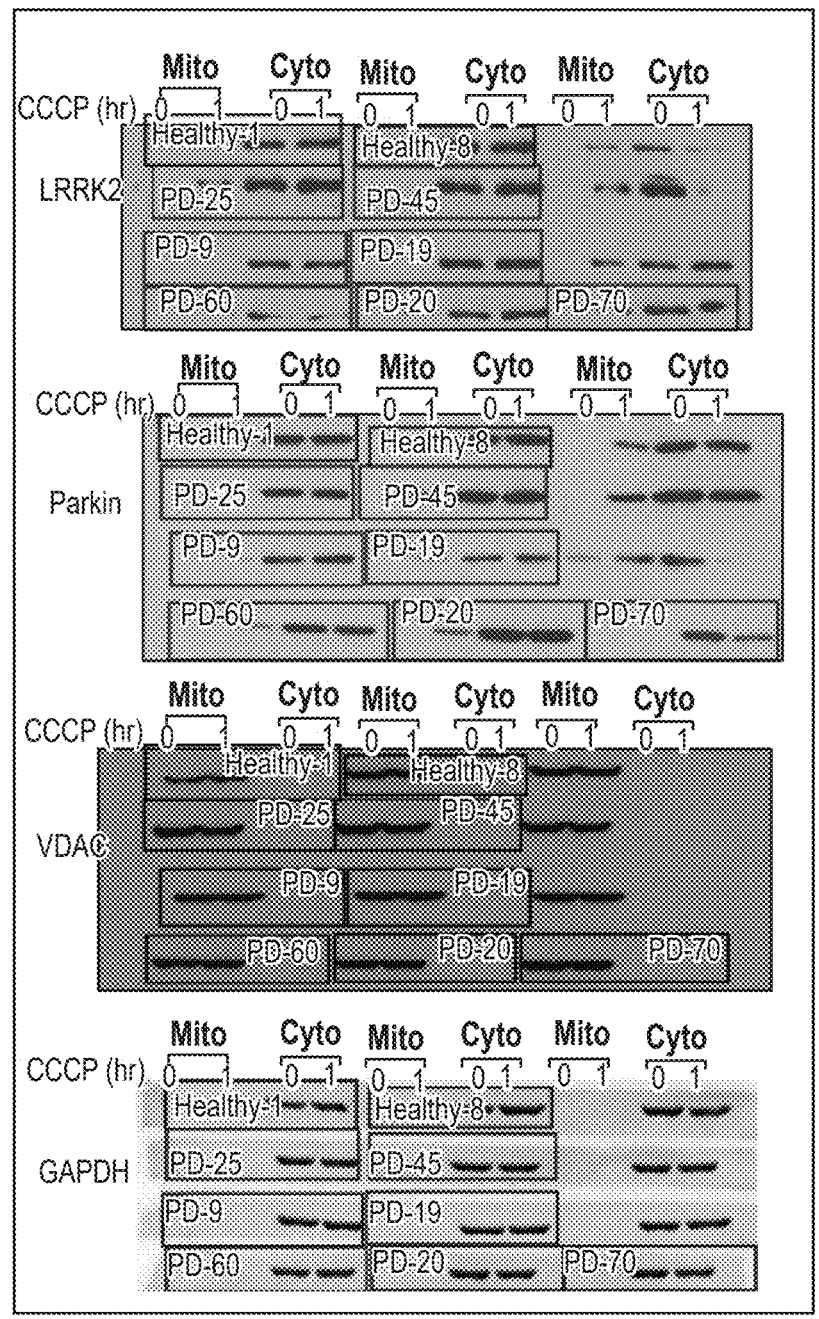

ELISA Confirms the High Frequency and Specificity of the Miro1 Phenotype for PD Fibroblasts. We established an enzyme-linked immunosorbent assay (ELISA) to detect Miro1 response to CCCP (FIG. 5) which is useful for clinical laboratory use. We examined 14 PD/risk and 15 control cell lines used in FIG. 1D. For each individual line, the result of Miro1 response to mitochondrial depolarization (FIG. 5A) was consistent with that from using mitochondrial fractionation and Western blotting (FIG. 1D, FIG. 9A). We used this ELISA to validate additional independent cohorts. We included 40 healthy controls and 12 PD patients from the Stanford Alzheimer's Disease Research Center (ADRC) and the Coriell Institute (FIG. 9B). We discovered that Miro1 was efficiently degraded upon depolarization in all control lines, but in none of the PD patients (FIG. 1E, S3A-B); this finding verified the reliability of the high frequency of Miro1 accumulation on depolarized mitochondria in the PD population (FIG. 1, FIG. 12A). We also obtained cell lines from patients with movement disorders that exhibit clinical presentations similar to PD, including 4 of sporadic Dementia with Lewy Bodies (DLB; Stanford), 3 of Frontotemporal Degeneration (FTD; Coriell and NINDS), 2 of sporadic Corticobasal Degeneration (CBD; Mayo Clinic), and 3 of sporadic Progressive Supranuclear Palsy (PSP; Mayo Clinic) (FIG. 9B). Miro1 was effectively degraded after CCCP treatment in all lines (FIG. 1F, FIG. 6A-B, FIG. 12A), demonstrating the specificity of Miro1 accumulation for PD. The establishment of an ELISA to detect Miro1 facilitates clinical applications of our discovery.

A Small Molecule Predicted to Bind to Miro1 Eliminates the Miro1 Defect in PD Fibroblasts. Now that we have discovered a Miro1 molecular phenotype in skin cells from a large number of PD patients, we next explored the possibility to use this defect as a pharmacodynamic marker for gauging Miro1-based therapies. In clinical trials, we can first determine whether a potential PD patient has the Miro1 phenotype using his/her cultured fibroblasts in a dish, then use those fibroblasts to test multiple potential treatments/ drugs to identify the best treatment that ameliorates the Miro1 defect, and lastly administer the individual-tailored treatment to each patient. To prove our concept, we sought for a therapeutic strategy that can eliminate this marker in PD fibroblasts and then tested the neuroprotective effect of this strategy in PD models. We have previously shown that genetically knocking down Miro1 by RNAi in both human neuron and fly PD models rescues Miro1 accumulation, slower mitophagy, and dopaminergic neurodegeneration. We searched for pharmacological approaches to reduce Miro1, which are more applicable for clinical treatments and could remove this Miro1 phenotype from PD fibroblasts.

We assessed the binding ability of 6,835,320 commercialized small molecules to one of the two atypical Rho GTPase domains of Miro1 (amino acids 411-592) (FIG. 6C) by a customized virtual screen using the artificial intelligence (AI) technology. Small molecules were filtered for oral availability, toxicophores, and blood-brain barrier permeability. We conducted a preliminary functional screen by feeding fruit flies with the top 11 compounds at 250 µM for 7 days. We identified 4 hits (compound 3-6 in the order of AI ranking) that partially but significantly reduced fly Miro (DMiro) protein levels (FIG. 6D). We picked compound 3 for further validation (FIG. 2A, S3C). This compound did not significantly affect another OMM GTPase Mitofusin (Marf) (FIG. 2B).

We applied compound 3 to fibroblasts from one sporadic PD patient (PD-2) and tested the Miro1 response to CCCP treatment for 6 hrs using Western blotting. Treating PD fibroblasts with this small molecule at 10 µM for 30 hrs robustly promoted Miro1 degradation following CCCP treatment (FIG. 2C). We named compound 3 Miro1 Reducer. We found that Miro2 was also subject to depolarization-triggered degradation in healthy controls, although to a lesser extent than Miro1 (FIG. 2C), consistent with previous reports showing that Parkin prefers Miro1 over Miro2 for ubiquitination and proteasome degradation. Miro1 Reducer had no influence on Miro2 in either healthy or PD cells (FIG. 2C). It is worthwhile to note that CCCP treatment for only 6 hrs in healthy human fibroblasts triggers degradation of the OMM proteins Miro and Mitofusin but not of other OMM, inner mitochondrial membrane (IMM), and matrix proteins, because mitophagy has not yet started at this early time point (FIG. 2C, S4A).

Figure 7A:
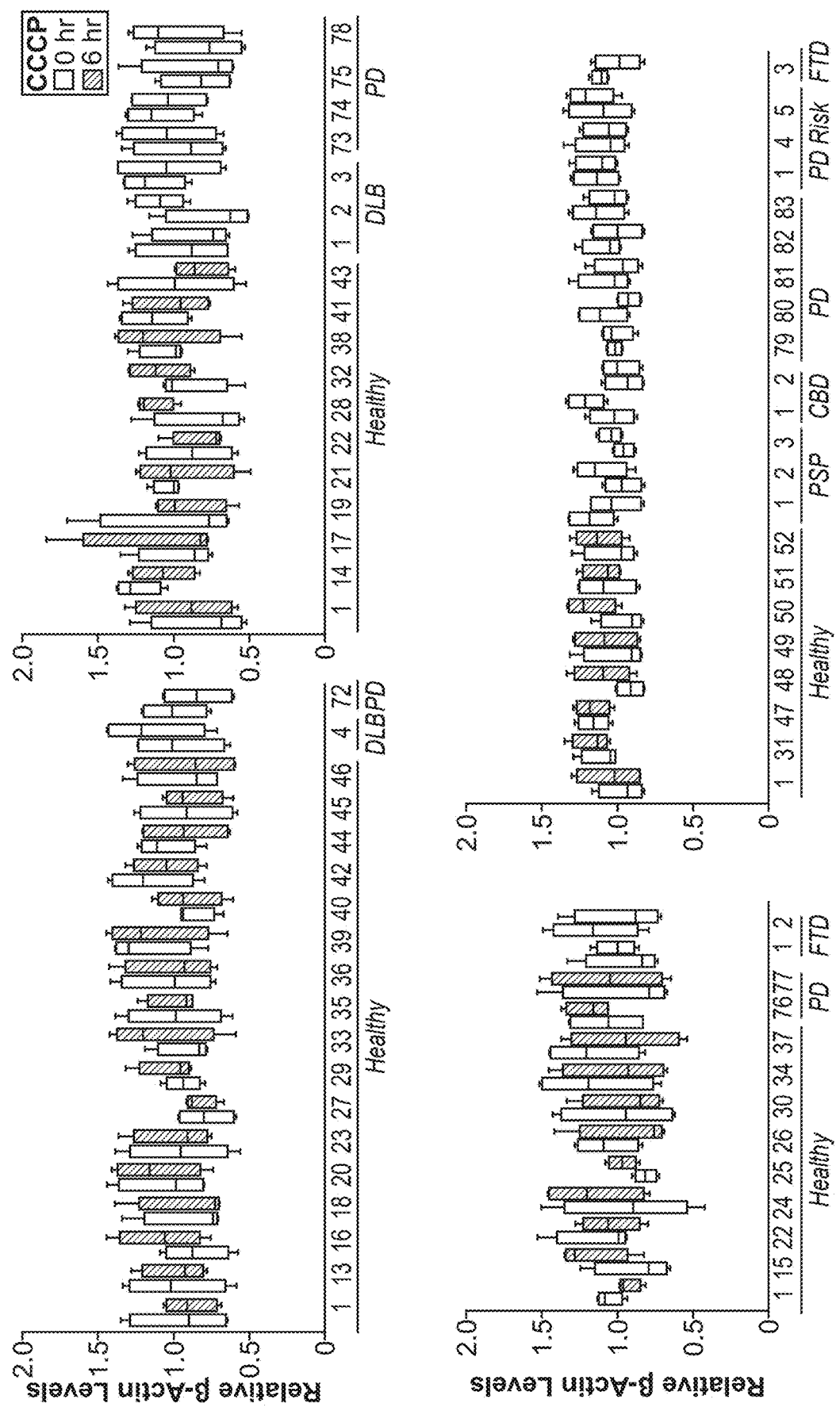

To measure mitophagy, we detected multiple mitochondrial matrix and membrane proteins at a later time point (14 hrs after CCCP treatment) in those cells using both Western blotting and immunocytochemistry, and confirmed that Miro1 Reducer treatment rescued the delayed mitophagy phenotype in PD fibroblasts (FIG. 7A-B). Miro1 protein levels responded to Miro1 Reducer in a dose-dependent manner ($IC_{50}$: 7.8 µM; FIG. 2D). High concentrations (>25 µM) of Miro1 Reducer combined with CCCP treatment for 6 hrs impacted multiple mitochondrial matrix and cytosolic proteins (FIG. 2D), indicating cytotoxicity. The IMM dynamin GTPase OPA1 was not reduced by Miro1 Reducer treatment (FIG. 2D, right).

Figure 2E:
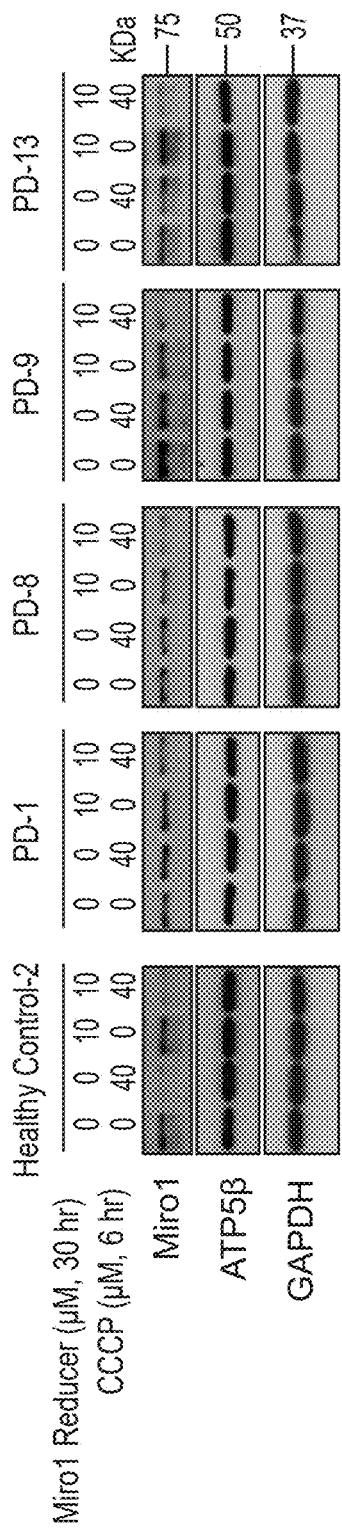

Mitochondrial depolarization promotes Miro degradation through proteasomes in a wild-type background (FIG. 2E). Miro1 Reducer facilitated proteasome Miro1 degradation following CCCP treatment in PD-2 fibroblasts, because the reduction of Miro1 protein triggered by Miro1 Reducer was blocked by the proteasome inhibitor MG132 (FIG. 2E). A brief CCCP treatment for only 1 hr in healthy fibroblasts boosted ubiquitination of immunoprecipitated (IPed) Miro1, prior to Miro1 degradation at 6 hrs; this depolarization-elicited increase of ubiquitination did not occur in PD-2 fibroblasts, regardless of the presence of Miro1 Reducer (FIG. 7C). It is likely that Miro1 Reducer alters E3 ligase kinetics, functions as a PROTAC, or even recruits proteasomes to Miro1 directly.

Figure 2F:
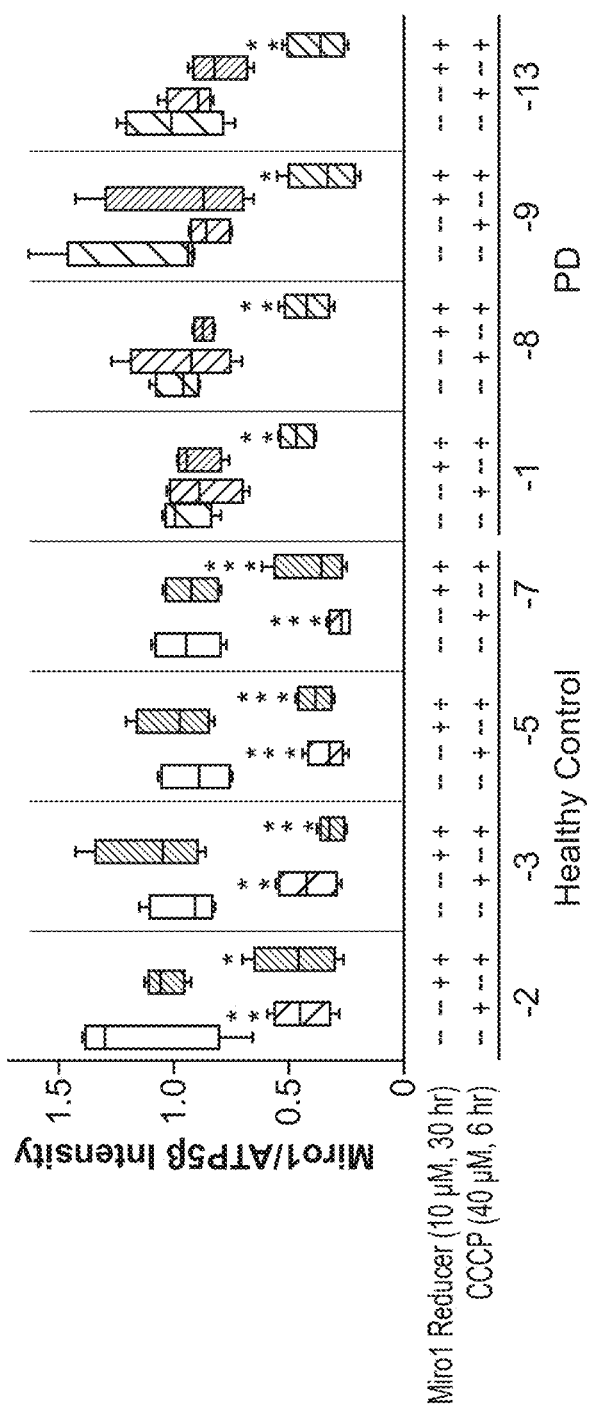

Miro1 Reducer did not affect the GTPase activity of Miro1 IPed from PD-2 fibroblasts under either basal or depolarized condition (FIG. 7D), nor did it change Miro1 mRNA expression examined by quantitative PCR (qPCR) (FIG. 7E). We next generated a drug-resistant form by mutating K427, N428, S432, Q446, K454, K528, and D530 to Alanine in the Myc-Miro1 construct. These residues showed high probability of binding to Miro1 Reducer in our structural model (FIG. 6C). This mutant Myc-Miro1 (named Myc-Miro1-7A) was degraded after CCCP treatment in healthy fibroblasts, but it failed to respond to Miro1 Reducer when expressed in PD-2 (FIG. 2F). These results suggest a possible mechanism of action of Miro1 Reducer in PD cells: once bound to Miro1, it promotes proteasome degradation of Miro1 upon mitochondrial depolarization.

We found that the therapeutic dose of Miro1 Reducer (10 µM for 30 hrs) did not affect baseline mitochondrial reactive oxygen species levels stained by MitoSox (FIG. 7F), general mitochondrial morphology and the $\Delta\Psi m$ detected by TMRM staining (FIG. 7G), or peroxisome movement or distribution (FIG. 7H) in either healthy-1 or PD-2 fibroblasts. We administered Miro1 Reducer to additional 4 control and 4 sporadic PD fibroblast cell lines and observed the same beneficial change of Miro1 degradation after depolarization in PD cells (FIG. 3A). Collectively, Miro1 Reducer appears to be reliable and selective to abolish the Miro1 marker in PD fibroblasts.

Miro1 Reducer Rescues Parkinson's Phenotypes in Human Neuron and in vivo PD Models. Now we have discovered an organic compound that can eliminate the Miro1 marker in skin cells from PD patients. We determined the extent to which it alleviated PD-relevant phenotypes in PD models. We tested Miro1 Reducer in two independent models: the human neuron and fly models. We have previously shown that induced pluripotent stem cell (iPSC)-derived dopaminergic neurons from PD patients are more vulnerable to stress than those from healthy controls. When live neurons are challenged by Antimycin A, the complex Ill inhibitor, for 6 hrs, significantly more patients-derived dopaminergic neurons die compared to those from healthy controls.

Figure 3D:
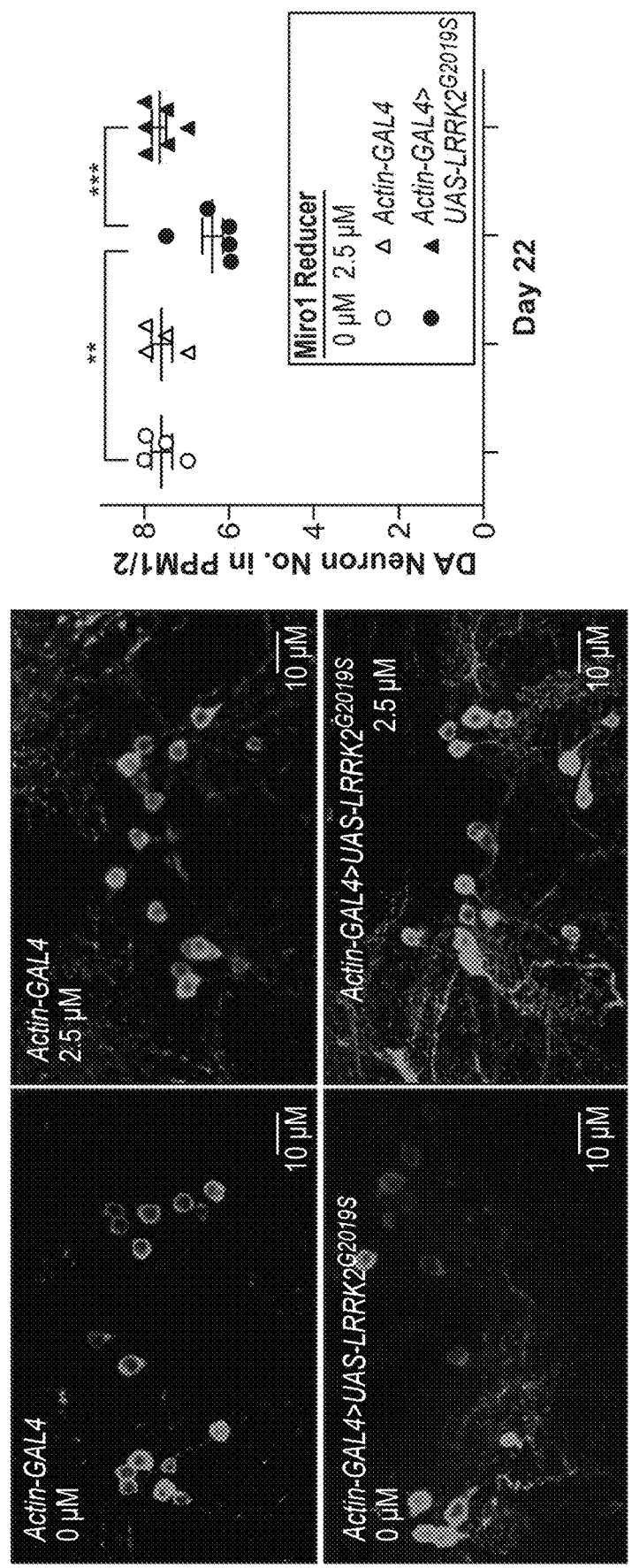

We examined Miro1 Reducer using iPSCs from one familial patient with the A53T mutation in SNCA (two independent clones: PD-I; PD-II) and one sporadic patient (PD-III), and from three healthy control subjects and one isogenic wild-type control for PD-1 (see Method) (FIG. 7I). We differentiated iPSCs to neurons expressing tyrosine hydroxylase (TH), the rate-limiting enzyme for dopamine synthesis as previously described. All iPSCs and their derived neurons have been fully validated in our previous publications (FIG. 7I). We applied 10 µM Antimycin A for 6 hrs to induce mitochondrial stress (Hsieh et al., 2016). We identified dopaminergic neurons by TH-immunostaining and cell death by propidium iodide (PI)-staining. Antimycin A treatment for 6 hrs caused acute neuronal cell death leading to the loss of TH and increase of PI signals in PD patients-derived neurons, compared to healthy controls (FIG. 3B-C). Notably, Miro1 Reducer treatment at 5 µM for 30 hrs completely rescued the stress-induced neurodegeneration of dopaminergic neurons derived from both PD patients (FIG. 3B-C). We found that Miro1 Reducer at 5 µM for 24 hrs (therapeutic dose) did not affect the basal motility of polarized, healthy mitochondria, but rescued the delayed arrest and clearance of depolarized mitochondria in iPSC-derived neurons from the PD patient (FIG. 3D). Therefore, Miro1 Reducer promotes damaged mitochondrial clearance and protects PD neurons against mitochondrial stress.

In order to cross-validate the neuroprotective effect of Miro1 Reducer in vivo, we fed the compound to three well-established fly PD models: (1) Actin-GAL4>UAS-LRRK2$^{G2019S}$ (ubiquitous expression of human pathogenic LRRK2); (2) PINK1 null; and (3) Elav-GAL4>UAS-SNCA$^{A53T}$ (neuronal expression of human pathogenic alpha-synuclein). Those flies show robust age-dependent locomotor deficits and dopaminergic neurodegeneration. We administered 2.5 µM Miro1 Reducer (therapeutic dose) to flies from adulthood (FIG. 7J), and examined the lifespan, dopaminergic neuron number, and adult climbing ability. Miro1 Reducer treatment had no long-term toxicity in either wild-type or PD flies, and extended the shortened lifespan of SNCA$^{A53T}$ flies (FIG. 4A-C). It significantly rescued the age-dependent dopaminergic neuronal loss in all three PD models (FIG. 4D-F), and locomotor decline in two models (LRRK2 and PINK1) (FIG. 4G-1). PINK1 null flies display a wide array of additional phenotypes during development or at enclosure, including lowered ATP levels, thoracic indentation, abnormal wing posture, and defective flying ability (Tsai et al., 2018). We found that feeding PINK1 null flies from adult onset with 2.5 µM Miro1 Reducer did not improve those non-progressive phenotypes (FIG. 7K-N). Our results demonstrate that Miro1 Reducer antagonizes age-dependent Parkinson's relevant phenotypes in vivo.

In this study, we have explored the mitochondrial protein Miro1 both as a common molecular signature for detecting PD and as a drug target for treating the disease. Biopsied fibroblasts have not been tested extensively for PD biomarker research. Our work is the largest study to date that reveals a distinct molecular defect using PD fibroblasts. Notably, the impairment in Miro1 clearance occurs in some PD patients without a known mutation or with normal functions of LRRK2 and Parkin (FIG. 1), indicating that varying upstream defects may converge on mitochondrial quality control in PD mechanism. Our results indicate that Miro1 may play a more vital role in mediating mitophagy than Miro2.

Using the AI technology that tackles complex drug discovery optimization, we have searched for small molecules from a vast chemical space in silico that are predicted to bind to Miro1. Treating fibroblasts from PD patients with the selected compound eliminates the Miro1 molecular pathology, and treating PD flies and patients-derived neurons with the compound rescues their locomotor deficits and dopaminergic neurodegeneration. These results demonstrate the clinical utility of our Miro1 marker in skin cells for monitoring Miro1-based target engagements and the therapeutic promise of Miro1 reducers. Both our genetic and pharmacological approaches (therapeutic dose) in human cell and fly PD models only cause a nominal reduction of basal Miro1 levels without significantly disrupting the motility of polarized mitochondria (FIGS. 2C, 3A, 3D, S4I, S4J). This small reduction of basal Miro1 levels can facilitate Miro1 removal from depolarized mitochondria (FIGS. 2C, 3A, S4I).

Therefore, to minimize cytotoxicity, an ideal therapeutic dose for a lead compound should cause significant Miro1 reduction following mitochondrial depolarization but minimum Miro1 degradation at baseline. Our findings can guide precision health strategies and stratifying participants for clinical trials, by first identifying patients with the Miro1 phenotype, and then testing the responses of the Miro1 marker to multiple Miro1 reducers using their own skin cells to determine personalized prognosis.

Experimental Model and Subject Details

Fly Stocks. The following fly stocks were used: $w^{1118}$, Actin-GAL4, UAS-hLRRK2$^{G2019S}$-Flag, Elav-GAL4, UAS-SNCA$^{A53T}$, PINK1$^{RV}$, and PINK1$^{B9}$. The age of flies for each experiment was stated in figures. Male flies of PINK1 null (PINK1$^{B9}$) and their control (PINK1$^{RV}$) were used because male PINK1 null flies are infertile and PINK1 is on the X chromosome. For the rest of the genotypes, females were used.

Human Subjects. Written informed consent was obtained from all participants and the study was approved by the institutional review boards at Mayo Clinic and Stanford University. Skin biopsies were performed and fibroblasts were dissociated as described in (Wren et al., 2015).

Method Details

Fly Behavior and Biochemical Assays. All fly stocks were maintained at 25° C. with a 12:12 hr light: dark cycle and constant humidity (65%) on standard sugar-yeast (SY) medium (15 g/l agar, 50 g/l sugar, 100 g/l autolyzed yeast, 6 g/l nipagin, and 3 m/l propionic acid) (Castillo-Quan et al., 2016). For all experiments, flies were raised at standard density on standard SY medium in 200 ml bottles unless otherwise stated. All fly lines were backcrossed 6 generations into a $w^{1118}$ background to ensure a homogeneous genetic background across all lines. Newly enclosed flies were allowed to mature and mate for 24-48 hrs, and then females and males were separated and collected. Miro1 Reducer was dissolved in DMSO at 100 mM and supplemented into SY medium. For lifespan, mated males and females were separated, and split into vials (15 flies each) containing SY medium with or without compound. Flies were transferred into fresh vials and the numbers of dead and escaped flies were scored 3 times a week. The final n was the total number of dead flies. Data were presented as cumulative survival curves, and survival rates were compared using Log-Rank Test. For FIG. 4A, P=0.2, Actin-Gal4>UAS-LRRK2$^{G2019S}$ 0 μM v.s. UAS-LRRK2$^{G2019S}$ 0 μM; P=0.2, Actin-Gal4>UAS-LRRK2$^{G2019S}$ 0 μM v.s. 2.5 μM; P=0.6, UAS-LRRK2$^{G2019S}$ 0 μM v.s. 2.5 μM. n=132-150 flies. For FIG. 4B, P=8.5×10$^{-7}$, PINK1$^{B9}$ 0 μM v.s. PINK1$^{RV}$ 0 μM; P=0.36, PINK1$^{B9}$ 0 μM v.s. 2.5 μM; P=0.15, PINK1$^{RV}$ 0 μM v.s. 2.5 μM. n=58-146 flies. For FIG. 4C, P=3.19×10$^{-11}$, Elav-Gal4>UAS-SNCA$^{A53T}$ 0 μM v.s. UAS-SNCA$^{A53T}$ 0 μM; P=0.00019, Elav-Gal4>UAS-SNCA$^{A53T}$ 0 μM v.s. 2.5 μM; P=0.44, UAS-SNCA$^{A53T}$ 0 μM v.s. 2.5 μM. n=120-143 flies.

Fly climbing (negative geotaxis) ability was evaluated as previously described. Briefly, adult flies were gently tapped to the base of a modified 25 ml climbing tube and their climbing progress was recorded after 45 sec. Three populations of flies were assessed, and for each population, flies were examined 3 times per experiment. The recorded values were used to calculate Average Performance Index (PI). For FIG. 4G, data of mutant LRRK2 flies were presented as mean PI±S.E.M at the indicated days and compared using Ordinary Two-Way ANOVA Dunnett's Test. n=3 independent tests, 44-47 flies per genotype/condition. P<0.0001, UAS-LRRK2$^{G2019S}$ 0 μM v.s. Actin-GAL4>UAS-LRRK2$^{G2019S}$ 0 μM; P<0.0001, Actin-GAL4>UAS-LRRK2 0 μM v.s. 2.5 μM. For FIG. 4H, mean PI±S.E.M of PINK1$^{B9}$ ("−") and PINK1$^{RV}$ ("+") flies was shown. n=3 independent tests, 24-37 flies per genotype/condition. For FIG. 4I, mean PI±S.E.M of mutant SNCA flies was shown. n=3 independent tests, 42-46 flies per genotype/condition. For FIGS. 4H and 4I, One-Way ANOVA Fisher's LSD Test was used. To assess flying ability, flies were tapped one at a time out of a vial held upside down 1 foot above a benchtop. If the fly flew away, it was recorded as "1", and if it was unable to fly, it was recorded as "0". Wing posture was assessed by viewing each fly through a vial under a dissecting microscope. Thoracic indentation was observed by placing flies on a $CO_2$ pad and viewing their thoraxes under a dissecting microscope. A normal wing posture or thorax (Course et al., 2018) was scored as "1", otherwise "0". For FIG. 7L-N, Chi-Square Test was used because the data were categorical.

ATP concentrations were determined using the Roche ATP Bioluminescence Assay Kit HS II (Sigma-Aldrich, Cat: 11699709001). Briefly, 1 whole fly was homogenized in 150 μl ice-cold lysis buffer using a Kontes pellet pestle. Lysate was then boiled for 5 min and centrifuged at 20,000 g at 4° C. for 1 min. Cleared lysate was diluted 1:200 in dilution buffer and loaded with 10 μl luciferase. Luminescence was immediately measured using a Glomax Multi Jr. Reader (Promega). Total protein amount was measured using the bicinchoninic acid protein (BCA) assay (Thermo Scientific). The ATP level in each sample was normalized to the total protein amount. For all experiments, 1-150 flies were used.

Cell Culture and Biochemistry. Adult flies were lysed as previously described and immunoblotted by the following antibodies: guinea pig anti-DMiro (GP5) at 1:20,000, mouse anti-tubulin (T6199, Sigma) at 1:3,000, mouse anti-β-actin (ab8224, Abcam) at 1:5,000, mouse anti-VDAC (ab14734, Abcam) at 1:3,000, and rabbit anti-marf at 1:1,000. HEK cell culture and transfection were described in (Hsieh et al., 2016).

Fibroblasts were cultured in high-glucose DMEM (SH30243.01, Invitrogen) supplemented with 10% heat-inactivated fetal bovine serum (F0926, Sigma-Aldrich, and 900-108, Gemini Bio Products) and maintained in a 37° C., 5% $CO_2$ incubator with humidified atmosphere. The media were refreshed every 3-4 days and split every 7-8 days. CCCP (C2759, Sigma-Aldrich) was prepared at 40 mM in DMSO fresh every time and applied at 40 μM in fresh culture medium (1:1000 dilution). IP was performed as described in (Hsieh et al., 2016).

For transfection in fibroblasts, medium was replaced with Opti-MEM (Gibco) prior to transfection. 0.5 μg of DNA or 2 μl of Lipofectamine 2000 was diluted in Opti-MEM at room temperature (22° C.) to a final volume of 50 μl in two separate tubes, and then contents of the two tubes were gently mixed, incubated for 25 min at room temperature, and subsequently added onto fibroblasts. After transfection for 6 hrs, Opti-MEM containing DNA-Lipofectamine complexes was replaced with regular culture medium. After transfection for 18 hrs, fibroblasts were live imaged, or treated with Miro1 reducer and/or CCCP.

Mitochondria were isolated from cultured human fibroblasts as described previously with minor modifications. Briefly, CCCP in DMSO or the same volume of DMSO treated fibroblasts were lifted by a cell scraper, and mechanically homogenized with a Dounce homogenizer in 750 μl isolation buffer (200 mM sucrose, 10 mM TRIS/MOPS, pH 7.4). After centrifugation at 500 g for 10 min, crude supernatant was spun at 10,000 g for 10 min to pellet intact mitochondria. Mitochondrial pellet was washed twice with isolation buffer. After this step, supernatant was referred to "cytosolic fraction (Cyto)", and pellet was resuspended in 50 μl lysis buffer (50 mM Tris pH 8.0, 150 mM NaCl, and 1% Triton X-100-T8787, Sigma-Aldrich) with 0.25 mM phenylmethanesulfonylfluoride (P7626, Sigma-Aldrich) and protease inhibitors (Roche) referred to "mitochondrial fraction (Mito)".

Samples were mixed 1:1 with 2× laemmli buffer (4% SDS, 20% Glycerol, 120 mM Tris-HCl, 0.02% bromophenol blue, 700 mM 2-mercaptoethanol) and boiled for 5 min prior to being loaded (Mito:Cyto=25:1) into an SDS-PAGE. 10% polyacrylamide gels (acrylamide:bis-acrylamide-29:1) and Tris-Glycine-SDS buffer (24.8 mM Tris, 192 mM glycine, 0.1% SDS) were used for electrophoresis.

After electrophoresis, nitrocellulose membranes (1620115, Bio-Rad) were used in wet transfer with Tris-Glycine buffer (24.8 mM Tris, 192 mM glycine) at 360 mA for 2 hrs on ice. Transferred membranes were first blocked overnight in phosphate-buffered saline (PBS) containing 5% fat-free milk and 0.1% tween-20 at 4° C., and then incubated with the following primary antibodies: mouse anti-Miro1 (WH0055288M1, Sigma-Aldrich) at 1:1,000, rabbit anti-Miro1 (HPA010687, Sigma-Aldrich) at 1:1,000, rabbit anti-Miro2 (HPA012624, Sigma-Aldrich) at 1:800, rabbit anti-VDAC (4661S, Cell Signaling Technology) at 1:1,000, mouse anti-Mitofusin2 (H00009927-M01, Abnova) at 1:1, 000, mouse anti-Parkin (sc32282, Santa Cruz Biotechnology) at 1:500, rabbit anti-LRRK2 (NB300-268, Novus Biologicals) at 1:500, rabbit anti-OPA1 (ab42364, Abcam) at 1:750, mouse anti-β-actin (A00702, Genscript) at 1:1,000, mouse anti-ubiquitin (A-104, Boston Biochem) at 1:500 or rabbit anti-GAPDH (5174S, Cell Signaling Technology) at 1:3,000, at 4° C. overnight in blocking buffer. HRP-conjugated goat anti-mouse or rabbit IgG (Jackson ImmunoResearch Laboratories) were used at 1:5-10,000. West Dura ECL Reagents (34075, GE Healthcare) were used for ECL immunoblotting. Membranes were exposed to UltraCruz autoradiography films (Santa Cruz Biotechnology) and developed on a Konica Minolta SRX-101A developer. For fluorescent Western, blots were probed with Cy5-conjugated goat anti-mouse IgG (PA45009, GE Healthcare) at 1:5,000, and scanned at 635 nm with a Molecular Dynamics Storm 860 Imager (Amersham BioSciences, Piscataway, NJ) in a linear range for fluorescent detection. Representative raw blots are in supplementary tables. Experiments were repeated for more than 3 times.

Statistics of Fibroblast Western Blotting Data. All experiments were performed in a blinded format, and the identities of the lines were un-blinded either by us (NINDS lines) or by the PPMI researchers (PPMI lines). Films were scanned or digital blots were exported as 16-bit tiff format. The intensities of protein bands were measured by ImageJ (ver. 1.48V, NIH). The intensity of each band in the mitochondrial fraction was normalized to that of the mitochondrial loading control VDAC from the same blot, and expressed as a fraction of the mean of Healthy-1 with DMSO treatment; this control was included in every independent experiment. Values of Mean±S.E.M of Miro1 were reported in FIG. 10A. Values of Mean of Miro1, Mitofusin2, LRRK2, and Parkin were imported into heat maps in FIG. 1D. The band intensities of VDAC were not significantly different among all fibroblast lines and conditions (p=0.8490, One-Way ANOVA Post-Hoc Tukey Test with adjustment). n=3-35 independent experiments. Mann-Whitney U Test was performed for comparing normalized Miro1 band intensities within the same subject (DMSO v.s. CCCP), and the P values were reported in FIG. 10A. The numbers of subjects with a P value >0.05 and <0.05 were counted respectively and used in Fisher Exact Test in FIG. 12A. Linear Regression Analysis was used to determine the correlation with the ratio of Miro1 intensity (mean intensity at CCCP/DMSO). One-Way ANOVA Post-Hoc Tukey Test with adjustment was performed for band intensities at baseline (P>0.3509 for all markers in "Cyto"+"Mito"). Statistical analyses were two-sided and performed using the Prism software (ver. 5.01, GraphPad).

PPMI is an international, multi-center and progressing study designed to identify PD biomarkers by the MJFF. The study design, subject recruitment criteria, site selection, and study assessment have been detailed in (Parkinson Progression Marker, 2011).

ELISA. All experiments were performed as blinded tests. 40 µM CCCP in DMSO or the same volume of DMSO alone was applied to fibroblasts for 6 hrs, and then cells were lysed in lysis buffer (100 mM Tris, 150 mM NaCl, 1 mM EGTA, 1 mM EDTA, 1% Triton X-100, 0.5% Sodium deoxycholate) with protease inhibitor cocktail (539134, Cabiochem). Cell debris was removed by centrifugation at 17,000 g for 10 min at 4° C. Microplates (MaxiSorp, NUNC) were coated with mouse anti-Miro1 (clone 4H4, WH0055288M1, Sigma-Aldrich) at 1:1,000, chicken anti-β-actin (LS-C82919, LifeSpan BioSciences) at 1:750, mouse anti-β-actin (A00702, Genscript) at 1:1000, or mouse anti-ATP5β (ab14730, Abcam) at 1:1000 in 0.1 M sodium carbonate-bicarbonate buffer (3:7, pH-9.6) overnight at room temperature with cover to avoid evaporation. After plates were washed in wash buffer (0.05% Tween 20 in PBS, pH 7.3), nonspecific binding sites were blocked in PBS with 2% BSA (BP-1600-100, Fisher scientific) for 1 hr. Next, 50 µl of cell lysate prepared from above, purified full-length Miro1 protein (0-900 ng/ml, ab163047, Abcam), or serial dilutions of cell lysates of fibroblasts (Healthy-1) or HEK cells (¹/₁₆×-2×) were added and incubated at room temperature for 2 hrs. After washes, plates were incubated with biotinylated rabbit anti-Miro1 (ARP44818_P050, Aviva Systems Biology) at 1:1000, or biotinylated rabbit anti-β-actin (#5057S, Cell Signaling Technology) at 1:500, in 100 µl diluent (1% BSA in PBS, pH-7.3) for 2 hrs. Next, plates were washed and incubated with horseradish peroxidase-conjugated streptavidin (21130, Thermo Scientific) at 1:2000 in 100 µl diluent for 20 min. Plates were washed again, and 100 µl of the tetramethylbenzidine liquid substrate (SB01, Life Technologies) was added and incubated for another 20 min. The colorimetric reactions were stopped by 50 µl 1 M $H_2SO4$ and absorbance was read at 450 nm by a microplate reader (FlexStation 3, Molecular devices). An experiment for generating the standard curve was included in each plate and representative standard plots were shown in figures. Each data point was from 4 independent experiments with 2 technical repeats each time. Mann-Whitney U test was performed for comparing Miro1 signals within the same subject (DMSO v.s. CCCP). Basal Miro1 signals were not significantly different among all lines (P>0.1177, One-Way ANOVA Post-Hoc Tukey Test with adjustment). The distribution of data points was expressed as box-whisker plots (Extreme, Quartile, Median).

AI. We employed the AtomNet neural network, the first deep neural network for structure-based drug design, Wallach et al. (2015). Atomnet: A deep convolutional neural network for bioactivity prediction in structure-based drug discovery. arXiv arXiv.org>cs>arXiv:1510.02855. A single global AtomNet model was trained to predict binding affinity using $K_i$ and $IC_{50}$ values of several million small molecules and protein structures of several thousand different protein families that Atomwise has curated from both public databases and proprietary sources. Next, this model was used prospectively, even against novel binding sites with no known ligands, while the use of a single global model helped prevent overfitting.

Training proceeded as the followings. First, we defined the binding site on a given protein structure using a flooding algorithm based on an initial seed. The initial starting point of the flooding algorithm may be determined from a variety of methods, including a bound ligand annotated in the PDB database, crucial residues as revealed by mutagenesis studies, or identification of catalytic motifs previously reported. Second, we shifted the coordinates of the co-complex to a three-dimensional Cartesian system with an origin at the center-of-mass of the binding site. We then performed data augmentation by randomly rotating and translating the protein around the center-of-mass of the binding site. This prevents the neural network from learning a preferred protein orientation; as gravity rarely makes a significant contribution to binding, any such uncovered signal would be an inadvertent artifact from our data curation process. Third, for a given ligand, we sampled multiple poses within the binding site cavity.

Each of these poses represents a putative co-complex and therefore, unlike previous structure-based predictive methods such as docking, our method does not require experimental co-complexes for either training or prediction. Each generated co-complex was then rasterized into a fixed-size regular three-dimensional grid, where the values at each grid point represent the structural features that are present at each grid point. Similar to a photo pixel containing three separate channels representing the presence of red, green, and blue colors, our grid points represent the presence of different atom types. These grids serve as the input to a convolutional neural network, defining the network's receptive field. We used a network architecture of a 30×30×30 grid with a 1 Å spacing for the input layer, followed by five convolutional layers of $32\times3^3$, $64\times3^3$, $64\times3^3$, $64\times3^3$, $64\times2^3$ (number of filters×filter-dimension), and a fully-connected layer with 256 ReLU hidden units. The scores for each pose in the ensemble were then combined through a weighted Boltzmann averaging to produce a final score. These scores were compared against the experimentally-measured $K_i$ or $IC_{50}$ of the protein and ligand pair, and the weights of the neural network were adjusted to reduce the error between the predicted and experimentally-measured affinity using a mean-square-error loss function. Training was done using the ADAM adaptive learning method, the backpropagation algorithm, and mini-batches with 64 examples per gradient step.

We used the 2.25 Å structure of the C-terminal GTPase domain of human Miro1 with a bound GDP (PDB ID: 5KSO, chain A, position 411-592) (Klosowiak et al., 2016). We identified the predicted GDP binding sites V426, K427, N428, C429, G430, K431, S432, G433, V434, L443, O446, K447, K454, D475, K528, S529, D530, L531, F557, T558, C559, N560 of Miro1 protein as the binding sites to small molecules, which were used for virtual screening by AtomNet. The crystalized GDP, phosphate ions, and all water molecules were removed from the sites before the AtomNet virtual screen. We screened the Mcule small-molecule library version v20180722, containing 6,835,320 small organic molecules for drug discovery purchasable from the chemical vendor Mcule. For each small molecule, we generated a set of 64 poses within the binding site. Each of these poses was scored by the trained model, and the molecules were ranked by their scores. We then applied the filters for oral availability, toxicophores, and blood-brain barrier permeability using Lipinski's rule of five, Eli Lilly's MedChem Rules, and Lipinski's rule for CNS drugs, respectively. These filters removed compounds with undesirable substructures and molecular properties including molecular weight, log P, and number of hydrogen-bond donors and acceptors. Our method does not introduce a manual bias caused by visual inspections of compounds, and yields an actual assessment of the ability of the software to identify hits with minimal operator intuition. After we identified Miro1 Reducer, we performed a visual inspection and revealed 7 amino acids residues (K427, N428, S432, Q446, K528, D530, K454) which make frequent molecular interactions, especially via hydrogen-bonds, with the poses of Miro1 Reducer. For FIG. 2A, MW: molecular weight (Dalton); nof RotB: number of rotatable bonds; nof HBD: number of hydrogen-bond donors; nof HBA: number of hydrogen-bond acceptors; mol Log P: calculated log P; molPSA: polar surface area (square Ångström).

Neuronal Derivation from iPSCs and Transfection. All iPSC lines in this study are summarized below and have been fully characterized by the previous studies, the NINDS human and cell repository, and Stanford Stem Cell Core.

| iPSC line | Source | Etiology | PD mutation | Age | Sex |
|---|---|---|---|---|---|
| PD-I | NINDS (ND50050); Episomal reprogramming | Genetic | SNCA (A53T) | 51 | Female |
| PD-II | In house, Shaltouki et al., 2018; Sendai Virus reprogramming | Genetic | SNCA (A53T) | 51 | Female |
| PD-III | NINDS (ND39896) | Sporadic | Unknown | 77 | Male |
| Wild-type-I | NINDS (ND50085) | Isogenic control for PD-I | Wild-type | 51 | Female |
| Wild-type-II | Drs. Pera and Palmer, Hsieh et al., 2016 | Healthy Control | Wild-type | 62 | Male |
| Wild-type-III | NINDS (ND41864) | Healthy Control | Wild-type | 64 | Male |
| Wild-type-IV | Stanford Stem Cell Core, Shaltouki et al., 2018 | Healthy Control | Wild-type | 42 | Female | iPSCs were derived to midbrain dopaminergic neurons as previously described with minor modifications. Briefly, neurons were generated using an adaptation of the dual-smad inhibition method with the use of smad inhibitors dorsormorphin (Sigma) and SB431542 (Tokris), and the addition of GSK3β inhibitor CHIR99021 (Stemgent). SHH was replaced with the smoothened agonist SAG. To gain a higher purity of neural precursor cells, 12 days after neural induction, rosette-forming neuroectodermal cells were manually lifted and detached en bloc, and then cultured in suspension in a low-attachment dish (430589, Corning Inc.) with N2 medium with 20 ng/ml BDNF, 200 μM Ascorbic Acid, 500 nM SAG, and 100 ng/ml FGF8a. On day 17, neurons were transferred onto poly-omithine and laminin-coated glass coverslips in a 24-well plate. On day 18, medium was switched to N2 medium supplemented with 20 ng/ml BDNF, 200 μM Ascorbic Acid, 20 ng/ml GDNF, 1 ng/ml TGFβ, and 500 µM Dibutyryl-cAMP for maturation of dopaminergic neurons. Neurons were used at day 21-23 after neuronal induction, when about 80-90° % of total cells expressed the neuronal marker TW-1, and 12% of total cells expressed TH and markers consistent with ventral midbrain neuronal subtypes. Antimycin A (A8674, Sigma-Aldrich) was applied to neurons at 10 µM.

For transfection, on day 20 after neuronal induction, culture medium was replaced with Opti-MEM (Gibco) prior to transfection. 0.5 µg EGFP and 0.5 µg mito-dsRed, or 5 µl Lipofectamine 2000 was diluted in Opti-MEM at room temperature (22° C.) to a final volume of 50 µl in two separate tubes, and then contents of the two tubes were gently mixed, incubated for 20 min at room temperature, and subsequently added onto neurons. After transfection for 6 hrs, Opti-MEM containing DNA-Lipofectamine complexes was replaced with regular N2 medium. After transfection for 3 days, neurons were imaged.

Live Image Acquisition and Quantification. We transfected neurons with mito-dsRed and EGFP at day 20 after neuronal induction, and live imaged mito-dsRed from EGFP-positive axons 3 days later. As described previously, neurons on glass coverslips were placed in a 35-mm petridish containing the Hibernate E low-fluorescence medium (BrainBits) on a heated stage of 37° C., and imaged with a 63×/N.A.0.9 water-immersion objective with excitation at 561 nm or 488 nm. Axons were identified by morphology, and axons longer than 50 µm were selected for recording. Time-lapse movies were obtained continually with 5 sec intervals before and after Antimycin A (100 µM, Sigma-Aldrich) was added. Movie length ranged from 120 to 300 min. For quantification, kymographs were generated from time-lapse movies by ImageJ, representing a 100-sec period either right before, or following different time points after addition of Antimycin A. Each kymograph was then imported into a macro written in Labview (NI, TX), and individual mito-dsRed puncta were traced using a mouse-driven cursor at the center of the mito-dsRed object. Using Matlab (The MathWorks, MA), we determined the following parameters: 1) the instantaneous velocity of each mitochondrion, 2) the average velocity of those mitochondria that are in motion, 3) the percent of time each mitochondrion is in motion, 4) stop frequency, and 5) turn back frequency. The intensity of mitochondria was measured using ImageJ. n=5-8 axons from 5-8 separate transfections Immunocytochemistry and Confocal Microscopy. PI (P4170, Sigma) at 2.5 µg/ml or 4', 6-Diamidino-2-phenylindole (Dapi-D9542, Sigma) at 0.5 µg/ml was applied in culture media at room temperature in the dark for 10 min, MitoSox (M36008, Invitrogen) at 2 µM was applied in culture media at 37° C. for 10 min, or TMRM (T668, Molecular Probes) at 25 nM was applied in culture media at 37° C. for 30 min, and cells were washed with HBSS and imaged immediately in a 35-mm petridish containing the Hibernate E low-fluorescence medium with a 63×/N.A.0.9 water-immersion objective. For immunostaining, cells were fixed in 2-4% paraformaldehyde (Electron Microscopy Sciences, Hatfield, PA) for 15 min, then washed three times in PBS, and blocked in PBS with 0.1% Saponin (Sigma-Aldrich) for 60 min. Cells were then immunostained with rabbit anti-TH (AB-152, Millipore) at 1:500 overnight, or mouse anti-Myc (sc-40, SantaCruz) at 1:1,000, rabbit anti-Tom20 (13929S, Cell Signaling Technology) at 1:1000, or mouse anti-ATP5β (ab14730, Abcam) at 1:500 overnight followed with Dapi at 0.5 µg/ml for 10 min. Adult fly brains were dissected in PBST (0.3% Triton X-100 in PBS), and incubated with fixative solution (4% formaldehyde in PBST) for 15 min. Fixed samples were immunostained with rabbit anti-TH (AB-152, EMD Millipore) at 1:200. Samples were imaged at room temperature with a 20×/N.A.0.60 or a 63×/N.A.1.30 oil Plan-Apochromat objective on a Leica SPE laser scanning confocal microscope, with identical imaging parameters among different genotypes in a blinded fashion. Images were processed with ImageJ (Ver. 1.48, NIH) using only linear adjustments of contrast and color. n=3-11 independent experiments.

GTPase Assay. IPed Miro1 was eluted from protein-A beads by incubation with 60 µl 0.2 M glycine (pH 2.5) for 10 min, followed by centrifugation at 3000 g for 2 min. Supernatants (eluates) were collected and neutralized by adding an equal volume of Tris pH 8.0. Eluates were processed for colorimetric analysis of GTPase activity at room temperature by using a GTPase Activity Kit according to the manufacturer's instructions (602-0120, Novus Biologicals). 100 µl eluates were mixed with 100 µl substrate/buffer mix (20 µl 0.5 M Tris Buffer, 5 µl 0.1 M $MgCl_2$, 10 µl 10 mM GTP, and 65 µl $ddH_2O$). 200 µl of inorganic phosphate group (Pi) standard (0-50 µM) was prepared in water. Next, 50 µl PiColorLock™ mix was added into either Pi standards or samples. After 2 min, stabilizer was added and mixed thoroughly. 30 min later, absorbance was read at 650 nm by a microplate reader (FlexStation 3, Molecular devices). The assay was validated using purified Miro1 protein (ab163047, Abcam). The concentrations of purified Miro1 protein ranging from 0-900 ng/ml showed a linear dependency on the absorbances at 650 nm which reflect released Pi ($R^2$-0.9711, P=0.0021). Omitting GTP or Miro1 eliminated the signals (Pi<3 µM). Experiments were repeated twice.

PCR. Total RNA was extracted from at least $10^8$ cells per sample using TRIzol® (GIBCO) according to the manufacturer's instructions. Concentrations of total RNA were measured using a Nano Drop. 1 µg of total RNA was then subjected to DNA digestion using DNase I (Ambion), immediately followed by reverse transcription using the iScript Reverse Transcription Supermix (1708841, BIO-RAD). qPCR was performed using the StepOnePlus™ instrument (Thermo Fisher Scientific) and SYBR® Green Supermix (172-5270, BIO-RAD) by following the manufacturer's instructions. Human GAPDH was amplified as internal standards. Expression levels were analyzed by the StepOne™ Software (Version 2.2.2). The relative expression level of Miro1 was divided by that of GAPDH from the same experiment. Each sample was analyzed in duplicate from 4 independent biological repeats. The following primers were used:

```
GAPDH forward:
5'-ACCACAGTCCATGCCATCAC-3'

GAPDH reverse:
5'-TCCACCACCCTGTTGCTGT-3'

Miro1 forward:
5'-GGGAGGAACCTCTTCTGGA-3'

Miro1 reverse:
5'-ATGAAGAAAGACGTGCGGAT-3'
```

QUANTIFICATION AND STATISTICAL ANALYSIS. Throughout, the distribution of data points was expressed as box-whisker or dot-plot, except otherwise stated. One-Way ANOVA Post-Hoc Tukey Test was performed for comparing multiple groups, except otherwise stated. Mann-Whitney U Test was performed for comparing two groups. Statistical analyses were performed using the Prism software (ver. 5.01, GraphPad). For all experiments, between 3 and 150 animals or independent experiments were used. The number of animals and experimental replications (n) can be found in FIG. Legends and Method Details. No statistical methods were used to predetermine sample sizes, but the number of flies, experiments, and biological replicates were chosen based on the nature of the experiments (it is usually difficult to assess an outcome that follows a normal distribution in our experiments), degree of variations, and published papers describing similar experiments. We did not exclude any data.
* $P<0.05$,  $P<0.01$, * $P<0.001$ for all figures.

The preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

What is claimed is:

1. A method of treatment of Parkinson's Disease in a subject having Parkinson's Disease, comprising:
    administering a therapeutically effective amount of a compound:

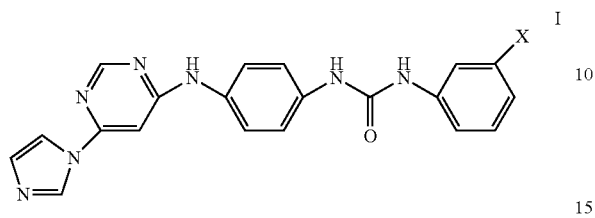

where X is F, Cl, Br, I, or a pharmaceutically acceptable salt thereof.

2. The method of claim 1, wherein X is F.

3. The method according to claim 1, wherein the Parkinson's disease is a PTEN-induced putative kinase 1 (PINK-1)-associated form of PD.

4. The method according to claim 1, wherein the Miro1 reducer is administered to the midbrain and/or putamen of the subject.

5. The method according to claim 1, further comprising the step of administering to the individual a therapeutically effective amount of one or more agents selected from the group consisting of levodopa, a dopamine agonist, a MAO-B inhibitor, amantadine, or an anticholinergic prior to, concurrently with, or after administering the inhibitor of a mitochondrial transport protein.

* * * * *

```
                          SEQUENCE LISTING

<160> NUMBER OF SEQ ID NOS: 4

<210> SEQ ID NO 1
    <211> LENGTH: 20
    <212> TYPE: DNA
    <213> ORGANISM: Artificial sequence
    <220> FEATURE:
    <223> OTHER INFORMATION: Synthetic Sequence

<400> SEQUENCE: 1
accacagtcc atgccatcac                                                     20

<210> SEQ ID NO 2
    <211> LENGTH: 19
    <212> TYPE: DNA
    <213> ORGANISM: Artificial sequence
    <220> FEATURE:
    <223> OTHER INFORMATION: Synthetic Sequence

<400> SEQUENCE: 2
tccaccaccc tgttgctgt                                                      19

<210> SEQ ID NO 3
    <211> LENGTH: 19
    <212> TYPE: DNA
    <213> ORGANISM: Artificial sequence
    <220> FEATURE:
    <223> OTHER INFORMATION: Synthetic Sequence

<400> SEQUENCE: 3
gggaggaacc tcttctgga                                                      19

<210> SEQ ID NO 4
    <211> LENGTH: 20
    <212> TYPE: DNA
    <213> ORGANISM: Artificial sequence
    <220> FEATURE:
    <223> OTHER INFORMATION: Synthetic Sequence

<400> SEQUENCE: 4
atgaagaaag acgtgcggat                                                     20
```